United States Patent
Tokarev et al.

(10) Patent No.: US 12,469,084 B2
(45) Date of Patent: Nov. 11, 2025

(54) EVENT SOURCING

(71) Applicant: Bestow Inc., Dallas, TX (US)

(72) Inventors: Eugene Tokarev, Austin, TX (US); Mikhail Katychev, Dallas, TX (US)

(73) Assignee: Bestow Inc., Dallas, TX (US)

( * ) Notice: Subject to any disclaimer, the term of this patent is extended or adjusted under 35 U.S.C. 154(b) by 73 days.

(21) Appl. No.: 18/145,795

(22) Filed: Dec. 22, 2022

(65) Prior Publication Data

US 2023/0385174 A1 Nov. 30, 2023

Related U.S. Application Data

(60) Provisional application No. 63/345,717, filed on May 25, 2022.

(51) Int. Cl.
| | |
|---|---|
| *G06F 16/00* | (2019.01) |
| *G06F 11/34* | (2006.01) |
| *G06F 11/362* | (2025.01) |
| *G06F 16/17* | (2019.01) |
| *G06F 16/25* | (2019.01) |

(Continued)

(52) U.S. Cl.
CPC ......... *G06Q 40/08* (2013.01); *G06F 11/3476* (2013.01); *G06F 11/362* (2013.01); *G06F 16/1734* (2019.01); *G06F 16/258* (2019.01); *G06Q 10/10* (2013.01); *G06Q 20/401* (2013.01)

(58) Field of Classification Search
CPC .................................................. G06F 16/1734
See application file for complete search history.

(56) References Cited

U.S. PATENT DOCUMENTS 6,581,063 B1 * 6/2003 Kirkman ............. G06F 16/9024
707/999.102
10,282,785 B1   5/2019 Yager et al.
(Continued)

FOREIGN PATENT DOCUMENTS

JP    2018-67336 A    4/2018
JP    2020-197948 A   12/2020
(Continued)

OTHER PUBLICATIONS

Alenoghena et al., "eHealth: A Survey of Architectures, Developments in mHealth, Security Concerns and Solutions," International Journal of Environmental Research and Public Health, Oct. 11, 2022, 19(20):13071, 54 pages.

(Continued)

*Primary Examiner* — Ajith Jacob
(74) *Attorney, Agent, or Firm* — Fish & Richardson P.C.

(57) ABSTRACT

In general, this disclosure involves systems, software, and computer implemented methods including receiving a mutate command instructing the modification of an object from a first state to a second state and accessing an event log including an origin state of the object, and one or more previously executed mutation commands. The one or more previously executed mutation commands are applied to the origin state of the object to determine whether the first state is valid. In response to determining that the first state is valid, executing the mutate command on the object to place the object in the second state and recording the mutate command in the event log as an additional, previously executed, mutation command.

17 Claims, 30 Drawing Sheets

(51) Int. Cl.
   *G06Q 10/10*   (2023.01)
   *G06Q 20/40*   (2012.01)
   *G06Q 40/08*   (2012.01)

(56) References Cited

U.S. PATENT DOCUMENTS

| | | | |
|---|---|---|---|
| 10,467,050 | B1 | 11/2019 | Schmidgall et al. |
| 10,607,294 | B1 | 3/2020 | Mitchell et al. |
| 10,616,075 | B2 | 4/2020 | Dawes et al. |
| 10,685,009 | B1 | 6/2020 | Rutley et al. |
| 10,922,658 | B2 | 2/2021 | Moll |
| 10,997,665 | B2 | 5/2021 | Neag et al. |
| 11,329,998 | B1 | 5/2022 | Shahidzadeh et al. |
| 11,824,971 | B2 | 11/2023 | Mesiano et al. |
| 11,854,086 | B1 | 12/2023 | Yager et al. |
| 2005/0038724 | A1 | 2/2005 | Roever et al. |
| 2005/0234860 | A1 | 10/2005 | Roever et al. |
| 2008/0033813 | A1 | 2/2008 | Khachatryan |
| 2008/0183507 | A1 | 7/2008 | Lutnick et al. |
| 2013/0060582 | A1 | 3/2013 | Cutino et al. |
| 2015/0073834 | A1 | 3/2015 | Gurenko et al. |
| 2016/0098298 | A1 | 4/2016 | Trefler et al. |
| 2016/0275455 | A1 | 9/2016 | Moll |
| 2017/0140467 | A1 | 5/2017 | Neag et al. |
| 2018/0076954 | A1 | 3/2018 | Mesiano et al. |
| 2018/0089764 | A1 | 3/2018 | Busque et al. |
| 2018/0367946 | A1 | 12/2018 | Best |
| 2019/0370615 | A1* | 12/2019 | Murphy ............... G06F 9/541 |
| 2020/0090188 | A1 | 3/2020 | Wince et al. |
| 2021/0201328 | A1* | 7/2021 | Gunther ............... H04L 9/3073 |
| 2021/0314305 | A1 | 10/2021 | Rodriguez |
| 2021/0326994 | A1 | 10/2021 | Dang |
| 2022/0129381 | A1 | 4/2022 | Kang |
| 2022/0240062 | A1 | 7/2022 | Gurayah et al. |
| 2023/0021327 | A1 | 1/2023 | Doumar |
| 2023/0162224 | A1 | 5/2023 | Biemer et al. |
| 2023/0385938 | A1 | 11/2023 | Ranginwala |
| 2023/0385939 | A1 | 11/2023 | Tsuchiyma et al. |
| 2024/0062309 | A1 | 2/2024 | Yager et al. |

FOREIGN PATENT DOCUMENTS

| | | |
|---|---|---|
| WO | WO 2002061527 A2 | 8/2002 |
| WO | WO 2016143948 | 9/2016 |
| WO | WO 2016159902 | 10/2016 |
| WO | WO 2023230198 A1 | 11/2023 |

OTHER PUBLICATIONS

International Search Report and Written Opinion in International Appln. No. PCT/US2023/023463, mailed on Sep. 12, 2023, 10 pages.

Broadcom [online], "Managing Stored Credentials," Jun. 25, 2010, retrieved on Sep. 4, 2024, retrieved from URL<https://techdocs.broadcom.com/us/en/symantec-security-software/information-security/data-loss-prevention/16-0-1/Manage-the-Enforce-Server/about-the-credential-store-v25839202-d297e6450/managing-stored-credentials-v25785894-d297e6615.html>, 2 pages.

Extended European Search Report in European Appln. No. 23812542.1, mailed on Feb. 18, 2025, 9 pages.

International Preliminary Report on Patentability in International Appln. No. PCT/US2023/023463, mailed on Dec. 5, 2024, 7 pages.

Lin et al., "Event-based debugging of object/action programs," Paper, Presented at the WPDD88:1988 Workshop on Parallel & Distributed Debugging, Madison, Wisconsin, USA, May 5-6, 1988; Proceedings of the 1988 ACM SIGPLAN and SIGOPS workshop on Parallel and distributed debugging, Nov. 1, 1988, pp. 23-34.

Msimga.com [online], "Insurance Built for the Future," Jan. 1, 2020, retrieved on Sep. 4, 2024, retrieved from URL<https://msimga.com/>, 7 pages.

Salesforce.com [online], "Set Up and Manage Insurance," Nov. 24, 2019, retrieved on Sep. 4, 2024, retrieved from URL<https://help.salesforce.com/s/articleView?id=sf.fsc_insurance.htm&language=en_US&type=5>, 4 pages.

* cited by examiner

Application Process

EVENT SOURCING

CROSS-REFERENCE TO RELATED APPLICATIONS

This application claims benefit under § 35 USC 119(e) to U.S. Application No. 63/345,717, filed on May 25, 2022, the contents of which are hereby incorporated by reference.

BACKGROUND

Life insurance provides payment from an insurer to a beneficiary upon the death of an insured party. Life insurance represents a long-standing high value industry. Despite its popularity and benefits, life insurance remains inaccessible to millions of people.

SUMMARY

In general, this disclosure involves systems, software, and computer implemented methods for providing a life insurance as a service (Laas) platform that uses workflows to dynamically handle referrals and policy administration. One example implementation includes receiving customer information and a set of agent credentials from an agent system at an integration platform. The integration platform verifies the agent credentials and generates a referral token that uniquely identifies a landing site defined by an external system. The integration platform generates a digital application based on a workflow that is defined by the external system and pre-populates at least a portion of the digital application with the customer information. The integration platform sends the pre-populated digital application to the external system for hosting at the landing site, and further sends a uniform resource locator (URL) to the agent system. The URL includes the referral token, and information that directs the customer to the pre-populated digital application on the landing site. The integration platform stores the token in a repository of used token, and associates the referral token with the agent user.

Implementations can optionally include one or more of the following features.

In some instances, the agent credentials include a username and password.

In some instances, the agent credentials are encrypted using a private key associated with the agent, and verifying the agent credentials includes decrypting the agent credentials using a public key associated with the agent.

In some instances, the workflow includes (1) a plurality of parameters to be defined during completion of the digital application, (2) a sequence of operations, and (3) one or more evaluation rules.

In some instances, the agent credentials include an agent token that uniquely identifies the agent user.

In some instances, the landing site is a web application. In some instances, the web application is configured to be operated by the customer.

Another example implementations includes receiving a workflow defining (1) a plurality of parameters to be defined during completion of a digital applications, (2) a sequence of operations, and (3) one or more evaluation rules, the workflow having been defined by an external system and received at an integration platform. An application service executing on the integration platform generates a digital application based on the workflow, the digital application including a reference to the workflow. The integration platform can lock the workflow, causing the locked workflow to be immutably stored in a repository at the integration platform. The integration platform sends the digital application to a client device, the digital application configured to be presented on the client device in accordance with the sequence of operations. A completed digital application including inputs to the plurality of parameters is received and the integration platform determines that the completed digital application is to be approved based on evaluating the inputs using the one or more evaluation rules.

In some instances, evaluating the inputs using the one or more evaluation rules includes sending reflexive questions to the client device and receiving additional inputs based on the reflexive questions.

In some instances, transmitting the digital application to the client device includes transmitting a URL to a digital device that, when interacted with, causes the client device to display the digital application in an interactive graphical user interface (GUI) hosted by the integration platform.

In some instances, the digital application is generated based on the workflow and calling one or more external systems and collecting data from the one or more external systems.

In some instances, the plurality of parameters includes a plurality of questions to be answered, and the quests are immutably stored verbatim with the workflow at the integration platform.

In some instances, the digital application is a life insurance application, and the plurality of parameters include a price and term associated with a life insurance policy.

In some instances, the completed digital application, including the reference to the workflow, is stored in the repository with the locked workflow.

In some instances, an approval signal is transmitted to the external system in response to determining that the completed digital application is to be approved.

Other example implementations include receiving a mutate command instructing the modification of an object from a first state to a second state and accessing an event log including an origin state of the object, and one or more previously executed mutation commands. The one or more previously executed mutation commands are applied to the origin state of the object to determine whether the first state is valid. In response to determining that the first state is valid, executing the mutate command on the object to place the object in the second state and recording the mutate command in the event log as an additional, previously executed, mutation command.

In some instances, the object is a component of a digital life insurance policy.

In some instances, the mutate command includes changes to information in the object.

In some instances, determining whether the first state is valid includes determining whether the origin state with the one or more previously executed mutation commands applied matches the first state.

In some instances, in response to determining the first state is invalid, a failure message is returned indicating the object will not be placed in the second state.

In some instances, the one or more previously executed mutation commands each mutate the object from a previous state to a next state in a plurality of sequential states, and the previously executed mutation commands are sequentially ordered. In some instances, a debug command requesting the object in a particular state of the plurality of sequential states is received. The event log is accessed and a determination is made of a group of previously executed mutation commands that are sequentially ordered before the particular state. The group of previously executed mutation commands are applied to a debug object that is in the origin state to produce a debug object in the particular state of the plurality of states.

DETAILED DESCRIPTION

Figure 1:
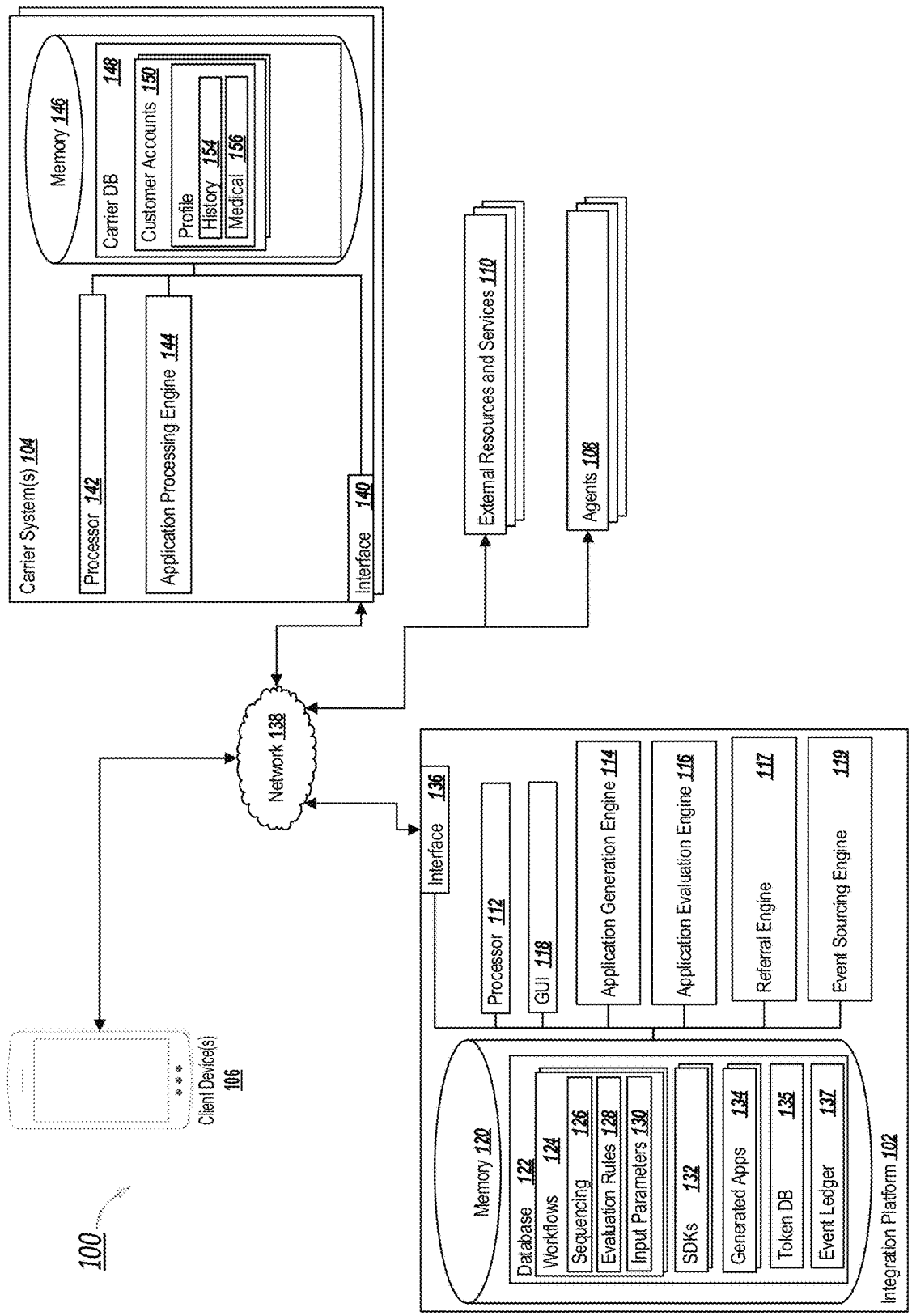
FIG. 1 is a schematic diagram illustrating an example integration platform.

This disclosure describes a system and method for providing life insurance through an online platform that uses machine learning, micro-services, and algorithmic underwriting to facilitate the distribution of life insurance policies to a larger number of people.

The process of determining and distributing life insurance policies may meet with many obstacles. These obstacles include issues with the application process, the distribution process, and the value perception of life insurance for the applicant. Issues with the application process can include several factors, including the application process itself, the underwriting process, and procedural roadblocks in the approvals process. The value perception results from a lack of understanding of the relationship between the price of the life insurance coverage and the benefit derived from the plan. The value perception is also confused by all of the different products offered by all of the different insurers.

Implementations of the present disclosure are generally directed techniques for increased efficiency and automation in assessing and completing insurance transactions. These techniques result in the unique ability to provide insurance to customers who would otherwise be disqualified using conventional risk assessments.

The present disclosure also provides a computer-readable storage medium coupled to one or more processors and having instructions stored thereon which, when executed by the one or more processors, cause the one or more processors to perform operations in accordance with implementations of the methods provided herein.

The described system provides several advantages, including: (1) expediting online insurance sales that decrease the effective applicant knockout rate by increasing the practicality of allowing applications previously considered at too high of a risk, where such consideration was due to lack of immediately available information to accurately rate the prospect. This is accomplished by a dynamic data collection processes, allowing for flexible and intelligent information collection; (2) increasing the efficiency of the application process by creating a centralized platform and supporting the policies via automation of tasks that are normally manual (e.g., a "high touch" and long sales cycle for agents, automate customer service functions, automate front end claims processing procedures, automate underwriting); (3) reducing or preventing fraud; (4) providing tools for presenting information to potential users, educating members in a centralized location; and (5) providing sales agents' with a unified platform that allow flexible methods to bring in customers, create policies, and sell policies. The system is designed to eliminate friction in the application process of life insurance policies by simplifying the application process, raising the perception of value, decreasing the number of rejected applicants, and decreasing the toil that agents experience in the customer education and sales process.

Integration Platform System Architecture

One solution for achieving these advantages is using carrier customizable workflows. These workflows are defined by an insurance carrier and sent to the integration platform, which uses the workflow in generating digital applications, collecting information and ultimately enrolling a customer in a policy. The workflow used to generate an application is immutably stored for future analytics and auditing, ensuring high transparency of automated systems.

FIG. 1 is a schematic diagram illustrating an example system 100 with an integration platform. The system 100 includes the integration platform 102, one or more carrier systems 104, one or more client devices 106, agents 108, and external resources and services 110.

The integration platform 102 is a platform for providing life insurance as a service (LaaS), through which multiple carrier systems 104 can provide life insurance to various customers via their client devices 106. Additionally, agents 108 operating carrier systems 104 can establish and provide customers life insurance using the integration platform 102.

The integration platform 102 includes one or more processors 112. Although illustrated as a single processor 112 in FIG. 1, multiple processors can be used according to particular needs, desires, or particular implementations of the system 100. Each processor 112 can be a central processing unit (CPU), an application specific integrated circuit (ASIC), a field-programmable gate array (FPGA), or another suitable component. Generally, the processor 112 executes instructions and manipulates data to perform the operations of the integration platform 102. Specifically, the processor 112 executes the algorithms and operations described in the illustrated figures, as well as the various software modules and functionality, including the functionality for sending communications to and receiving transmissions from network 138, as well as to other devices and systems. Each processor 112 can have a single or multiple core, with each core available to host and execute an individual processing thread. Further, the number of, types of, and particular processors 112 used to execute the operations described herein can be dynamically determined based on a number of requests, interactions, and operations associated with the integration platform 102.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component can be fully or partially written or described in any appropriate computer language including C, C++, JavaScript, Java™, Visual Basic, assembler, Perl®, any suitable version of 4GL, as well as others.

A graphical user interface (GUI) 118 can also be provided by the integration platform 102, which can present information and permit interaction by users of the integration platform 102, either directly (e.g., via input devices not illustrated) or remotely (e.g., via client devices 106 or carrier systems 104). GUI 118 of the integration platform 102 interfaces with at least a portion of the system 100 for any suitable purpose, including generating a visual representation of any particular generated digital application 134 and/or the content associated with any components of the carrier system 104 or integration platform 102. In particular, the GUI 118 can be used to present questions of a digital application, including providing one or more reflexive questions to the customer, as well as to otherwise interact and present information associated with one or more applications. GUI 118 can also be used to view and interact with various web pages, applications, and web services located local or external to the integration platform 102. Generally, the GUI 118 provides the user with an efficient and user-friendly presentation of data provided by or communicated within the system. The GUI 118 can comprise a plurality of customizable frames or views having interactive fields, pull-down lists, and buttons operated by the user. In general, the GUI 118 is often configurable, supports a combination of tables and graphs (bar, line, pie, status dials, etc.), and is able to build real-time portals, application windows, and presentations. Therefore, the GUI 118 contemplates any suitable graphical user interface, such as a combination of a generic web browser, a web-enable application, intelligent engine, and command line interface (CLI) that processes information in the platform and efficiently presents the results to the user visually.

In some instances, portions of the interactions and integration platform's 102 data can be stored remotely within memory 120. As illustrated, memory 120 can store information related to instructions for operating various engines (e.g., application generation engine 114 or application evaluation engine 116) or other information associated with operation of the integration platform 102. In some instances, additional information associated with workflows 124 can be stored in a database 122. Memory 120 of the integration platform 102 can represent a single memory or multiple memories. The memory 120 can include any memory or database module and can take the form of volatile or non-volatile memory including, without limitation, magnetic media, optical media, random access memory (RAM), read-only memory (ROM), removable media, or any other suitable local or remote memory component. The memory 120 can store various objects or data, including financial data, user and/or account information, administrative settings, password information, caches, applications, backup data, repositories storing business and/or dynamic information, and any other appropriate information associated with the integration platform 102, including any parameters, variables, algorithms, instructions, rules, constraints, or references thereto. Additionally, the memory 120 can store any other appropriate data, such as VPN applications, firmware logs and policies, firewall policies, a security or access log, print or other reporting files, as well as others.

While illustrated within the integration platform 102, memory 120, or any portion thereof, including some or all of the particular illustrated components, can be located remotely from the integration platform 102 in some instances, including as a cloud application or repository or as a separate cloud application or repository when the integration platform 102 itself is a cloud-based system. In some instances, some or all of memory 120 can be located in, associated with, or available through one or more other systems (e.g., carrier system 104 or agents 108). In those examples, the data stored in memory 120 can be accessible, for example, via one of the described applications or systems.

Workflows 124 can be stored within a persistent repository such as memory 120 as CSV files within a database or other format. In some implementations, workflows 124 are received or defined by carrier systems 104 and transmitted to the integration platform via network 138. Workflows 124 include sequencing data 126, or a sequence of operations necessary to complete an application or enrollment in an insurance policy. The sequencing data 126 can define a particular order in which questions are to be asked, parameters are to be input, or analysis/risk assessments to be performed. Workflows 124 further define input parameters 130, which can be questions that are to be answered during the application process. In some implementations, the input parameters 130 include verbatim questions to be presented in GUI 118 during the application process. The input parameters 130 can include requests for information about the customer, their history, desired coverage, or other parameters (e.g., market activity, economic measures, etc.). Input parameters 130 can further include reflexive questions, or data to be obtained in a follow-up after an initial application is complete. For example, if a customer is identified as "high-risk" based on a medical condition, additional reflexive questions (e.g., "how long have you been in remission?", or "are you currently taking any medication for the condition?") can be presented to the customer or agent.

Workflows 124 additionally include one or more evaluation rules 128, which are used in determining whether or not a particular application associated with the workflow is to be approved or rejected. In some implementations the evaluation rules 128 include underwriting rules, acceptable risk levels, and other associated functions used to process an application and determine whether or not to approve.

Workflows 124 can be stored as objects (e.g., JSON, Avro, MongoDB, or OData objects) or scripts, and can each have a unique reference or name. If a workflow is used to generate an application, it can be locked within database 122 and therefore immutably stored. If future modification or edits to a workflow 124 are desired, a new version, or entirely new workflow 124 must be created, thus preserving the originally locked workflow 124 for future analytics or audits.

Database 122 can further include one or more software development kits (SDKs) 132 which can be accessed to develop additional software or programs for integration platform 102. For example, a GUI SDK can be provided, to allow users of the carrier systems 104 or the agents 108 to develop and deploy updated or personalized versions of GUI 118. SDKs 132 can also enable third party systems to provide increasingly complex workflows 124 and evaluation rules 128 for processing by the integration platform 102.

One or more generated applications 134 can be stored in database 122. These applications can be generated based on the workflows 124 and can be new, partially completed, or completed. In some implementations, when an application is generated, it is stored as a generated app 134 with a locked (e.g., immutable) version of the workflow 124 from which it was generated.

The application generation engine 114 can be a software application that is executed by the processor 112 at the integration platform 102 or remotely from the integration platform 102. In general, the application generation engine 114 consumes one or more workflows 124 in order to generate a digital application 134 to be completed by a customer using a client device 106 or an agent operating a carrier system 104. The application generation engine 114 can generate applications by using the sequence of operations or sequencing 126 from a workflow to arrange a number of questions, queries, or requests. In some implementations the sequencing 126 is used to determine a number of questions to present to the customer (e.g., via GUI 118) in order to get inputs to one or more input parameters 130. Additionally, some input parameters 130 can be satisfied by the application generation engine 114 by, for example, querying various external resources and services 110. For example, if a particular customer that the application is being generated for is known, the application generation engine 114 can query one or more credit bureaus to establish a customer credit score, and provide the credit score, as well as the customer information as input to one or more input parameters 130.

In some implementations, once the application generation engine 114 begins generating an application from a workflow 124, the application generation engine 114 can trigger the integration platform 102 to "lock" the workflow 124, or store the workflow 124 immutably, preserving the workflow 124 in the state in which it was used to generate the application 134.

Once generated, the digital application 134 can be transmitted to a carrier system 104 or a client device 106 for completion via network 138 using interface 136. The interface 136 is used by the integration platform 102 for communicating with other systems in a distributed environment—including within the system 100—connected to the network 138, e.g., client device 106, and other systems communicably coupled to the illustrated integration platform 102 and/or network 138. Generally, the interface 136 comprises logic encoded in software and/or hardware in a suitable combination and operable to communicate with the network 138 and other components. More specifically, the interface 136 can comprise software supporting one or more communication protocols associated with communications such that the network 138 and/or interface's 136 hardware is operable to communicate physical signals within and outside of the illustrated system 100. Still further, the interface 136 can allow the integration platform 102 to communicate with the client devices 106, carrier systems 104, and/or other portions illustrated within the integration platform 102 to perform the operations described herein.

Network 138 facilitates wireless or wireline communications between the components of the system 100 (e.g., between the integration platform 102, the client device(s) 106, etc.), as well as with any other local or remote computers, such as additional mobile devices, clients, servers, or other devices communicably coupled to network 138, including those not illustrated in FIG. 1. In the illustrated environment, the network 138 is depicted as a single network, but can comprise more than one network without departing from the scope of this disclosure, so long as at least a portion of the network 138 can facilitate communications between senders and recipients. In some instances, one or more of the illustrated components (e.g., the Application evaluation engine 116, the memory 120, etc.) can be included within or deployed to network 138 or a portion thereof as one or more cloud-based services or operations. The network 138 can be all or a portion of an enterprise or secured network, while in another instance, at least a portion of the network 138 can represent a connection to the Internet. In some instances, a portion of the network 138 can be a virtual private network (VPN). Further, all or a portion of the network 138 can comprise either a wireline or wireless link. Example wireless links can include 802.11a/b/g/n/ac, 802.20, WiMax, LTE, and/or any other appropriate wireless link. In other words, the network 138 encompasses any internal or external network, networks, sub-network, or combination thereof operable to facilitate communications between various computing components inside and outside the illustrated system 100. The network 138 can communicate, for example, Internet Protocol (IP) packets, Frame Relay frames, Asynchronous Transfer Mode (ATM) cells, voice, video, data, and other suitable information between network addresses. The network 138 can also include one or more local area networks (LANs), radio access networks (RANs), metropolitan area networks (MANs), wide area networks (WANs), all or a portion of the Internet, and/or any other communication system or systems at one or more locations.

An application evaluation engine 116 is used to evaluate completed applications. Completed applications can have some, or all of their input parameters 130 satisfied, and are then evaluated by the application evaluation engine 116 in accordance with one or more evaluation rules 128 as defined in the workflow 124 from which the application was generated.

In some implementations, the application evaluation engine 116 returns an "approve" or "disapprove" or otherwise binary decision based on each generated application 134. In some implementations, if the application evaluation engine 116 is unable to immediately approve an application, it can evaluate the sequencing 126 and evaluation rules 128 of the associated workflow 122 and transmit reflexive questions, or queries for additional input parameters 130 to the client device 106, carrier system 104, or external resources and services 110. For example, if an application is initially denied because of a pre-existing medical condition, the application evaluation engine 116 can query a medical record from an external resource 110 and determine additional medical information in order to further assess the application. In some implementations, the application evaluation engine 116 evaluates applications automatically, without human or user input. In some implementations, the application evaluation engine 116 records logic associated with its decisions for future audit or review by human operators.

A referral engine 117 can be used to manage interactions between the client device 106, carrier system 104 and integration platform 102. The referral engine 117 can receive customer information that was obtained by an agent 108 via the carrier system 104, and generate a referral token, uniquely identifying a particular application and agent associated with the application. The referral engine 117 can further call other software within and outside of integration platform 102. For example, the referral engine 117 can call application generation engine 114 to process a workflow and generate an application upon request from the carrier system 104. In some implementations, the referral engine 117 generates tokens and universal resource locators (URLs) that include the token, in order to permit the customer (via the carrier system 104) to directly access a digital application without separately logging in. For example, the integration platform 102 can verify the authenticity of the carrier system 104, and generate a token based on that verification. The customer, using that token can be assumed to be working in cooperation with the carrier system 104 and need not be separately verified. In some instances, the integration platform 102 can pre-fill the digital application using provided customer information (e.g., from customer accounts 150). When the carrier system 104 or client device 106 accesses the provided URL, it will access a page with the pre-filled or pre-populated application present.

The referral engine 117 maintains a token database 135 which can include a plurality of generated tokens. In some implementations, each token in the token database 135 includes a status (e.g., active, pending, complete, rejected, etc.) and is associated with a particular customer and a particular agent. In some implementations, once an application is complete, its associated referral token is immutably stored along with the generated application and workflow in database 122.

An event sourcing engine 119 can maintain and track applications and policies that have been issued in a manner that permits audits and troubleshooting, and preserves any historical changes to policies over time. The event sourcing engine 119 maintains an event ledger 137, which records an original policy and any changes made to that policy as events or transactions. In contrast to merely updating and overwriting policy changes, the event sourcing engine 119 creates a new event for each policy change, where the event is a transformation of the policy. By maintaining an event ledger 137, the entire history of any particular policy is recorded and verifiable. For example, if a customer or an agent wishes to change an active policy to add an additional beneficiary, such a change request message can be sent to the integration platform 102. The integration platform 102 can authenticate the message (e.g., via credentials, tokens, or other means) and then the event sourcing engine 119 can process the message. In some implementations, the message contains a current state of the policy, and one or more transformations or mutations to the policy. In some implementations, the message further contains a desired end state of the policy. The event sourcing engine 119 can verify the current state of the policy before implementing the desired transformation or mutation.

The event sourcing engine 119 verifies the current state of the policy in the change request by accessing the event ledger 137, and applying all previously performed events to the original policy. If the current state of the policy generated based on previous events in the event ledger 137 matches the current state of the policy in the change request message, the current policy state is verified and the event sourcing engine 119 proceeds to apply the change request, modifying the policy into the desired state. Upon completion, the event sourcing engine 119 records the change request in the event ledger 137 as a previously performed event. In implementations, each previously performed event in the event ledger is given a sequential number or identifier, allowing for some or all of the events to be re-preformed in the correct order on the original software object or policy. Events or change request can be, but are not limited to, requests to add new information, delete information, modify information, or manipulate metadata related to the object.

One or more carrier systems 104 can be systems associated with insurance providers that are communicably coupled to network 138. The carrier systems 104 can provide integration platform 102 with workflows 124 defining necessary elements for a digital application. In some implementations, upon approval of a generated and completed application by the integration platform 102, the integration platform 102 notifies the associated carrier system 104, which finalizes the process of establishing insurance coverage.

External resources and services 110 as described above can provide additional information to the integration platform. This information can include, but is not limited to, medical history, credit reports, personal details (e.g., address, billing information, family information, etc.), or public information (e.g., weather forecasting, economic information, etc.). In some implementations, the external resources and services 110 are search engines, or online databases/repositories upon which the integration platform 102 can perform queries. In some implementations, the external resources and services 110 host application programming interfaces (APIs) to allow the integration platform to access their respective provided services.

The carrier system 104 can be a system operated by an agent, or third party user, who assists customers in navigating the life insurance process. The carrier system 104 includes one or more processors 142, which can be similar to, or different from processor 112 as described above. Additionally, the carrier system 104 communicates via an interface 140, which can be similar to, or different from interface 136 as described above.

The carrier system 104 can include a memory 146 that stores a carrier database 148. The carrier database 148 can include a plurality of customer accounts 150, which contain customer profiles detailing that customer history 154 and medical information 156.

An application processing engine 144 can receive digital applications from the integration platform 102 and query the carrier database 148 in order to complete, or partially complete the digital application. Additionally, the application processing engine 144 can transmit the digital application, or a partially complete digital application to an associated client device 106 for customer completion. In some implementations, when a digital application is transmitted from the integration platform 102 to the carrier system 104, it is transmitted with a custom token and URL to provide authentication to the customer, as well as referral credit to the agent operating the carrier system 104. This process is described in further detail below with reference to FIG. 2B.

Client device 106, in some instances, can be a desktop system, a client terminal, or any other suitable device, including a mobile device, such as a smartphone, tablet, smartwatch, or any other mobile computing device. In general, each illustrated component in FIG. 1 can be adapted to execute any suitable operating system, including Linux, UNIX, Windows, Mac OS®, Java™, Android™, Windows Phone OS, or iOS™, among others. The client 106 can include one or more specific applications executing on the client device 106, or the client device 106 can include one or more Web browsers or web applications that can interact with particular applications executing remotely from the client device 106, such as the GUI 118, application generation engine 114, and application processing engine 144, among others.

Generating Workflows

Figure 2A:
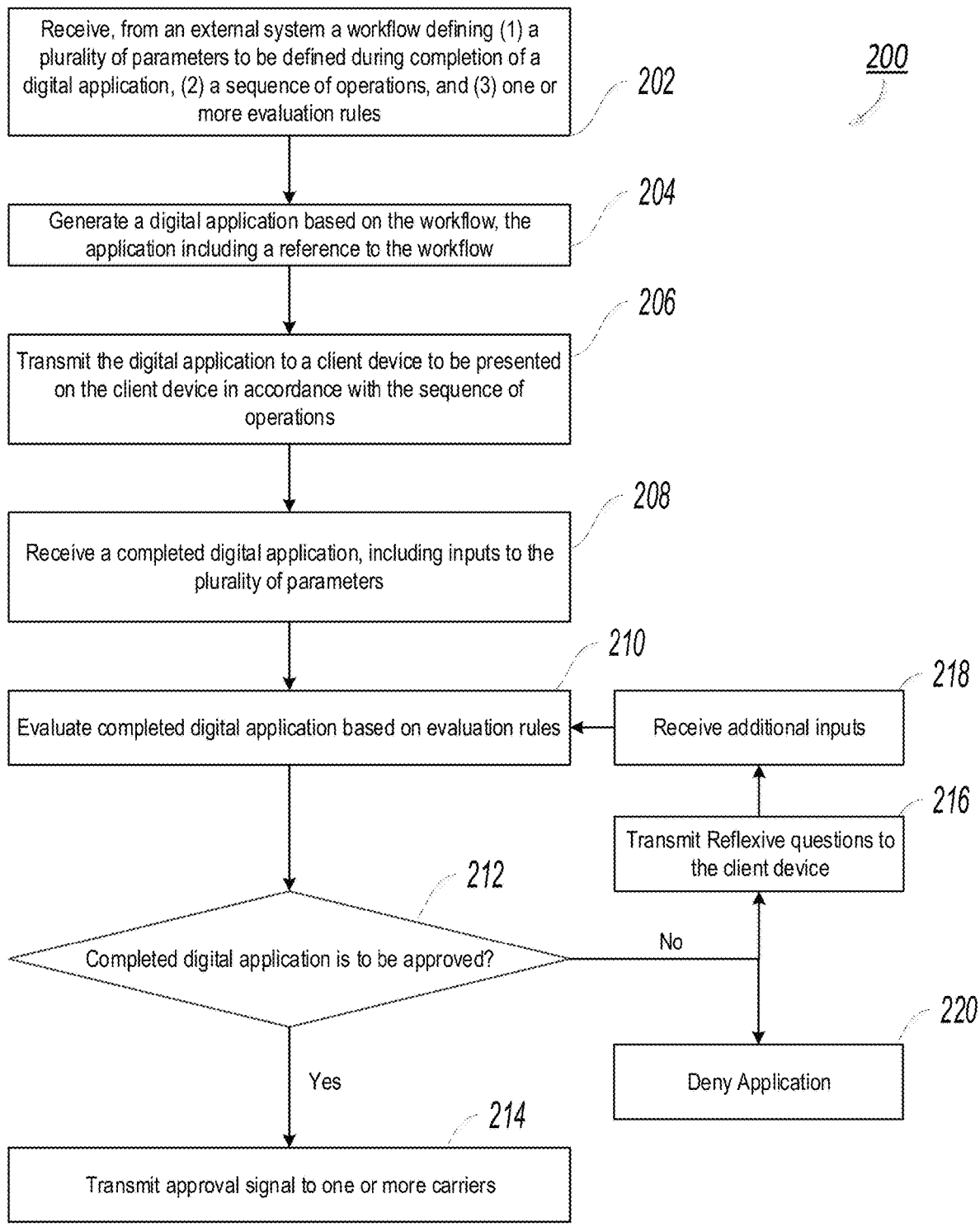
FIG. 2A is a flowchart illustrating an example process for generating and consuming workflows.

FIG. 2A is a flowchart illustrating an example process 200 for generating and consuming workflows. Process 200 can be performed, for example, by system 100 as described with reference to FIG. 1. However, it will be understood that process 200 may be performed, for example, by any other suitable system, environment, software, and hardware, or a combination of systems, environments, software, and hardware as appropriate. In some instances, process 200 can be performed by the integration platform 102, or portions thereof, described in FIG. 1, as well as other components or functionality described in other portions of this description. In other instances, process 200 may be performed by a plurality of connected components or systems. Any suitable system(s), architecture(s), or application(s) can be used to perform the illustrated operations.

At 202, an external system (e.g., carrier system) sends a workflow to the integration platform. The workflow defines a plurality of parameters to be defined during completion of a digital application, a sequence of operations, and one or more evaluation rules. The parameters can be personal information regarding an application (e.g., name, date of birth, medical history, etc.) and other parameters such as price, term, external factors (e.g., weather, federal interest rate, population, population density or other socioeconomic factors), or other information. The sequence of operations can define a particular order or sequence in which the parameters are to be presented to the user, and can include one or more decision trees, or reflexive/conditional inputs that are required depending on responses to other parameters. The evaluation rules can define algorithms and methods for processing a completed application, and can, for example, identify an acceptable threshold of risk, or generally whether or not a particular application should be approved or denied.

At 204, a digital application is generated based on the workflow. The digital application will include a reference indicating the workflow from which it was generated, and will have a number of prompts or questions for a user to respond to in order to complete the digital application. In some implementations, the digital application is generated in order to be presented in an interactive GUI, and a subset of the parameters in the workflow define how the GUI is to be presented (e.g., the format, color, font size, etc.).

At 206, the digital application is transmitted to a client device to be presented in accordance with the sequence of operations. In some implementations, the sequence of operations defines a number of pages or views, and a specific order in which they're to be presented to the customer. In some implementations the digital application is transmitted to an agent system, where the agent, in communication with the customer, completes the application, providing inputs to the plurality of parameters. The digital application can be transmitted via a network as a software object. In another instance, a link or URL is transmitted to the client device or agent system, which uniquely gives access to the digital application and GUI that is hosted on the integration platform.

At 208, a completed digital application is received at the integration platform. The completed digital application includes inputs to the plurality of parameters, which can be answers to questions or prompts, data collected from external systems, or acknowledgments and signatures, among other things. In some instances the completed digital application is only partially completed, and process 200 proceeds to 210 to perform a partial evaluation before returning to 206 for further input.

At 210, the completed digital application is evaluated based on the evaluation rules in the associated workflow. The evaluation can include execution of algorithms based on the responses, a risk assessment, and application of machine learning techniques to identify whether the application is below an acceptable risk threshold. The algorithm used for assessments can vary between different workflows. Each workflow defines its own set of rules to execute. These rules may produce information about the applicant's risk level, eligibility, coverage limitations, the need to ascertain more information either from the customer or external data sources. The risk classifications allowed are defined on the workflow.

Each workflow can define a unique set of rules, such as underwriting rules. The collection of rules forms a Ruleset. A Ruleset is run against the answers provided and information gathered from a customer and from other external sources, such as information vendors, to produce attributes and parameters used to run processes corresponding to the Ruleset. For example, for underwriting, the workflows include a Ruleset that the underwriting process uses when evaluating the information provided for the policy application. The underwriting process can use the Ruleset and the information to produce underwriting attributes, such as risk classes, eligibility, coverage limits, etc. The attributes are then used with the information to produce an underwriting outcome.

At 212, a determination is made whether the application is to be approved. If the application is approved, process 200 proceeds to 214. If an approval assessment is rendered, the pricing service uses the prices defined in the workflow to produce the rates table. The rates table defines the coverage allowed for each product the customer is approved for, and the corresponding premium.

At 214, once the application is approved, the integration platform can transmit an approval signal to the external system that defined the workflow. The external system can be one or more carriers who are offering insurance policies. Upon receipt of the approval signal, the external system can begin the business process of establishing insurance for the approved customer.

Returning to 212, if the application is not initially approved, process 200 can proceed to 216, where additional information is required. The integration platform can transmit reflexive questions to the client device in order to obtain additional input. In some implementations, the integration platform can further query other external systems in addition to, or instead of transmitting reflexive questions.

At 218, Additional inputs are received, either from the customer, agent, or external resources and services, and process 200 proceeds to 210 where the application with additional inputs is re-evaluated.

At 220, when the digital application is denied, and it has been determined that no further information is necessary (e.g., all relevant additional questions have been responded to, or the application will be denied regardless of additional input) the digital application can be denied. In some implementations, a denied signal can be transmitted to the external system in order to notify the carrier that a customer has been rejected.

Maintaining Security and Agent Referrals

Figure 2B:
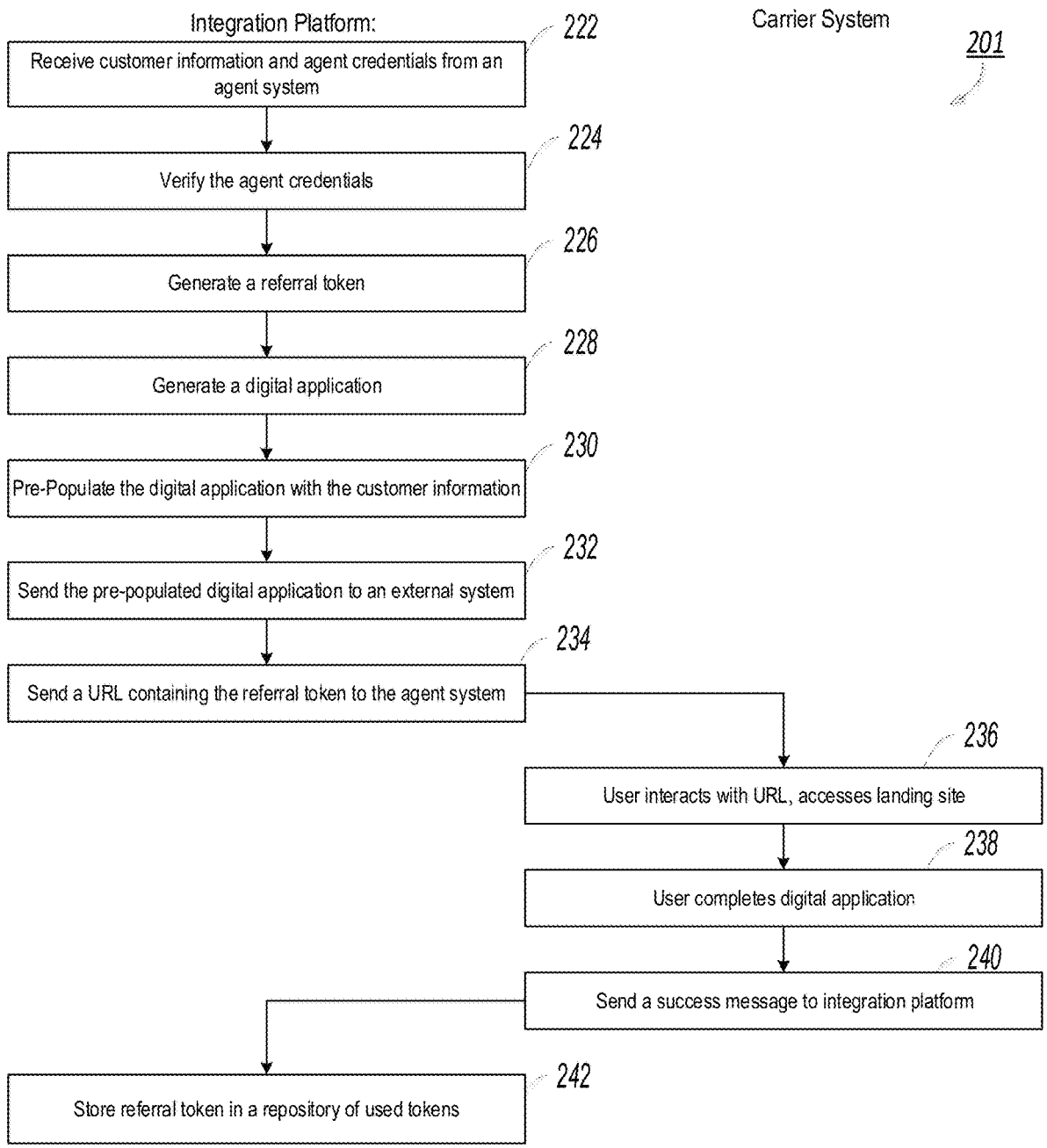
FIG. 2B is a flowchart illustrating an example process for maintaining security and referrals with an agent system.

FIG. 2B is a flowchart illustrating an example process 201 for maintaining security and referrals with an agent system. Process 201 can be performed, for example, by system 100 as described with reference to FIG. 1. However, it will be understood that process 201 may be performed, for example, by any other suitable system, environment, software, and hardware, or a combination of systems, environments, software, and hardware as appropriate. In some instances, process 2012 can be performed by the integration platform 102, or portions thereof, described in FIG. 1, as well as other components or functionality described in other portions of this description. In other instances, process 201 may be performed by a plurality of connected components or systems. Any suitable system(s), architecture(s), or application (s) can be used to perform the illustrated operations.

At 222, customer information and agent credentials are received from an agent system. The agent system can be operated by an agent who establishes contact with the customer and guides the customer through the application process. The agent can record information from the customer and provide the information and his or her credentials to the integration platform for processing.

At 224, the agent credentials are verified. In some implementations, the agent credentials include a username and password, and are checked against a database of authorized users (e.g., approved agents of carriers or the integration platform itself). In some implementations, the credentials are encrypted for additional security. For example, the credentials can include a digital signature, which the integration platform can verify to ensure authenticity. In some implementations, the agent credentials, or a portion thereof, can be encrypted using asymmetric encryption. For example, the agent username can be encrypted using a private key associated with that agent, and verification can include decrypting the username using the public key associated with the agent. This ensures that the entity providing the credentials has access to the agent's private key, and is therefore, presumably the agent.

At 226, a referral token is generated. The referral token can include one or more random or pseudo-random strings, and be generated using information associated with the agent and the customer. The referral token can uniquely identify a landing site designated by the external system (e.g., a carrier system) for completing a digital application.

At 228, the integration platform generates a digital application based on a workflow defined by the external system. In some implementations, the digital application is generated using a process similar to process 200 as described above with reference to FIG. 2A.

At 230, the generated digital application is pre-populated or pre-filled by the integration platform using the customer information provided by the agent system. In some implementations, the application can be further populated from other external sources (e.g., external resources and services 110 as described with reference to FIG. 1).

At 232, the pre-populated digital application is sent to the external system, which can host it at the website or as a web application.

At 234, the integration platform generates and sends a URL including the referral token to the agent system. The URL with the referral token can point directly to the pre-populated digital application that is hosted by the external system. In this manner, the customer or agent can interact with (e.g., click, tap, or otherwise select) the URL to be directed to a web application including the pre-populated digital application, and complete the application.

At 236, at the external system the user interacts with the URL and accesses the landing site defined by the external system (e.g., carrier system). The landing site can be a web page or web application, and can include a GUI, or present a remotely hosted GUI such as GUI 118 as described above in FIG. 1.

At 238, the customer, or an agent assisting the customer completes the digital application via the landing page. It should be noted that the customer or agent did not necessarily need to log in a second time, as their unique URL with the token was pre-verified and authenticated by the integration platform.

At 240, upon completion of the digital application, the external system sends a success message to the integration platform. In some implementations the external system sends a message regardless of whether the application is approved or disapproved. In some implementations the message simply indicates that the URL has been accessed and the token is used.

At 242, the integration platform stores the referral token in a repository of used tokens. In some implementations a status of the token can be set to "used". In some implementations, the token is associated with a timer or a lifespan, and automatically becomes "used" or "inactive" after a predetermined time period (e.g., 15 minutes, 1 day, 1 week, etc.). In some implementations, the token is stored with a reference number indicating the particular agent that established the referral, as well as the workflow used and customer information.

Overview of Life Insurance Policy Creation and Distribution Obstacles

At the outset, an applicant may be resistant to considering obtaining a life insurance policy because of the value perception of the relationship between the price of the life insurance coverage versus the benefit derived from the policy. Most other insurance types generally allow an applicant to derive some benefit during the policy life (i.e., health and casualty insurance claims are common). Life insurance generally offers the applicant no such benefit since the premiums paid into the policy will not yield a benefit payout until death.

One method that may be used to raise the perceived value is a feature called "return of premium" that stipulates that under certain conditions, a large portion of the premium for the policy that has been collected over life of the policy is returned to the applicant if claims filed against the policy are lower than the premiums paid in. For example, a 10-year level term life insurance policy may have a rider that stipulates that at the end of the 10-year period all of the premium paid into the policy minus an administration fee would be paid back to the applicant if no death claim is filed before the expiration of the term.

Other obstacles for life insurance may include a myriad of reasons for rejection when application for a policy is made. A first example reason for a rejection is the underwriting process. A person might not be approved when their application is submitted to a traditional insurance carrier that uses traditional underwriting rules. Underwriting is typically performed by human underwriters responsible for evaluating the risk and exposure of potential policy holders. The underwriters decide whether to accept the risk and insure an applicant and if so how much coverage should be allowed as well as the premiums for such coverage.

An underwriter's role is to protect the company by measuring risk exposure and either denying coverage altogether in the riskier situations or insisting on a higher premium. Each insurance company has its own set of guidelines for these underwriters. As part of the underwriting process for life insurance, medical underwriting may be used to examine an applicant's health status (other factors may be considered as well such as age and occupation). The factors that insurers use to classify risks are generally objective, related to the likely cost of providing coverage, practical to administer, consistent with applicable law, and designed to protect the long-term viability of the insurance program. The underwriters may decline the risk or may provide a quotation in which the premiums cover the cost of the determined risk for an applicant and/or which exclusions are stipulated. Such stipulations restrict the circumstances under which a claim would be paid.

Depending on the type of insurance product or line of business, insurance companies may use automated underwriting systems to encode these rules, and reduce the amount of manual work in processing quotations and policy issuance. This is especially the case for certain simpler life or personal lines of auto or homeowner insurance. Some insurance companies, however, may rely on agent third-party administrators (TPAs) to underwrite for them.

The rules used in these underwriting processes result in millions of people that cannot be served and is particularly true with the current state of the art related to online life insurance systems. The rules used by these systems will generally exclude broad classes of applicants by answers to questions that, for example, place the applicant in a group such as private pilots, immigrants, HIV patients, and similar higher risk categories. Some members of these higher risk groups could be served by evaluating mitigating factors in their application (e.g., length of policy term, education/training, other positive lifestyle factors) and by using new technical strategies to provide ongoing evaluation of the applicant. Any such attempt to use these factors requires a new approach to underwriting the policies.

As mentioned above, toward the goal of serving a broader range of applicants, the difficulty with getting some groups underwritten is compounded by the difficulty of raising the perceived value of those that can be underwritten such that they understand the benefit of the insurance policy in relation to what it is going to cost them.

Procedural roadblocks also contribute to life insurance policies being delayed or rejected. There are many procedures required to enroll applicants into a process that culminates in the underwriting discussed above. These procedures are typically arduous for potential customers. With many insurance carriers, it is common for a human agent to be involved such that the agent attempts to persuade a potential customer on the idea behind the policy and its associated benefits. Additionally, an agent may help get the forms filled out (usually manually), submit an application to the underwriting department of an insurance carrier, help with the collection of appropriate medical health state evidence, and generally functions as a "go between" for the applicant and the insurance carrier. There are several disadvantages with this approach, which may lead to additional friction for the purchase of the policy. For example, the time it takes to successfully complete all of these steps can be cumbersome as the process can take weeks to complete.

The "high touch" and long sales cycle has an impact on agents selling focus. Life insurance has not traditionally been available online, and if so is used primarily as a lead generating source for agents. Agents are motivated to sell as high a face value product as possible as their commissions are tied to premium amounts. Smaller face value products are often not worth their time. Thus the industry has developed products and processes targeting higher net worth and affluent individuals, leaving the middle market largely ignored.

Also, the quality of information that is received from the customer by the agent varies significantly from agent to agent and insurance carrier to carrier. To solve some of the issues associated with the agent's involvement, the industry has promulgated various online services in an attempt to lower the friction. Many of these services involve web sites that either provide a method to receive a quick quote or provide a single step process. The quick quote may involve a process with a small number of questions followed by a solicitation for the applicant to enter into a more formal process to apply, which may involve a call from an agent. This method still suffers from many of the same issues described above and generally involves the same type of underwriting.

A single step process may support binding a policy that completes in one web session in, for example, a few minutes. However, a single step process involves a complicated flow (e.g., many questions and often time requiring a follow up medical exam) and thus still maintains substantial friction. Furthermore, a single step process also may use a cursory underwriting procedure to achieve the speed of delivery. However, such a procedure eliminates many potentially qualified applicants, which leads to a vast potential of underserved clientele as mentioned above.

To summarize, a reason millions are uninsured centers on the fact that a large percentage of applicants are "knocked out" of the application process early in consideration due to answers they provide during initial questioning about things like their occupation, health, citizenship/residency status, and hobbies. Another reason this group is underserved is that the cost of the insurance is perceived high (regardless of actual price) because there is no benefit to the purchaser of the policy unless the insured actually dies (unlike almost all other forms of insurance where there is almost always a tangible benefit during the life of the policy and its owner).

Additionally, this underserved market tends to also be undereducated about the insurance benefit and therefore lacks motivation related to the benefits of the insurance.

In order to tackle the goals of knocking fewer applicants, increasing a perceived benefit of insurance itself, and educating the target market, a new online platform is described herein that can service more efficient and accurate product development, distribution channels, underwriting procedures and customer experiences.

General Overview

Described herein is a platform encompassing software applications that is designed to run in various configurations. In some implementations, a web service provides for customer interaction with an application via user devices such as desktop computers, smartphones, tablets, and the like. This web service may include a set of pages, which may retrieve and display for user interaction contact information about an insurance company, education information (related to the company, its products, and the industry), access to the enrollment process for the products, and for returning visitors, access via a stored account to information associated with his history with the company and any associated insurance policies.

Figure 3A:
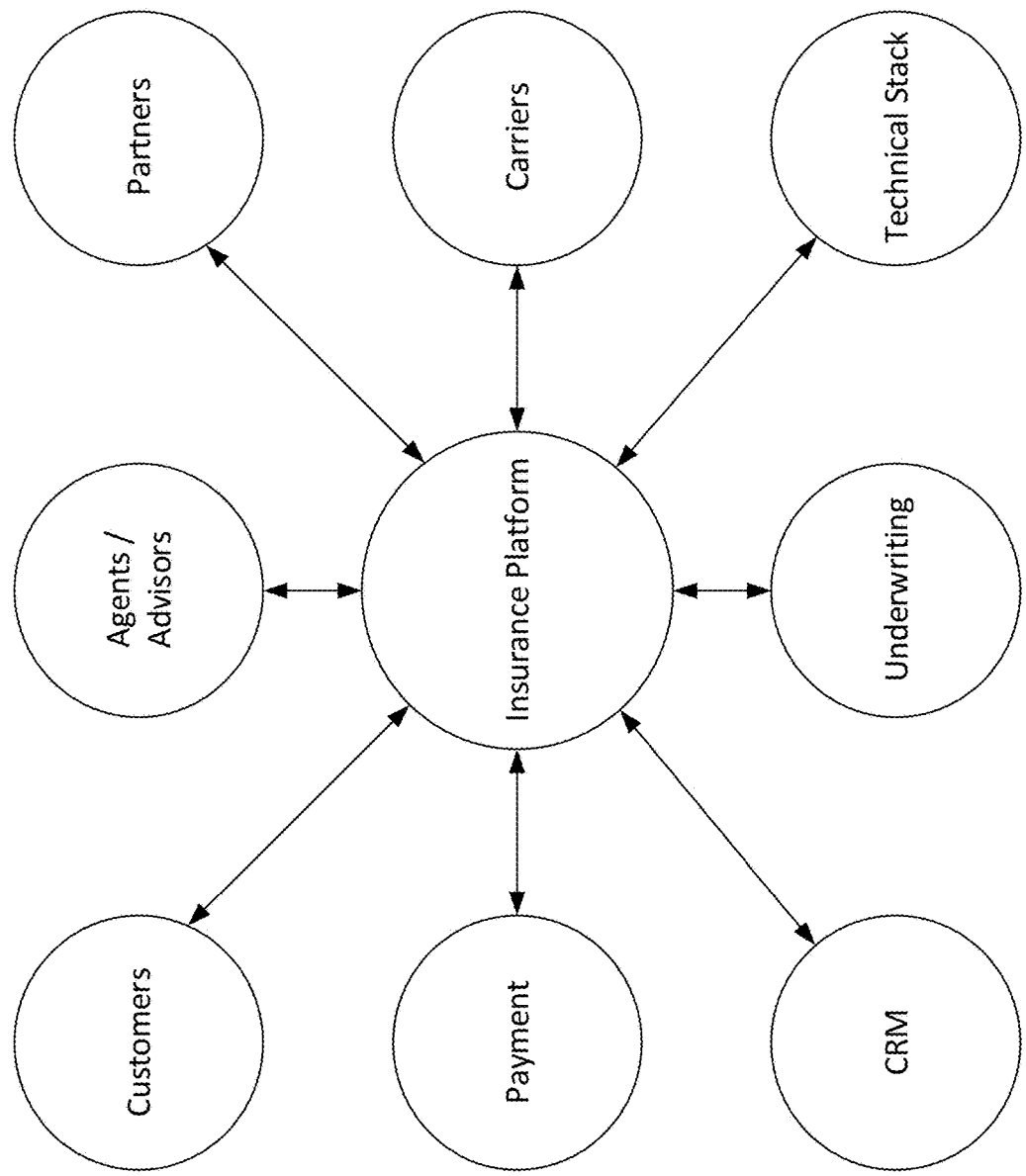
FIG. 3A is a high level diagram of the entries with which the described platform may interact in accordance with embodiments of the present disclosure.

FIG. 3A is a schematic diagram illustrating an overview of the entities that the insurance platform described herein can interact with in accordance with embodiments of the present disclosure. The insurance platform can include back-end computing functionality supported by hardware servers, cloud-based computing, virtual machines, enterprise systems, networks, and other machinery and software. The core insurance platform can support the interaction and interlinking of a plurality of entities involved in the insurance lifecycle. Among the entities that the insurance platform can interact with include customers, agents/advisors, partners, carriers, payment providers, customer relationship management (CRM), underwriting, and technical stack. Each is described in more detail below.

Figure 3B:
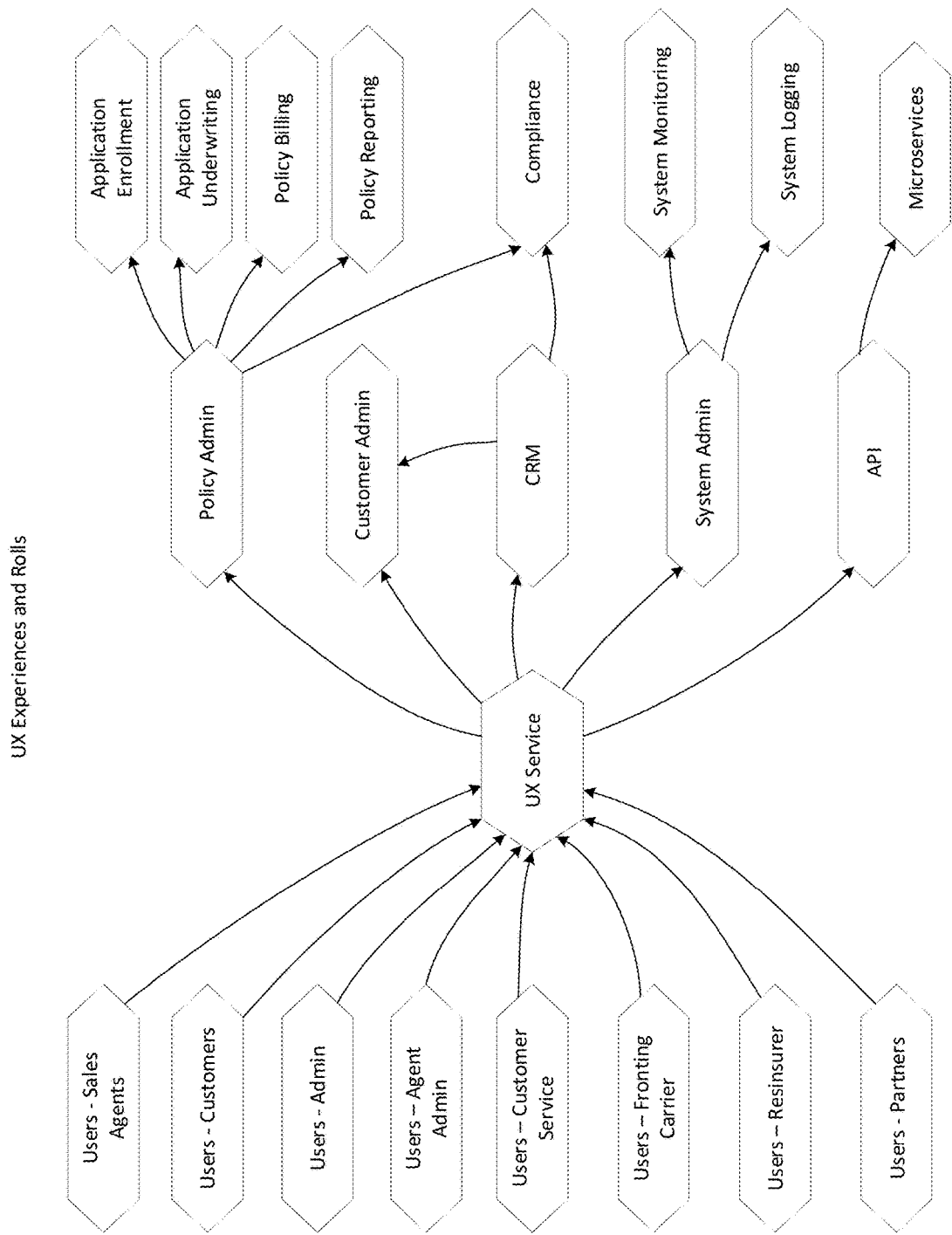
FIG. 3B is a schematic diagram of the user experience in accordance with embodiments of the present disclosure.

As shown in FIG. 3B, the platform supports system User Experiences (UX) categorized into various roles, including Customers, System Administrators, Customer Service Agents, Fronting Carrier Agents, Sales Agents, Agent Administrators, Partners, and Reinsurer Agents. All use a common platform UX service that customizes the experience for each user based on these respective roles. Various roles (i.e., Customer, Customer Service Agents, etc.) have access to features in the Policy Administration and Customer Administration services relevant to each role.

The term "user" can take on different meanings. For example, a user can be an insurance customer interacting with the platform user interface (UI) to browse or purchase life insurance. The term user can also mean an agent that is selling insurance that uses the platform to engage with clients. A user can also be a partner that uses the platform to define workflows, define insurance products, authorize agents, use APIs to create various applications, etc. Users can also include customer service representatives, agent administrators, platform administrators, and other entities.

Platform Overview

This disclosure describes a platform that can address many of the friction points of the life insurance application and distribution process described above in an effort to democratize life insurance. A streamlined application process that uses technological advances can support binding a policy that can be completed in less time and reach more people. Implementations of the present disclosure are generally directed techniques delivery of insurance that optimizes a likelihood of a policy transaction. This optimization is achieved via a combination of factors, all working together to eliminate friction involved in the determination and distribution of the policy transaction.

Figure 4:
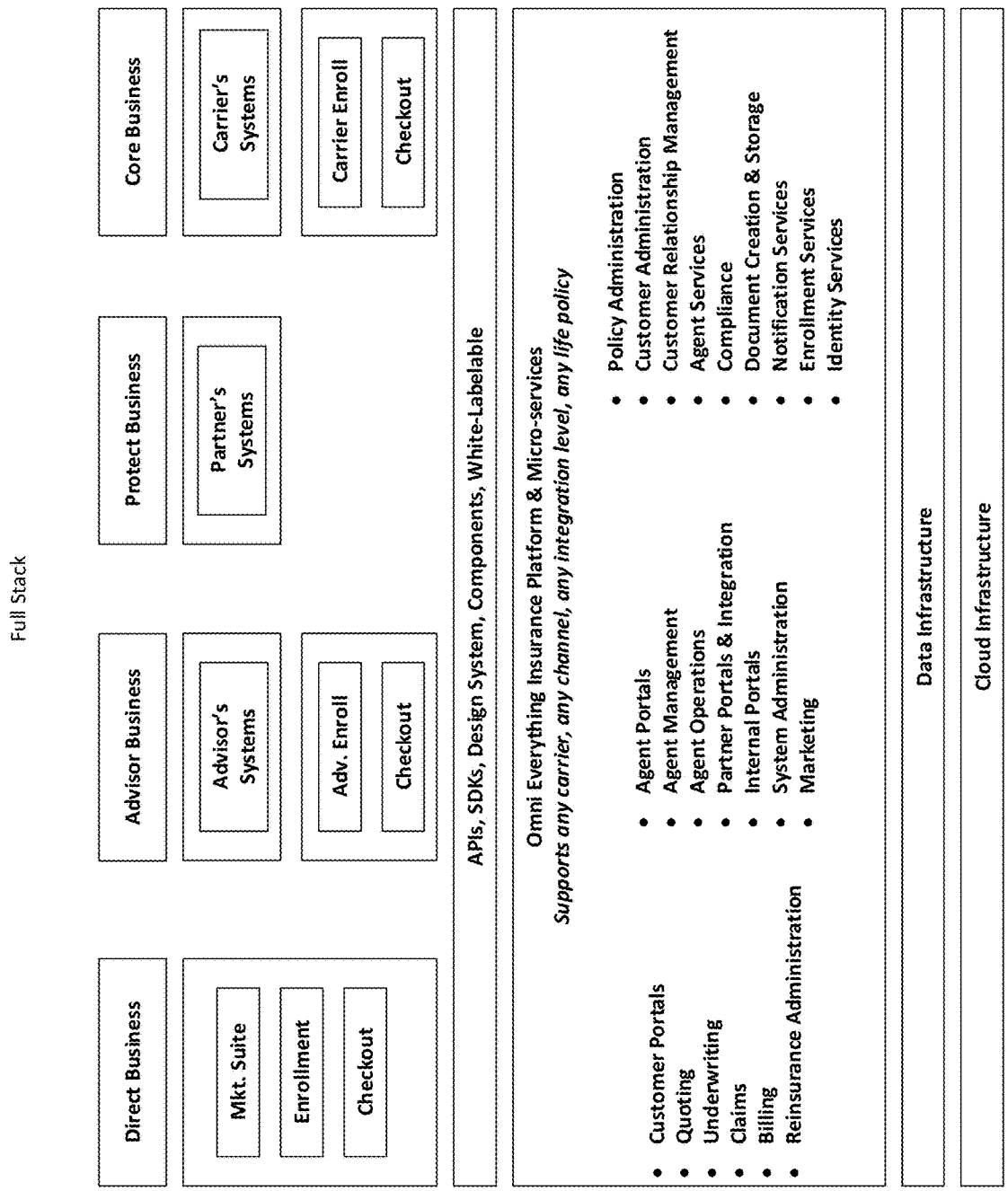
FIG. 4 is a schematic diagram of a full-stack architecture of the life insurance platform in accordance with embodiments of the present disclosure.

FIG. 4 is a schematic diagram of the full-stack architecture of the platform described herein in accordance with embodiments of the present disclosure. The platform utilizes a full-stack architecture. Full stack means the platform will power every facet of the customer journey, from marketing through quote, enrollment, underwriting, purchase, servicing, and claims within a single integrated platform. Designing as a platform means the majority of the code and services are leveraged across all business lines, which at scale becomes a digital life insurance infrastructure for the internet.

The platform described herein supports life insurance enrollment, assessment of risk, policy purchase, policy administration, and life insurance as a service (LaaS). Enrollment generally includes a customer-facing portal supplied by an in-bound channel and data driven applications with a corresponding interface. The platform supports omni-channel sales across several business lines: including direct-to-consumer, agent channels, partner integrations, and enterprise services to carriers. An insurance applicant may come to the platform through one of several in-bound channels, including direct-to-consumer, traditional advisors, and partner integrations. Each of these channels will be described in more detail below.

The technology stack illustrates four example in-bound channels for life insurance policy distribution: direct business, advisor (or agent) business, protect business, and core business. Each in-bound channel can be supported by a portal that allows an entity to interact with the platform to achieve their respective goals. For example, the customer can use the direct business in-bound channel through a customer portal to submit an application for the enrollment process, browse policies, and make purchases.

Regardless of the inbound channel, applicants will fill out an application. With the platform described herein, the application experience is entirely API-driven. The API allows for the questions to be updated and new versions provided without any updates required to user-facing applications. Once the applicant has completed their application, the application is underwritten. Underwriting involves retrieving data about the applicant from a variety of third-party data vendors in order to flesh out the profile of the applicant and then applying a set of custom rules (known as a rule set) to determine the applicant's eligibility for insurance. If the applicant is determined to be eligible, they may then purchase a policy (this process is also driven by API calls. Enrollment is complete after the applicant purchases the policy.

This platform includes services to (1) interact with the service visitor, (2) entice the visitor to enroll via a policy application, (3) collect enrollment data from the visitor, (4) submit the enrollment data to an underwriting service, (5) process the result of the underwriting service to provide an instant quote, (6) provide an immediate purchase opportunity to the visitor for a policy related to the product, (7) accept payment from the visitor for the initial premium of the policy, preferably enrolling him in a recurring billing structure, (8) produce a policy for the visitor to sign, (9) create an account for the visitor that captures all historical interaction between the visitor and the service, (10) provide a login method to said account that allows retrieval of all historical information related to his use of the service and the ability to change pertinent information, (11) provide a machine learning method that improves the underwriting process over time, and (12) provide a customer service and customer training process focused on assuring product quality supported by machine learning functions that improve both customer service and associated education tools over time.

Other features include a refer a friend or family member for a new policy; critical communications; submitting claims online; ability of agents to get a custom, co-branded website for selling and tracking policy sales, marketing, and triggering document updates through only changes, including beneficiary updates.

In an embodiment of the platform, the software application services described above are implemented as discrete micro-services, each of which may be deployed on multiple cloud based hosting platforms. These micro-services include (1) Policy Administration Service, which includes the functions required to support application underwriting, policy billing, policy revision, and policy reporting; (2) Customer Record Service, which includes customer account creation, service access and authentication, and customer account reporting; (3) Customer Relationship Management, which includes problem resolution, customer correspondence, customer relations reporting, and customer outreach/lead redirection; (4) Agent Services, which can handle commissions, sales pipeline reporting, policy attribution, agent access, and agent license tracking; and (5) Compliance, which includes workflow rules organized state-by-state, along with monitoring and reporting associated with activation/application of the rules.

Other micro-services include, but are not limited to, (6) Document Creation & Storage Services, which support the creation of legally binding policy documents; (7) Notification Services, which manages customer communications of policy related events; (8) Enrollment Services, including customer application enrollment, backend services including underwriting; and (9) Identity Services, for creating and storing customer profiles and customer information securely (this can be part of the customer administration service, which also includes a (10) customer record service or Billing Service), and (11) Secure Data Service, etc.

Each of these micro-services provides an Application Programming Interface (API) that is used to support the required interaction among the services. The functions supported by the APIs and the resulting interaction of those functions are used to achieve the primary goal of the elimination of friction. The methods associated with decreasing the knockout rate (gaining a higher percentage of policies issued as a function of applications initiated) is affected by the application underwriting service. This platform improves upon this service by leveraging more real time access to information about the applicant plus access to information learned from the historical data derived from the larger community made up of all prior applicants as well all current and prior policies (customers that were issued policies) and other historical data sources available in the industry.

In embodiments, a Publisher/Subscriber architecture can be used for asynchronous data processing, which facilitates higher throughput by scaling micro-services to fit demand and permitting users to complete tasks more quickly. Software development kits (SDK) can also be used to allow an advisor/agent/partner to quickly build custom insurance application UIs for their customers.

The web service may be deployed in an Internet cloud configuration using a cloud infrastructure such that the service interacts with other services of the software application which provide support functions for policy underwriting, product quoting, product purchase, customer account management, security, and insurance policy management. There are many methods to implement such web supporting services (herein referred to as micro-services). The application and its supporting services can be implemented as one monolithic system running in one service in the cloud. Alternatively, each micro-service function can be spread among many virtual and physical servers in the cloud.

In implementations, services may be implemented with an enterprise network rather than a cloud based service. However, the underlying unique characteristic of the contemplated application does not rest with the method of deploying the service and its micro-services (nor its specific implementation techniques surrounding coding languages, host operating systems, etc.), but rather the underlying logic and database that supports the functions that contribute to the elimination of the friction discussed above.

The platform also makes use of data infrastructure. Data infrastructure can be used to store, maintain, organize, and distribute data for each of the processes described herein. An example includes application data collection for enrollment purposes. The platform facilitates application data collection through data infrastructure and in some cases, workflow technology. This application data collection facilitates the ability to manage several versions of insurance applications for multiple carriers (e.g., via the data infrastructure and workflow technology). In one example, data input by a customer when answering enrollment questions can be stored with metadata so that different enrollment applications from different carriers can be populated using a single data set. The normalization of data supports the development of cross-carrier machine learning models.

System Administration is also described, which includes monitoring, logging, and reporting associated with the use and health of the overall platform. System administration can be performed by platform administrators, third party administrators, help desk and call center staffing, hypervisors, etc.

An administrator is internal staff who interacts with the site with the intent of providing system support and configuration. An analyst is an internal or external staff who have access which allows them access to data views (reports). A customer service representative (CSR) is a staff member who accesses the system with the purpose of providing support to applicants or customers and can act on their behalf. The support portal is a site available to support staff with proper credentials and permissions. The application is a presentation of questions to consumers who may wish to apply for a policy. This includes basic personal information and health information. Agent service representatives can support agents who use the platform.

Machine learning (ML) techniques are employed within the described platform to discern patterns in a determined relationship between an applicant's answers and the resulting mortality. New and/or modified underwriting rules are derived from such learning that the platform is unnecessarily knocking out applicants (discovered by tracking the mortality of that community subsequent to rejected application) and learning that the platform is inappropriately underwriting applicants (discovered by tracking policy claims). As the platform learns, the platform tunes the relationship between rejections and issued policies affecting an increase in overall revenue coupled with lowering costs. This supports lowering premiums, attracting more of the underserved, and issuing policies to a higher percentage of those attracted. Machine learning can also be used in the creation of metadata for data driven applications. For example, if two applications ask the same question but in different ways, the machine learning algorithms can interpret questions to populate answers derived from a single data set.

Figure 5A:
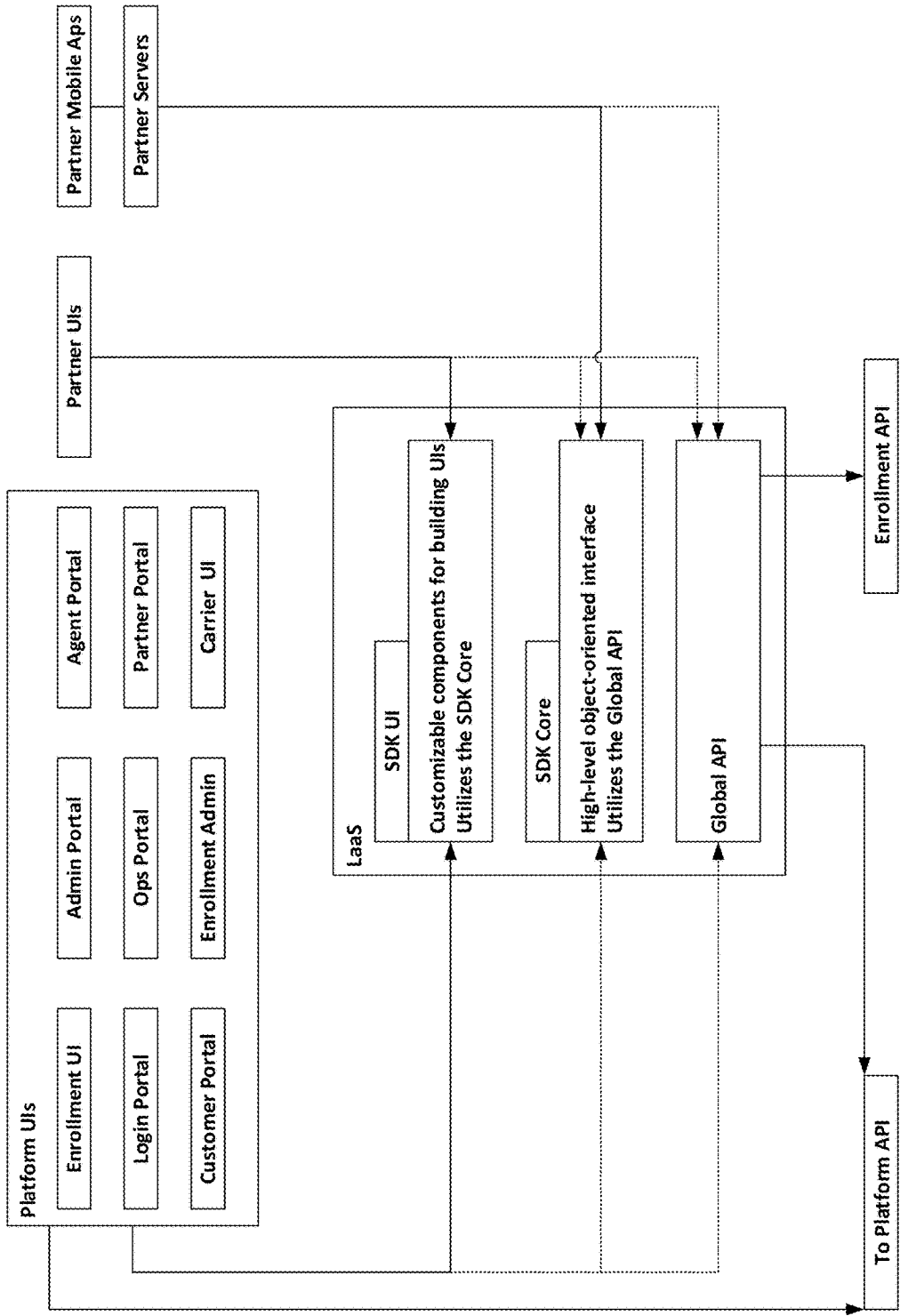
FIGS. 5A-B are high-level schematic diagrams of the life insurance platform in accordance with embodiments of the present disclosure.

FIGS. 3A-B are schematic diagrams illustrating the platform at a high level in accordance with embodiments of the present disclosure. FIG. 5A shows the platform user interfaces (UIs). The platform UIs include: customer enrollment UI, login portal, customer portal, administrative portal, operations portal, enrollment administration portal, agent/partner portal, MT reference application, and carrier UI. FIG. 5A also shows partner UIs and partner mobile applications coupled through partner servers.

In some embodiments, the platform can support life insurance as a service (LaaS). To support LaaS, the platform UIs and partner UIs can interface with a software development kit (SDK) for Us to make use of the SDK's customizable components for building UIs. The SDK for UIs can use the SDK core. The SDK core can provide a high-level object-oriented interface that uses the global API. The partner mobile apps can access the SDK core through partner servers. Each entity can also access the global API. Some carriers may elect to provide many of their own internal services. The platform can offer LaaS so that carriers can pick from among the several features the platform offers.

The platform makes use of LaaS technology, which is also accessible by partners, allowing third-party companies to enroll applicants and present information about their policies through user-facing experiences that they control. In addition to the API, the platform aims to make it as easy as possible for other entities to sell and manage life insurance through the platform, whether that be as a means of digitizing and selling their own policies (for a life insurance carrier) or as a means of offering life insurance from an existing carrier in another product (for example, one that offers renter's insurance). The data-driven API described above goes a long way towards that goal, but the API might deter some agents or partners from engaging due to technical complexity. Therefore, the platform also offers an SDK aimed at providing an easy interface into the API.

The SDK enables not only other entities to, with minimal engineering effort, build an integration that provides life insurance, but also enables platform internal teams to quickly and easily build out white-labeled experiences for entities that do not wish to or cannot devote their own engineering resources.

The SDK aims to support the entire lifecycle of a policy at the platform, including creating a quote, registering a user, filling out an application, validating answers, submitting an application, binding a policy, and retrieving data about or managing bound policies.

The core part of the SDK will be written and distributed independently from any extensions. The core will handle:
  User registration and authentication
  Application creation and retrieval
  Retrieval of and parsing of question sets
  Answering questions
  Switching question sets
  Application submission
  Policy binding SDK extensions can make creating clients even easier. For example, a platform-sdk-react extension could provide customizable components that operate on the platform-sdk-core. The SDK extension can provide a top-level Application component that uses the core to: render the appropriate sections in the appropriate order; render questions in the appropriate order; show/hide questions appropriately; provide buttons for submission, handle saving state, etc.

Separating the core from presentational extensions is critical, because it enables implementations in frameworks other than proprietary ones. It also properly segregates presentational logic from application logic, making it easier to independently evolve one or the other.

Platform UIs can access Platform API that is part of the platform backend. Global API can access the Platform API and Enrollment API at the enrollment backend. Each is shown in more detail in FIG. 5B.

Figure 5B:
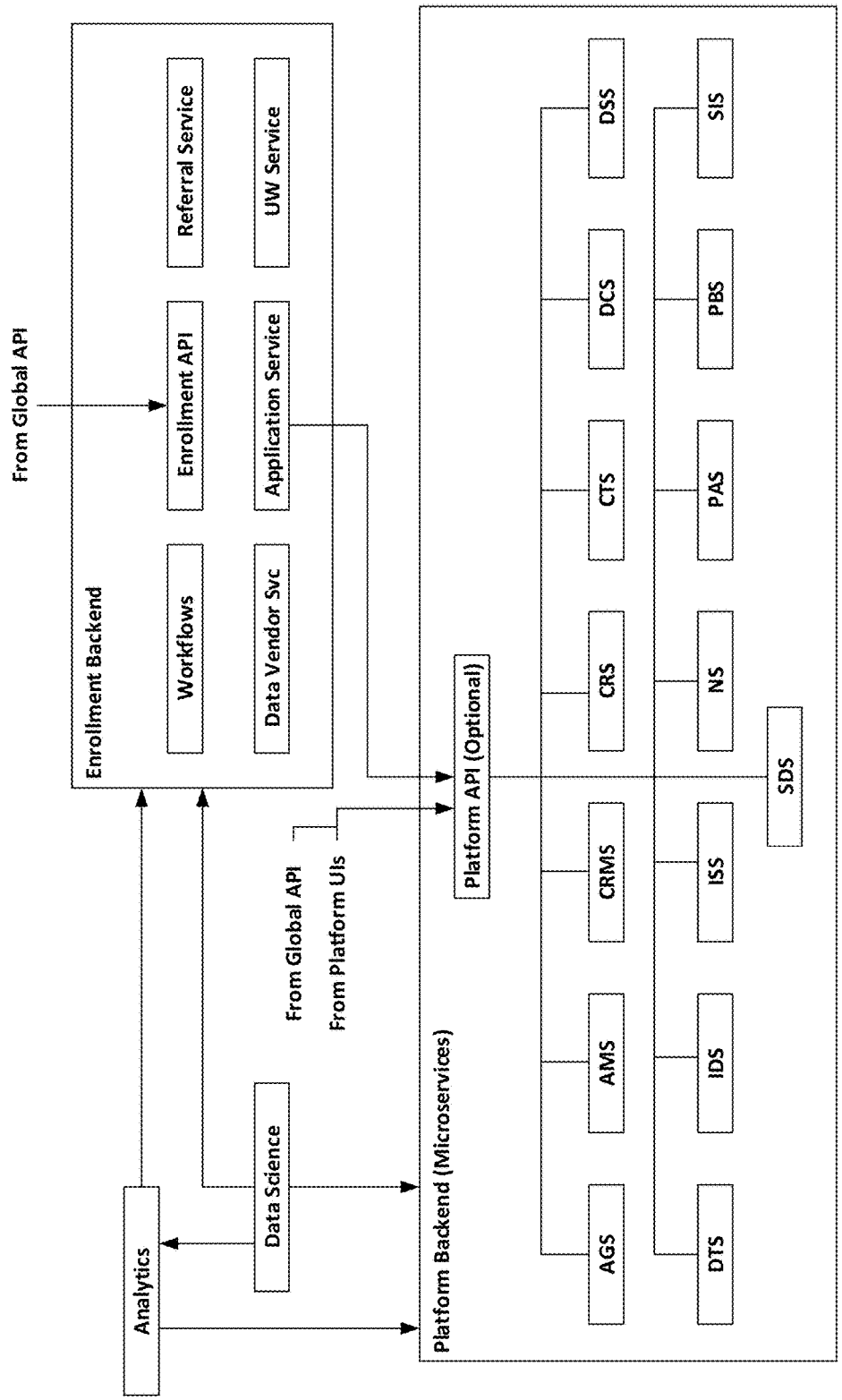

FIG. 5B illustrates a continuation of the overview from FIG. 5A. The enrollment backend can support enrollment of applicants, underwriting, data access, and API. For example, the enrollment backend can provide enrollment API accessible by the global API. The enrollment backend can also interface with data vendors for third party data. The enrollment backend can also facilitate underwriting, either through local algorithms and actuarial models, or through third party underwriting.

Enrollment services include:
  Enrollment service: backend responsible for insurance applications, underwriting, and policy bind initiation.
  Enrollment client: frontend responsible for insurance applications, underwriting, and policy bind initiation.
  Enrollment SDK: typescript library for integration with enrollment.
  Enrollment SDK starter client: starter project for new partners, agents, advisors, etc.

The platform backend can support life insurance policy enrollment and distribution generally using micro services, as described above. The following is a definitions listing of micro-services used by the platform backend:
  Agency Service (AGS): Responsible for managing information for policies sold via an agent, agent commissions, agent access and licensing;
  Authorization Management Service (AMS): responsible to validate policy access by organization code;
  Customer Relationship Management Service (CRMS): Responsible to communicate with external CRM systems, like HubSpot;
  Customer Record Service (CRS): Source of truth system for customer data;
  Document Creation Service (DCS): Responsible for document generation;
  Document Storage Service (DSS): Responsible for storing documents;
  Document Transaction Service (DTS): Responsible for generating accounting reports;
  Notification Service (NS): Responsible for sending notifications (e.g., via third party notification resources, such as SendGrid and LOB).
  Search Service (ISS): Responsible for indexing various type of data and performing fast searches;
  Policy Administration Service (PAS): Source of truth system for administration activities for policies;
  Policy Billing Service (PBS): Responsible for communication with payment vendors services;
  Sensitive Data Storage (SDS): Responsible for tokenizing and storing personal identifiable information (PII) data;
  Simplified Issue Service (SIS): Source of truth for billing groups and simplified enrollment applications.

An additional service includes identity service (IDS), which is responsible for identity management and authorization communications.

Enrollment & Underwriting

Figure 6:
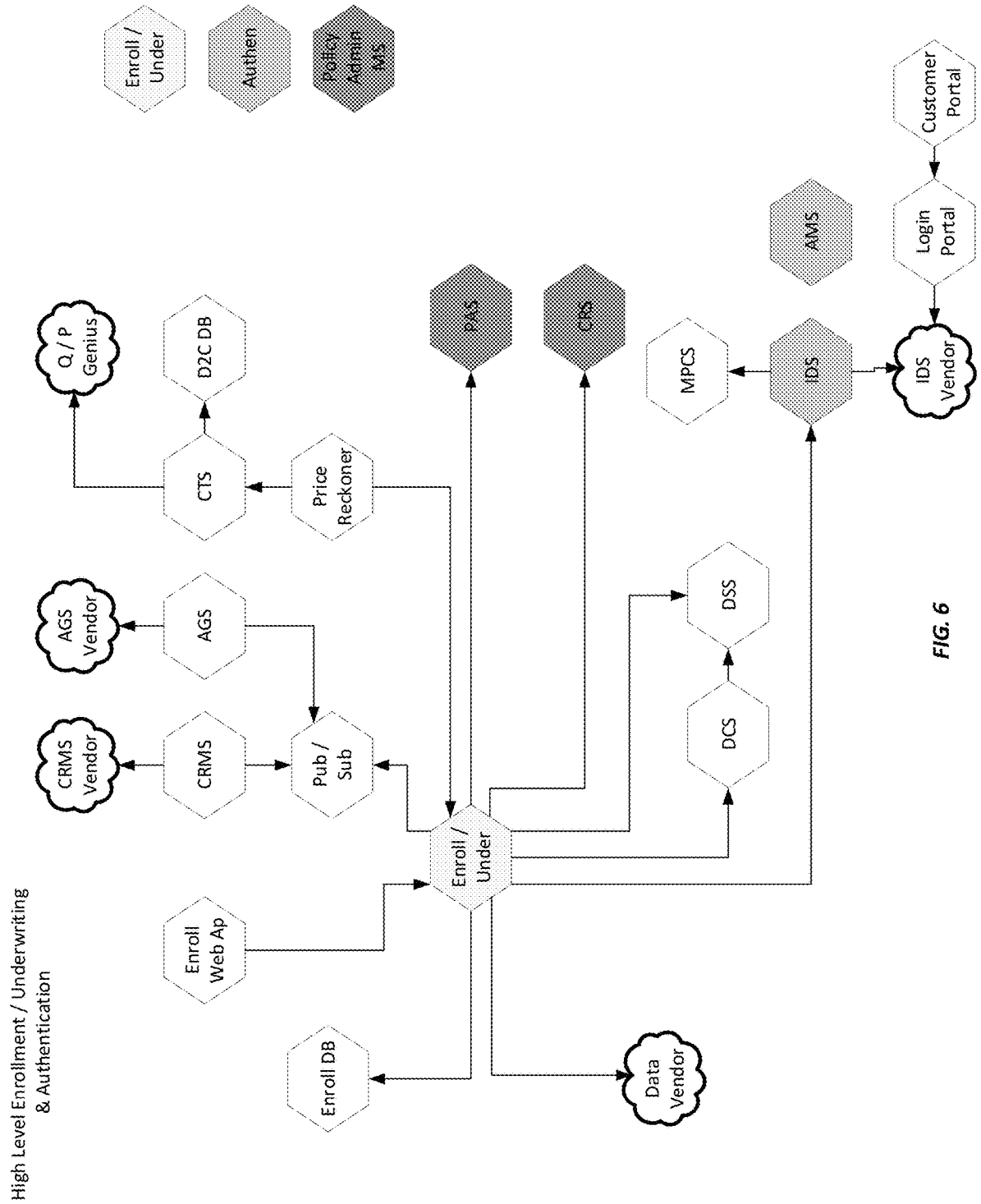
FIG. 6 is a schematic diagram of enrollment/underwriting & authentication in accordance with embodiments of the present disclosure.

FIG. 6 is a schematic diagram of enrollment/underwriting & authentication in accordance with embodiments of the present disclosure. FIG. 6 illustrates example services and micro-services that can be used for enrollment and underwriting, including authentication services.

Enrollment is supported by a web application that is the primary enrollment client for answering questions post-quote as well as underwriting. Enrollment and underwriting can be supported by vendor supplied data about the applicant. Data from application can be stored in the enrollment database. As described herein, data driven processes and data storage are used for various reasons, including answer verification, auditing, and versioning.

Enrollment and underwriting can use DCS and DSS. As mentioned herein, the platform is able to create compliant documents for policy binding as a result of the enrollment and underwriting process. These documents can be stored using DSS.

Various publications and subscriptions can be accessed, including CRMS and AGS services.

Notably, FIG. 6 shows a customer portal and login portal that can be used to access the platform for enrollment. The IDS micro-service can use an IDS vendor to manage login authentication through the portals. The customer portal is a post-enrollment portal for customers to view their policy and documents. The login portal is a standalone portal for authenticating customers. In some embodiments, the platform can support a customer-portal-enrollment that is a standalone enrollment application within the customer portal.

Customer Journey

Figure 7A:
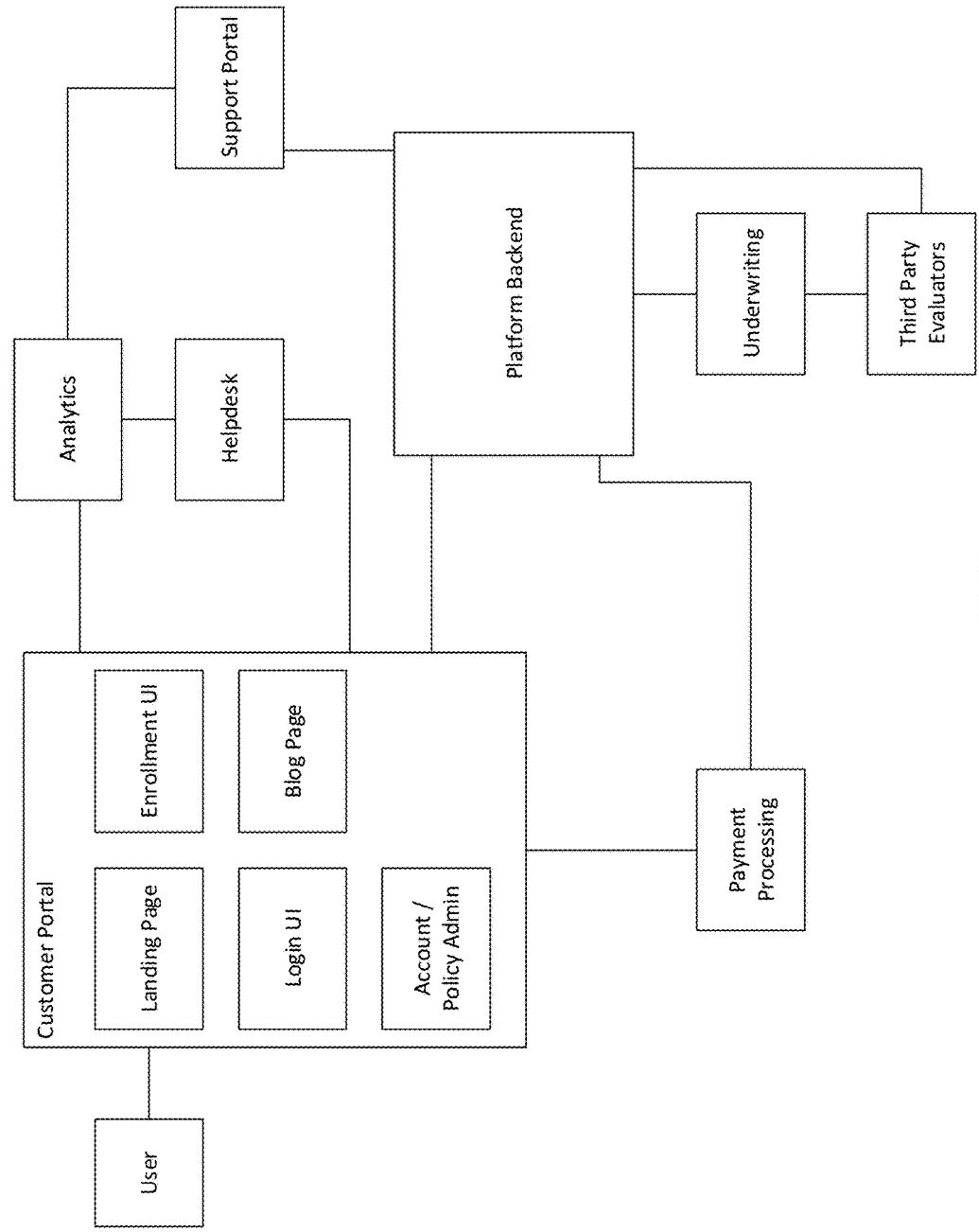
FIG. 7A is a schematic diagram of the customer portal and customer journey in accordance with embodiments of the present disclosure.

FIG. 7A illustrates an example consumer experience using the platform described herein. At the outset, certain terms are defined: a user is a visitor, applicant, or customer of the platform; a visitor is a consumer to the life insurance platform who may browse the site but who has not established a profile, has not yet started an application, or is not already a customer. An applicant is a consumer to the site who has begun the process of applying for a policy. A customer is a returning consumer who has completed the application process, has created an account within the portal, and has a bound policy. The customer portal is a site available to the public to learn about the described system, apply for a policy, and the entry point for policy holders. The customer portal is where customers can log into the site to manage their policies.

In some implementations, the customer portal is the entry point for customers to access various services provided by the platform, including a landing page, a login page(s), a blog page, a support page, an application page for enrollment, account creation page(s), account and policy administration pages, customer profile management, password reset page(s), among others. Each of these services can be handled by different user interface systems. For example, an enrollment micro-service or client can support enrollment through an application UI. The customer portal can be defined and hosted by the carrier. The platform can also be used to host carrier landing pages if the carrier elects to the user the platform as a service.

A visitor to the platform can access the landing page through a web browser or web app. The landing page can provide a high level overview of the platform features. The landing page may present several options. The visitor may be allowed to browse the site, learn about the system's products offers, read articles, and link posts on the blog page, request and interact with support staff or apply for a product. Much of the site content may be static except for the blog, support interactions, and application process. The blog page may be a separate content management system (CMS) (e.g., WordPress) operated to support blog posts. The primary system site may provide the browsing and viewing of blog content within the learn section of the portal without the need to leave the portal site. Support pages may employ a third-party service. Through this service, visitors may submit a form request, view an FAQ and knowledge base and when online agents are available. Visitors can text chat with agents on this page using a text interface. An AI text robot or agent can also be used to respond to questions.

The landing page also offers the visitor an interface to create an account by entering in user names, passwords, personal information, and other information useful for the carrier and the platform generally to provide services for the visitor. The visitor can provide payment information that is verified by a payment processing vendor.

After the visitor has created an account, the visitor can access other features, including completing enrollment. During the application process and at other times during enrollment and policy administration, the visitor can get support through support portal.

Enrollment

Figure 7B:
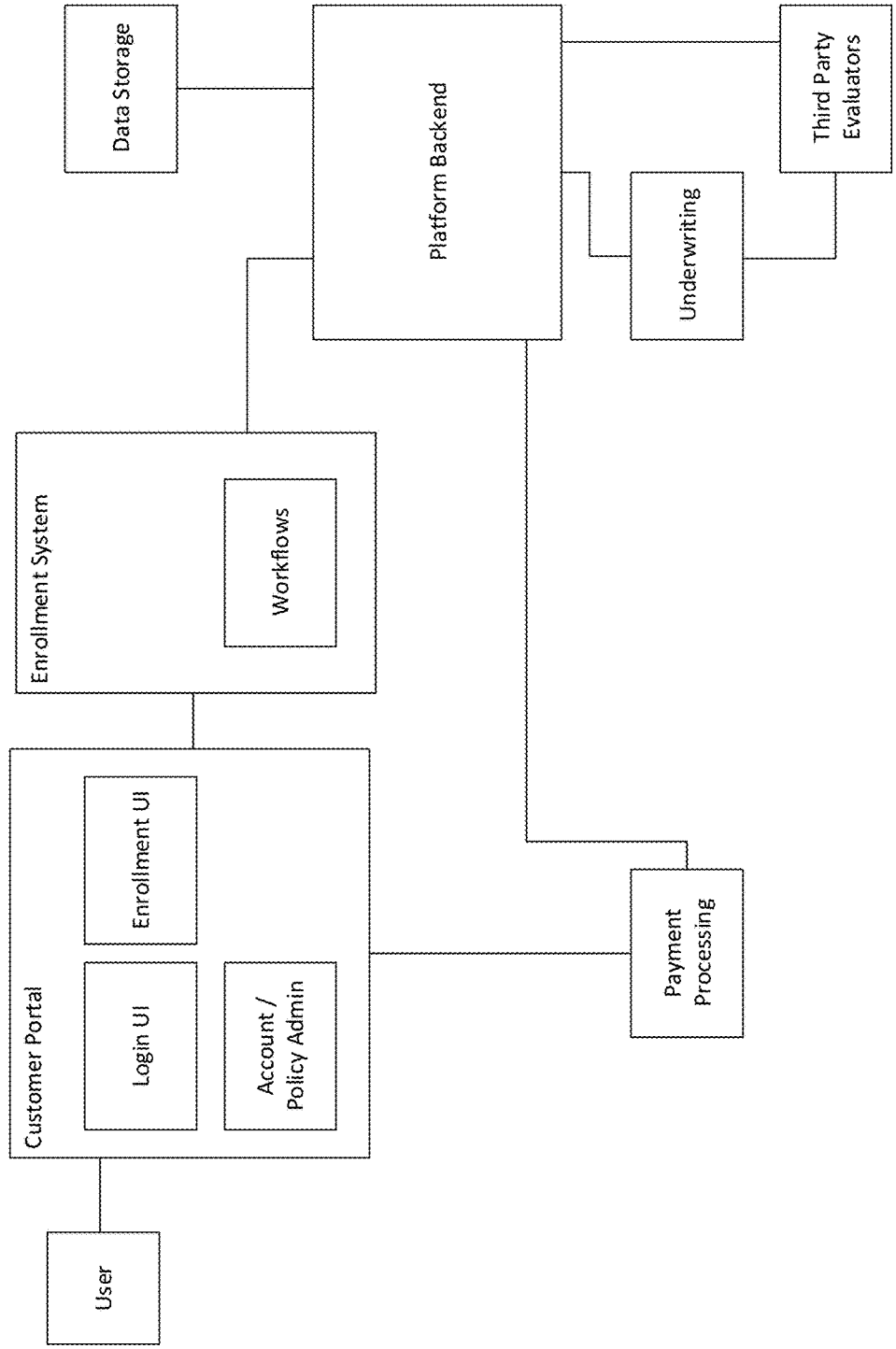
FIG. 7B is a schematic diagram of the customer journey as it involves enrollment in accordance with embodiments of the present disclosure.

FIG. 7B illustrates a customer experience for enrollment in accordance with embodiments of the present disclosure. An enrollment system may be used to apply for a product. The enrollment system can support an enrollment UI that provides an interface for questions and answers for the application process. The enrollment system can keep a record of the applicant's answers in, e.g., a data storage. If the applicant is switching an answer from one value to another, that change can be recorded and highlighted for downstream evaluation purposes. For example, if a question is confusing, then the question can be reformulated so applicants do not provide answers that undermine their chances of getting insured. In some embodiments, AI or other ML techniques can be used to determine whether similar questions are prompting answers that are seemingly different for multiple users. For example, if a question is vague, an applicant might interpret the question to provide a seemingly contradictory answer. If these mistakes occur enough times, the system can identify questions for revision. The purpose here is to avoid scenarios where confusing questions lead the applicant to be left uninsured.

In embodiments, the enrollment process can use workflows to define processes and guide the application process. Workflows are discussed later in this document. The workflows use the concept of immutability of questions, pricing, and rules to ensure an intact application history and the reproducibility of the application process at any point in time. The workflow is a key platform component that enables ease in the creation of new insurance application filings, underwriting, and pricing. This capability eases and simplifies management of multiple insurance carriers and sales channels. Workflows can be stored by the platform backend or the enrollment backend. The application service of the enrollment backend can be the primary consumer of workflows.

Visitor actions may be recorded and the subsequent actions and responses in the application process will be stored and associated to the visitor through account creation where the visitor will become a customer and their actions and recorded transactions may be tied to their specific account for reference and reporting. Until a visitor transitions to a customer (through account creation and supplying an email address and password) there may not be a persistent and unique data field to associate them to capture by the system that would allow them to be specifically identified. To this point, cookie data can be utilized to attempt to track a visitor from first visit and subsequent visits.

However, since cookies are a temporary storage mechanism, there is no assurance of persistence from one visit to another by the same visitor. The presentation of the application questions to the customer may take place in an interactive interview-style in which the system presents a question for the customer to answer. When the customer presents the answer to the question, the system may: validate the entry as a valid, record the question/answer pair, process the answer against a rule to determine the next action which can be: present another question, reject the customer, complete the questionnaire and calculate risk, gather data from a third party aggregator. The application may be grouped into logical sections, these sections will mark progress of the applicant's journey through the application process and allow the navigation back to previously completed sections by clicking on the breadcrumb of a section. However, a user may not be able to jump forward to a section that has not yet been reached.

In some embodiments, referral links can be provided to visitors and applicants and customers. For example, agents can create referral links for customers that have predefined customer/application information.

As mentioned above, an insurance applicant may come to the platform through one of several in-bound channels, including direct-to-consumer, traditional advisors, and partner integrations. The direct-to-consumer channel comprises ad-driven, natural search, referral, and quote affiliate traffic. Quote affiliate traffic is facilitated either through direct API integration or through an embeddable Quote Widget that the platform provides. In either case, query parameters provided with the API request allow the platform to track which policies are sold through which affiliates and to compensate affiliates appropriately.

Direct-to-consumer applicants are directed to the platform's primary enrollment web portal. They fill out an application, determined by the data-driven API described herein, and then if approved, pay directly in the web portal and receive instant coverage. From the point of purchase, they are directed to the client-facing portion of the Policy Administration system.

From quote, all direct-to-consumer applicants are directed to the platform's primary enrollment web portal. They fill out an application, determined by the data-driven API described herein, and then if approved, pay directly in the web portal and receive instant coverage. From the point of purchase, they are directed to the client-facing portion of the Policy Administration system.

Traditional life insurance agents and advisors can use the platform to reach potential customers, provide advice and education, customize front-facing websites or portals, provide life insurance product offerings, populate agency-specific applications, track application progress, manage communications, accept payments, receive and track commissions, etc. APIs are provided to allow agents and advisors to manage customers and policies.

Partners, such as carriers, may integrate with the platform either through experiences that they engineer or through white-labeled portals that the platform creates on their behalf. Either way, these integrations use the same data-driven API as the platform's own direct-to-consumer portal. In addition, the platform provides an SDK to make both internal and external partner engineering efforts significantly easier.

Partner integrations allow non-platform entities to provide a fully featured, white-labeled experience in order to sell life insurance to their customers. the platform's data-driven API allows a number of flexible configurations for this relationship: partners can sell policies from the platform or one of the platform's carriers, traditional carriers can sell their own policies via a white-labeled experience, or traditional carriers can build their own portals utilizing the platform's enrollment and policy tracking technology under the hood.

Figure 8A:
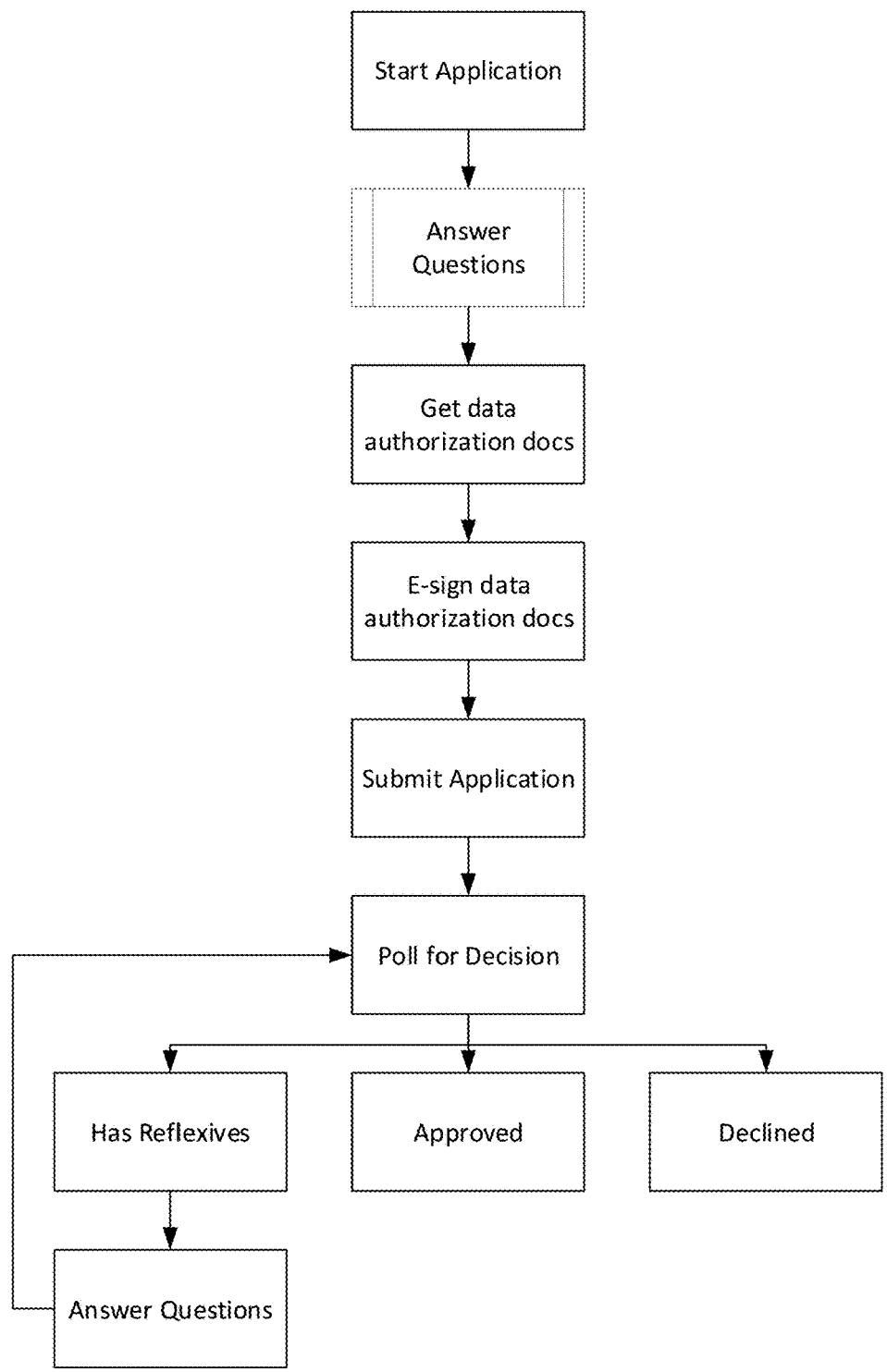
FIG. 8A is a process flow diagram for enrollment in accordance with embodiments of the present disclosure.
Figure 8B:
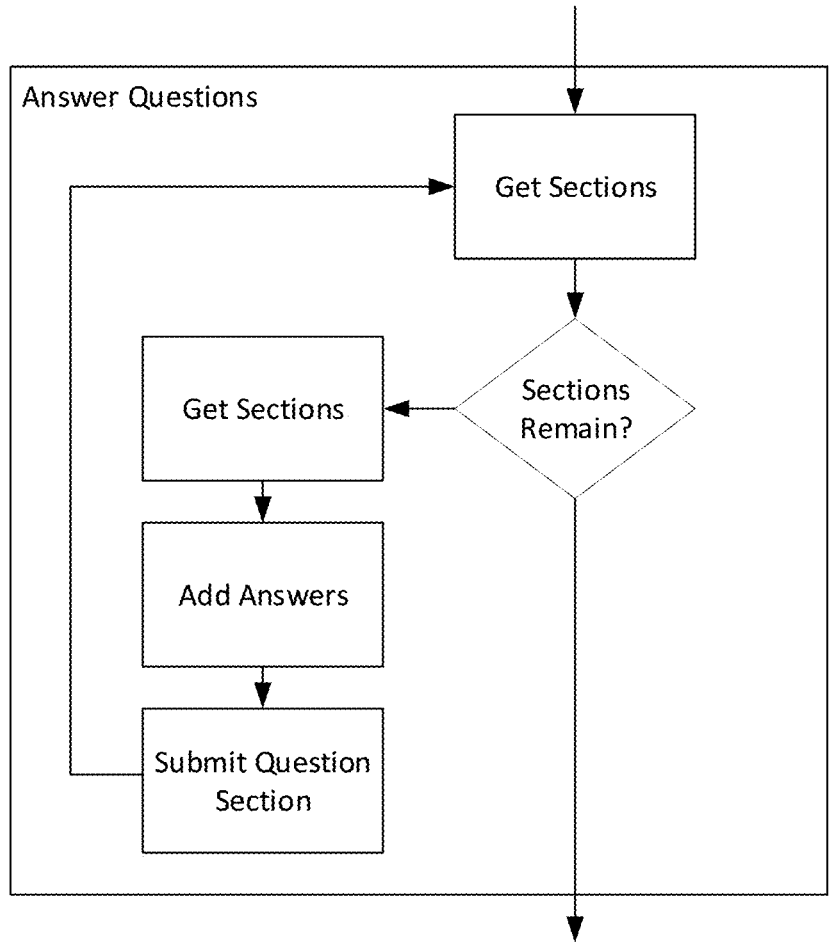
FIG. 8B is a sub-process for answering questions in accordance with embodiments of the present disclosure.
Figure 9:
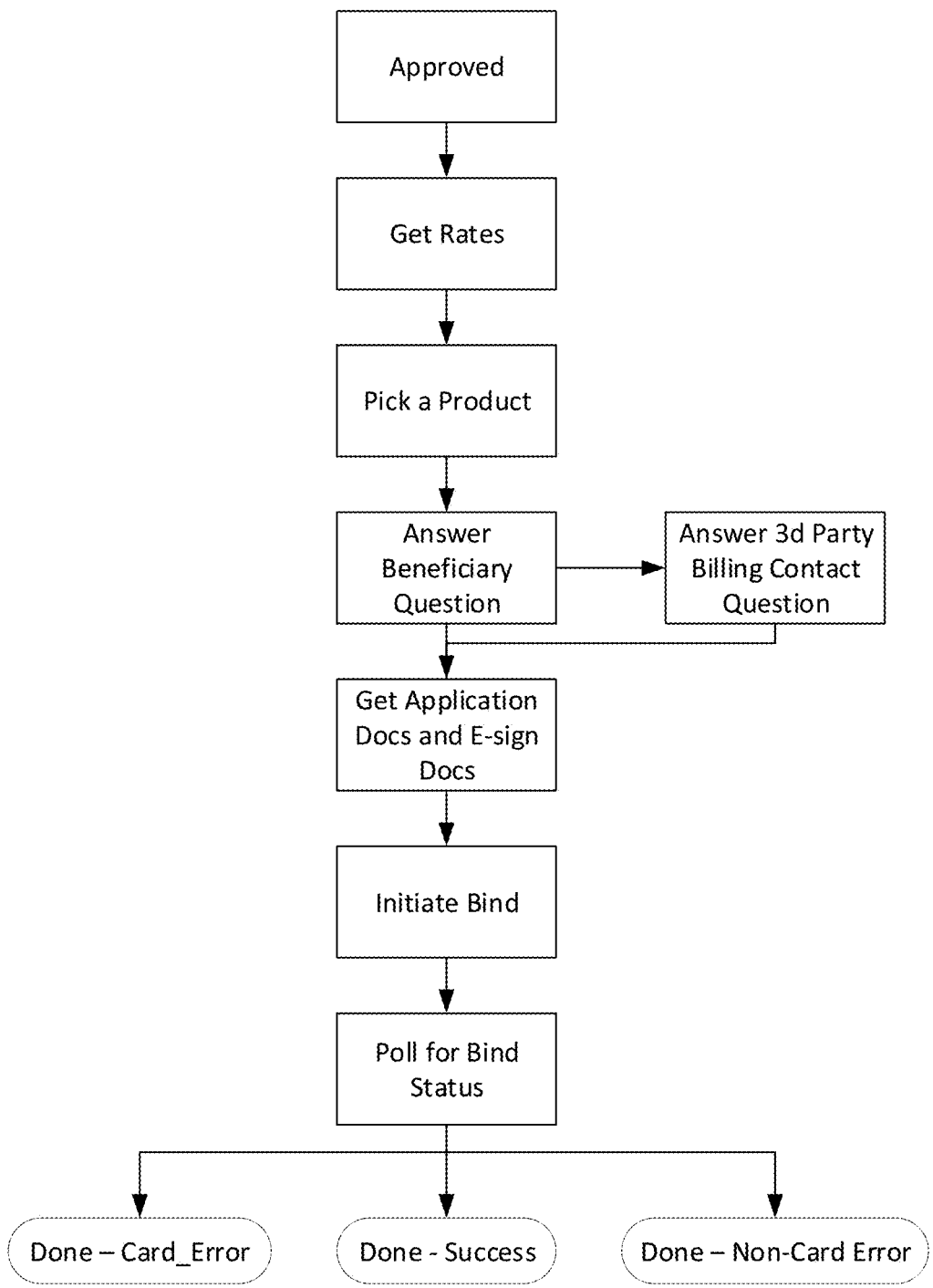
FIG. 9 is a process flow diagram for binding a policy after approval in accordance with embodiments of the present disclosure.

FIG. 8A is a process flow diagram for enrollment in accordance with embodiments of the present disclosure. FIG. 8B is a sub-process for answering questions in accordance with embodiments of the present disclosure. FIG. 9 is a process flow diagram for binding a policy after approval in accordance with embodiments of the present disclosure.

Workflows

The platform supports multiple carriers, each with its own set of rules, designs, products, vendors' agreements, standards, question sets, etc. For each carrier, there needs to be a way to encapsulate the questions and methodologies associated with building an insurance application, processing the application, and binding the application, and do so in an immutable manner.

This disclosure introduces the concept of workflows, which are encapsulations of processes, instructions, questions, and other information that can guide the creation and processing of an insurance application. The workflow contains all of the information that that application service needs to process an insurance application. The workflow can be defined by the carrier or other platform users.

Workflows are "immutable" in that they cannot be changed once locked. Immutable encapsulation of process sets, rules, questions, etc. for use in insurance applications can help with auditing, particularly if an applicant was denied a policy. The workflows can be carrier defined, so specific to each carrier; can add granularity, such as specific to markets, specific to agents, specific to products, etc. In some cases, workflow immutability is applied after the workflow is used once, it is no longer allowed to be changed. This guarantees that when an application is associated with a workflow, the insurance application lifecycle can be evaluated in an historically deterministic way (e.g., how did the insurance application get to whatever status it's currently in). This facilitates and eases internal research, customer queries, and internal/external auditing.

Workflows are carrier defined and modular, so specific to each carrier. The carrier can add granularity, such as specific to markets, specific to agents, specific to products, etc.

A workflow is an encapsulation of carrier-defined insurance application procedures.

A workflow is created using information provided by a carrier. A carrier can define multiple workflows to support different scenarios, products, locations, price points, applicants, etc.

Workflows are consumed by an application service that reads the workflows and makes calls to other services or vendors based on the information in the workflow for the insurance application.

The workflow can define question sets, underwriting rules, timing, instructions, etc.

Workflows are selected prior to the population of an application. Workflows can be selected by a number of ways, including based on applicant preliminary information (the preliminary information can be solicited in part to identify an appropriate workflow); by agent for a carrier; etc.

The workflow is used to:
Create the insurance application for the applicant based on questions defined by the carrier or through another question set selection mechanism (e.g., carrier uses predefined question sets offered by platform service);
Define underwriting rules; define pricing; define risk classes;
Define vendors and vendor call procedure; and
Define overall procedure for the application.
Deterministically identify the lifecycle of any given application.

Workflows are immutable. Once a workflow is defined or used, that workflow is version locked. Changes to the workflow can create new workflows or new workflow versions, depending on how extensive the change is. A new workflow or new workflow version can enter the insurance application lifecycle at any point (depending on the nature of the change). Or the new workflow or new workflow version can be specifically used for new applications that come after it.

Without immutability, Workflows would represent the most current implementation, because the changes would be made in place. Historical verification and rerendering would be extremely difficult. Minor changes in a workflow would cause slight differences in results and it would be unclear to answer things like:
What question did any given applicant see; what was the exact phrasing of the question?
How did an applicant end up with a certain price?
Why do we have information from one data vendor but not another.
Why was one applicant declined while another approved?

Immutability will freeze the lifecycle that is used by the insurance application. This allows the results to be as deterministic as possible. Looking at a historical application, we would be able to definitively explain what processes the application went through. We should be able to send the application back through our systems and yield the same results.

Figure 10A:
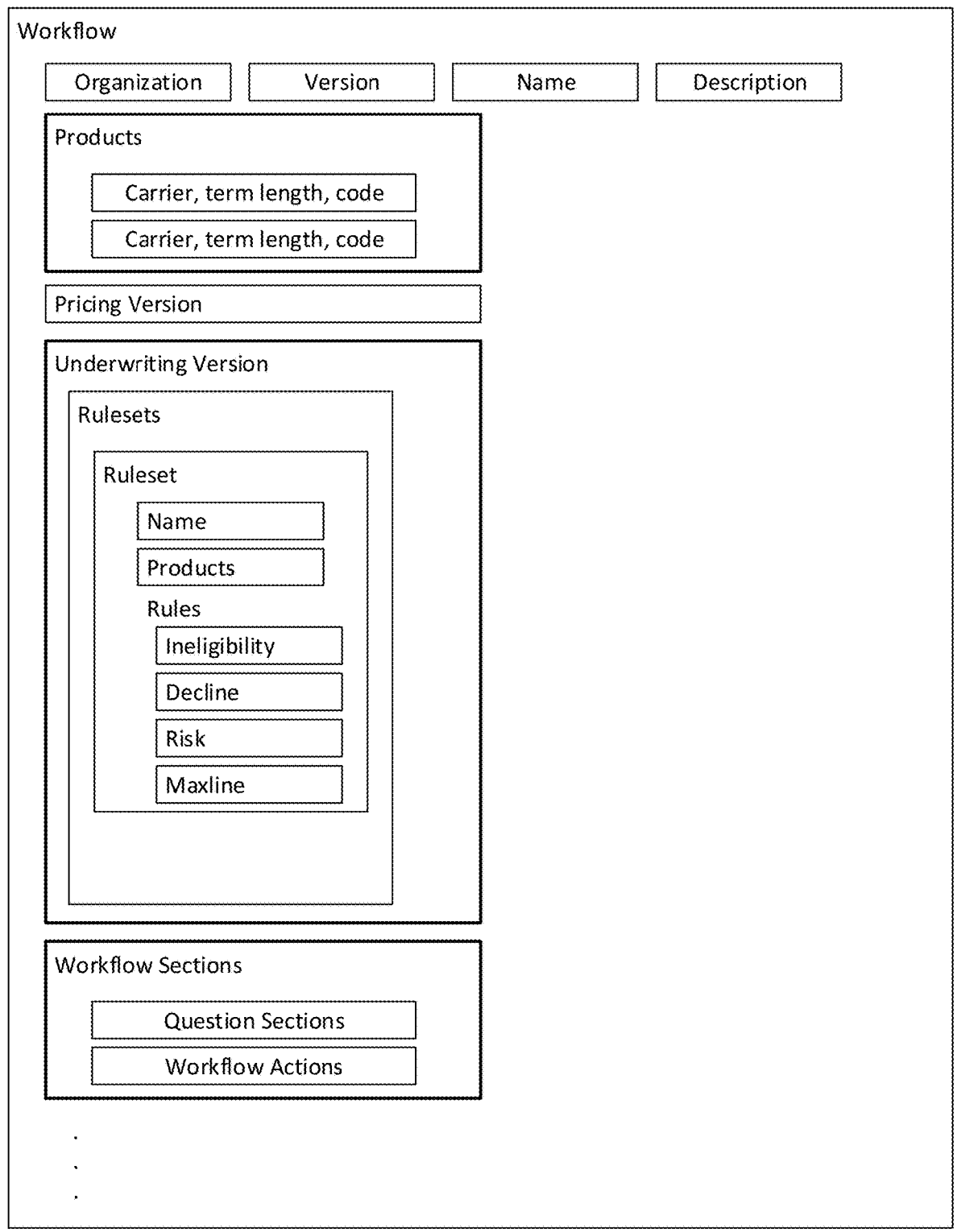
FIGS. 10A-10B are a schematic diagram illustrating a workflow in accordance with embodiments of the present disclosure.
Figure 10B:
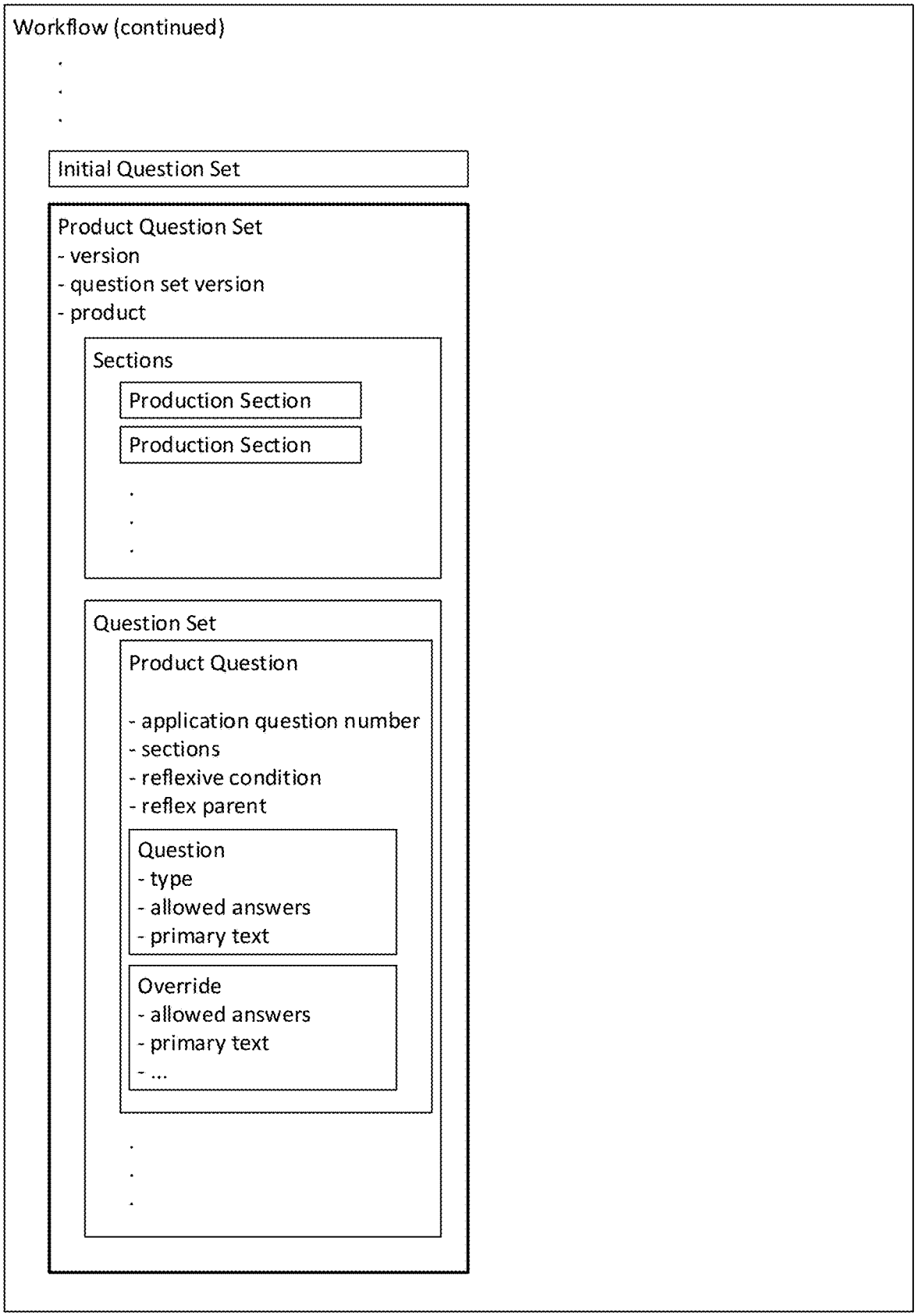

FIGS. 10A-B are a schematic diagram illustrating a workflow in accordance with embodiments of the present disclosure. The workflow can be defined as an encapsulation of the processes, rules, questions, versions, and other critical information that is used for processing an insurance application, from enrollment to underwriting to approval and to binding. FIGS. 10A-B show an example workflow representation. The workflow representation starts on FIG. 10A and continues on FIG. 10B.

The workflow defines the organization, which is who the workflow belongs to. The organization can be a carrier or partner or other organization. The workflow also defines the version number. The workflow is immutable, and changes the workflows either change the workflow entirely or the workflow version. So defining the workflow version allows the system and entities to keep track of the correct version of the workflow. The workflow also defines the products that it is relevant to. The workflow defines the pricing structure to be used.

The workflow defines the underwriting rules that determine eligibility and risk class that underwriting engines can use when evaluating an application.

The workflow also defines workflow sections, which can include question sections and workflow actions, among other user defined sections. These can be different stages of the workflow. A workflow's lifecycle will go from one section to the next. A workflow section can contain multiple Question Sections and can emit a function when started or finished. Question sets are determined by having some information and can change depending on answers to a question. When an insurance application is fresh (even before data is prefilled from quotes or from the referral service) a default question set is established so that any answers can be set.

For example, males and females may have different question sets. If a female person is starting the insurance application, an insurance application is started to establish that a female person is populating an application to set the person's sex. The initial question set may start with a default sex, and the initial question set can be used to change the other question sets based on changes to the default answers to the initial question set.

Product question sets are the relationship between the product and the question set. The question sets are a set of questions that will be asked to the customer filling out the insurance application. A question also defines its set of allowed answers and its text. A question can be a reflexive question, which means it gets asked conditionally, usually to gather more information based on an answer to a previous question.

In addition to allowing data to drive the content and ordering of the questions on an application, the platform has also adopted a data-driven approach to the ordering of application sections, data vendor calls, underwriting rules, pricing, products offered, and all other application events, along with which question sets should be made available to an applicant. These Application Workflow definitions enable the platform to support entirely different application experiences for different carriers, in different states, for different insurance products, and so on. For example, the platform may choose to offer a simplified issue policy, in which a minimal amount of monetary coverage is provided with similarly minimal requirements for data collection, with the applicant only needing to answer one or two questions and with no data vendor information required. Workflows enable this experience to be fully defined at a data level, again exposed through and driven through the API so that clients can avoid hard-coding any information about this flow.

Purchasing a Policy Using Workflows is a 12 Step Process:
Choose a workflow
Start an application
Get question sections
Answer questions including reflexive questions
Submit question section
Repeat steps 3-5 until no question sections remain
E-sign disclosure documents
Submit application
Poll for application status
answer reflexives if necessary (repeat steps 3-5)
Choose beneficiaries, product, coverage amount, and payment information
E-sign application documents
Bind The Enrollment System is built around a one-to-one mapping between applications and products. Each application is designed to offer a single product. This presented a problem for workflow-based applications because workflow-based applications need the ability to offer multiple products using a single application.

Instead of refactoring the Enrollment System to decouple applications and products, the decision was made to rely on the fact that calculate_rates does not respect the application's product for calculating rates. Rates are calculated for every product that a workflow-based application could possibly offer (e.g., 2019 10T and 20T). Also, the underwriting rules and question sets for the 2019 10T and 20T products are similar enough that running underwriting rules for 10T vs. 20T would not result in a different decision in most cases.

The main consequence of this decision is that when the underwriting rules or question sets for the different products begin to diverge, this solution will no longer work.

In some instances, there was a tight coupling in the Enrollment System between applications and users. An application can be designed to be associated with a single user who has full access to that application. A workflow can expose an API to partners that enables them to create applications on behalf of users. Therefore workflows needed to support two flows: A direct-to-consumer flow, where the applicant is applying for insurance directly, and the partner flow, where the partner is applying on behalf of the end user.

The solution that was implemented has three parts:
Create two new tables: entity and application_entity;
Refactor the v2 endpoints to construct the applicant domain object using the new application_entity table instead of the user table;
For the partner flow, designate the partner as the user for each application that the partner creates.

This solution was chosen because it provides consistency between the v2 and v3 endpoints, and it prevents having to overload the definition of a user.

Ineligible and Decline Reasons

It should be possible for a workflow-based application to be approved for a 10T product but declined for a 20T product. But the application_decline_reason and application_ineligible_reason tables do not have columns for product, so using those tables as-is would not be sufficient for capturing which product an application was ineligible or declined for.

Similar to the solution to the application <-> product coupling, underwriting rules and question sets are similar resulting in the two possible products that a workflow-based application can offer.

When the underwriting rules and question sets begin to diverge, this solution won't work anymore. It also presents a problem for applicants who are affected by the small difference between rule sets. For example, a 47 year old applicant.

Workflow Abilities

Specify Products Offered

Workflows can specify which products will be offered to an applicant after completing an application.

A workflow_product association table is used to define which products are offered by which workflows. When a workflow-based application is created, the first of the workflow's products are used to populate the product_id column in the application table. That product is also used to determine which set of underwriting rules to run. When an application has been approved, the rates returned are filtered to only include rates for products that are offered by that workflow.

The underwriting rule set for all products must be similar.
Configure how applicant information is collected.

A workflow is composed of workflow sections, where each workflow section can contain one or more question sections. This is what enables the configurability of a workflow. For example, the self_disclosure workflow section contains the personal, medical, lifestyle and HIPAA question sections. The personal, medical, lifestyle and HIPAA sections can be answered in any order, but they must all be completed before the first data vendor workflow section can begin.

An example of an alternate configuration from the one above is one where each workflow section has only one question section. In this example there would be a "personal" workflow_section containing the personal question_section, and another workflow_section for "lifestyle" and so on. This would enforce that the personal question section questions must be answered before the lifestyle questions.

Limitations:

The question section names must be defined in code before they can be defined in the database.

All self-disclosure questions must be answered before making data vendor calls.

E-signing disclosures must occur before making data vendor calls.

Customize Workflow Section Events

Figure 11:
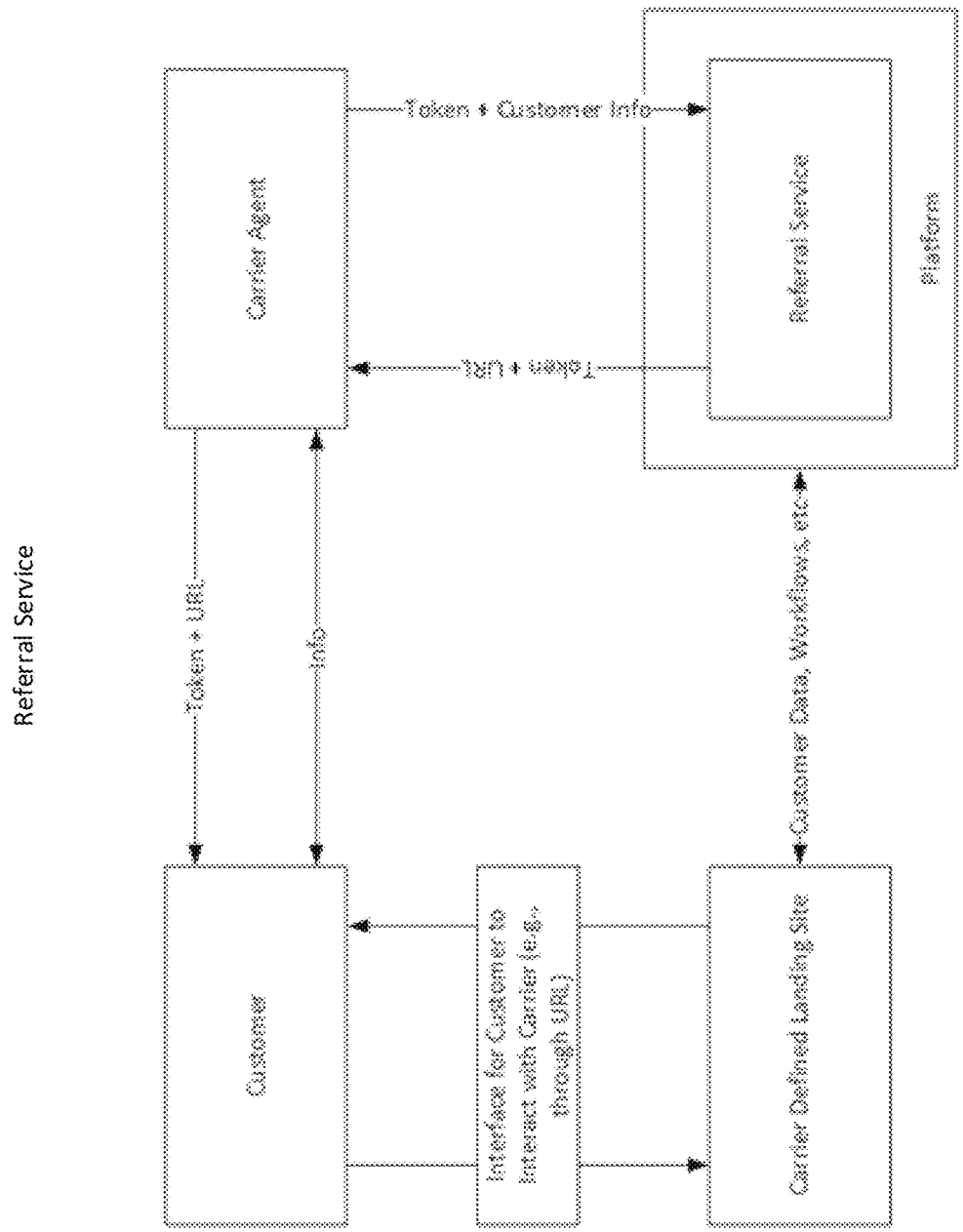
FIG. 11 is a schematic diagram illustrating message pathways between entities using referral service in accordance with embodiments of the present disclosure.

Workflows can be configured to emit events after workflow sections are started and completed by adding the name of the function that should run to the workflow_section's actions property. The function needs to be registered as a workflow action as well, by adding either the @workflow_action or @async_workflow_action decorator to the function Referral Service FIG. 11 is a schematic diagram illustrating a referral service in accordance with embodiments of the present disclosure. Agents can initiate contact with customers and collect customer information over the phone or other ways. Agents will then typically have to provide that information to a carrier to start the application process. The referral service creates a token and URL that directs a user to an application on a carrier-defined landing site to work on the application or other documents. Facilitates the streamlining of completion of applications; allows for data tracking throughout application process; without the referral service, the platform would not be able to quickly associate both the customer information and the agent with the carrier and insurance application for the carrier; and referral service could be generalized as the tokenization of any information to create quick and reliable associations between actors and information. Referral Service is agnostic to the insurance application process. Referral service could be generalized as the tokenization of any information to create quick and reliable associations between actors and information.

FIG. 11 shows a high-level diagram of interactions between entities for using a referral service. The carrier agent can acquire information from a customer to start an insurance application process. The customer can communicate with the carrier agent using a phone or online chat or other mechanism. The carrier agent provides that information to the platform—specifically, the referral service.

The referral service can create an association between the customer, the information provided on the customer by the agent, and the agent themselves (e.g., for commissions, credit, etc.). The referral service can also confirm the agent's credentials to access workflows and sell policies on behalf of a carrier.

The referral service creates a referral token and provides the referral token to the agent with a carrier-defined URL. The carrier-defined URL links to a carrier-defined landing site for the customer to continue working on the application, access quotes, or perform other tasks associated with the insurance application process. The referral token can include a random string that is unique and disposable (though the referral tokens can be stored for metadata for carriers, such as agent commission breakdowns).

TABLE

| Token and associated information | | | | |
|---|---|---|---|---|
| Token 1 | Customer 1 | Customer 1 Info | Agent 1 | URL 1 |
| ... | ... | ... | ... | ... |
| Token n | Customer n | Customer n Info | Agent n | URL n |

The URL can include the token string.

The carrier agent can send the Token+URL to the customer via email, text, or other ways. The customer can click on the URL (which can include the token), which takes the customer to the carrier defined landing site, such as a website. The carrier defined landing site can provide an interface for the customer to interact with the insurance application at whatever place in the application the customer is at. That could be the start of the insurance application or at quote or bind etc.

Referral Service Process Flow Description

Participants:
  Customer
  Agent
  Agent Svc (AGS)
  Referral Svc (software module)
  Carrier Workflow
1. Carrier defines landing zone for URL with the Referral Svc. The carrier can host a website or can outsource the website or other landing site for providing a UI to the customer to interact with the insurance application across a network.
2. Carrier also identifies agents that are authorized to sell policies on the carrier's behalf with AGS, so that the platform (and referral service specifically) can authenticate the agents when receiving a token from one.
3. Carrier defines workflow parameters and gets workflow from the platform. Carrier can also define products for workflows.
4. Workflows are made available to the carrier clients and the agents.
5. Agent interacts with a customer to get customer information. Provides customer info, workflow and version, and agent token to referral service.
6. Referral service verifies agent using agent token in AGS. Referral service also checks that agent has access to workflow requested.
7. Referral service creates association between customer information and the agent and returns a new token+ URL. See Table above.
8. Referral service sends agent (the requestor) the Referral token+URL (URL has the token string).
9. Agent sends referral token to customer.
10. When a customer interacts with the URL, the customer is taken to the carrier defined landing site (e.g. web application). The customer creates an account and then the Web App requests information from the Referral Service to generate an insurance application with the requested workflow and pre-populates the insurance application with the data associated with the token. Web app gives token to referral service to get the right information. Web app creates the insurance application with the customer information and links to customer account.
11. The Token is marked as used by platform. Web application talks to referral service to mark token as used. "I've used this token to create this insurance application." Web application or referral service or other actor can share token status with agent so agent can track application progress. Tokens can be stored for metadata for carriers for example to see commission breakdowns etc.
12. Customer can interact with web application to work on insurance application. The customer can create an account first. And link the account with the insurance application through the web application via the URL and token.

Referral service can be called to provide some information for supporting binding and purchasing.

Policy Administration

Figure 12:
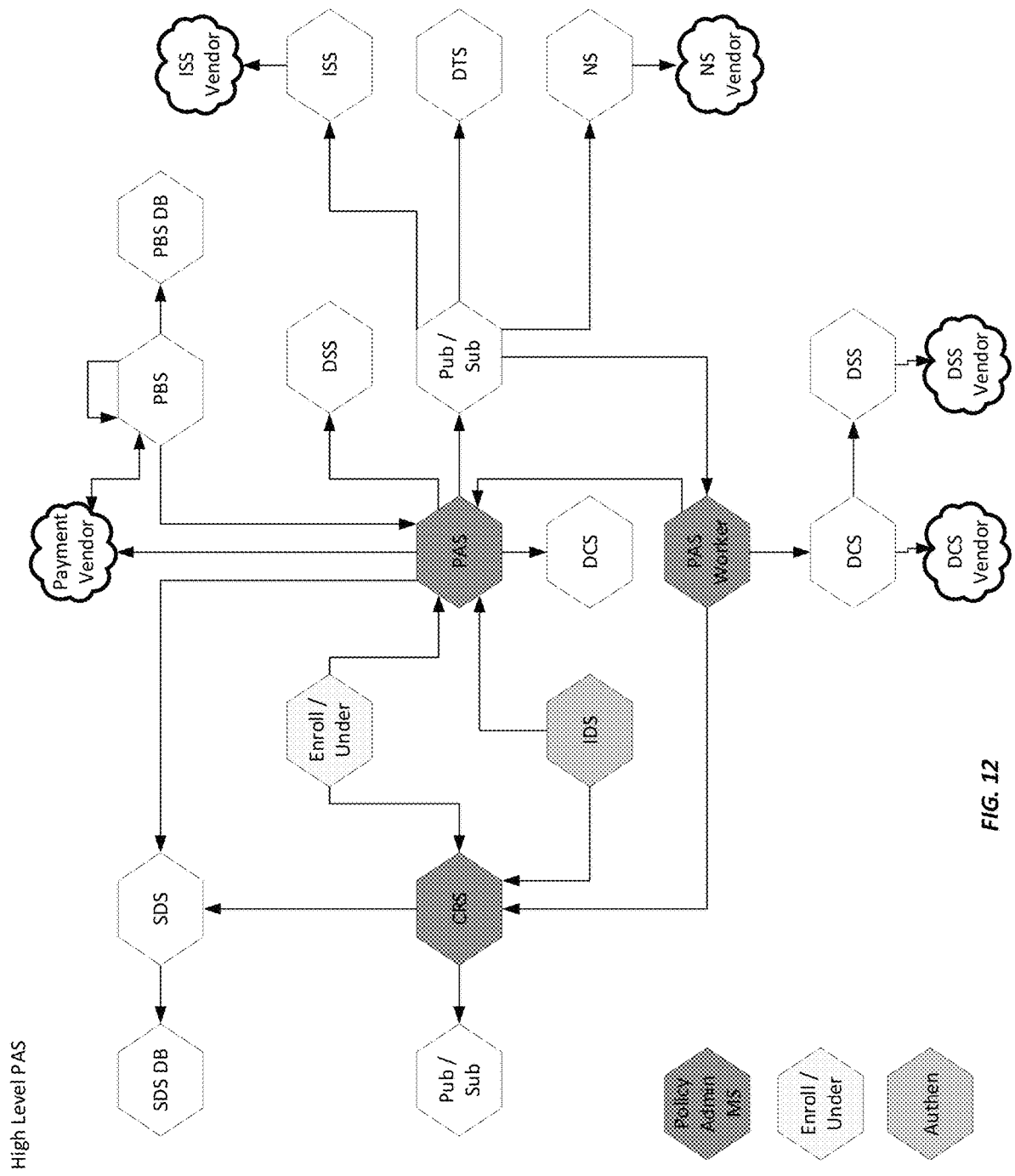
FIG. 12 is a schematic diagram for policy administration in accordance with embodiments of the present disclosure.

FIG. 12 is a schematic diagram for policy administration in accordance with embodiments of the present disclosure. FIG. 12 illustrates the services and micro-services used for policy administration at a high level. FIG. 12 also shows communication points between the various services and micro-services. The policy administration system can support a multitude of micro-services and applications such as, an administration portal, customer interaction portal, enrollment service, customer records service, identification service, or others.

PAS is informed by results from enrollment and underwriting services, as discussed previously. PAS can perform various policy administration functions, including user authentication through IDS micro-service, payment through payment billing services (PBS) and payment vendors, such as Stripe®. PAS can also make use of document services, such as DCS and DSS. PAS also uses SDS to secure sensitive data in a secured database or repository. In some embodiments, PAS can use publication or subscription services to access ISS through ISS vendors, DTS, and NS through notification vendors, such as LOB and SendGrid.

PAS workers can also access micro-services, as described above, through admin portals.

Figure 13:
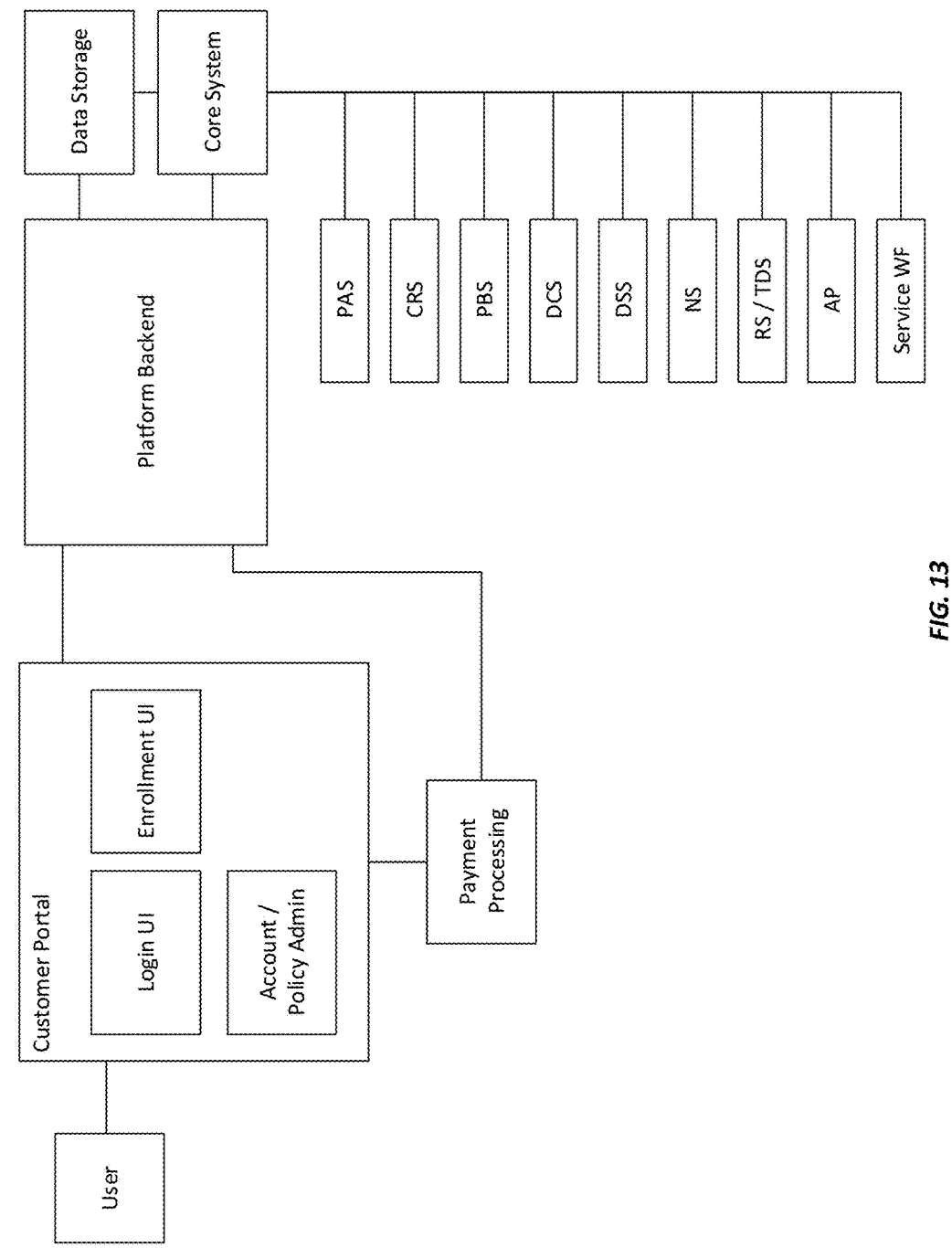
FIG. 13 is a schematic diagram of a portal for policy administration in accordance with embodiments of the present disclosure.
Figure 14:
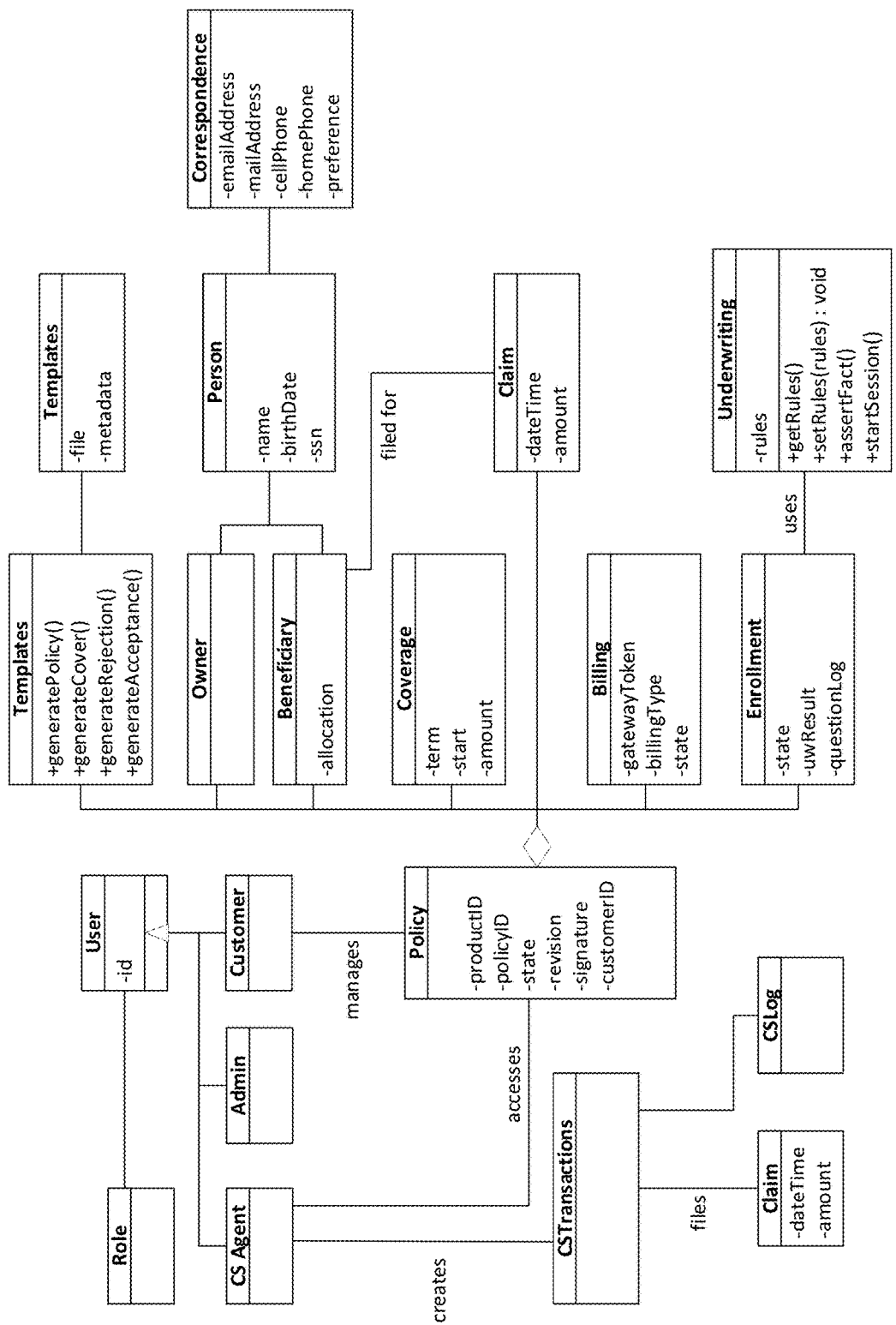
FIG. 14 is a schematic diagram of a policy administration data model in accordance with embodiments of the present disclosure.
Figure 15:
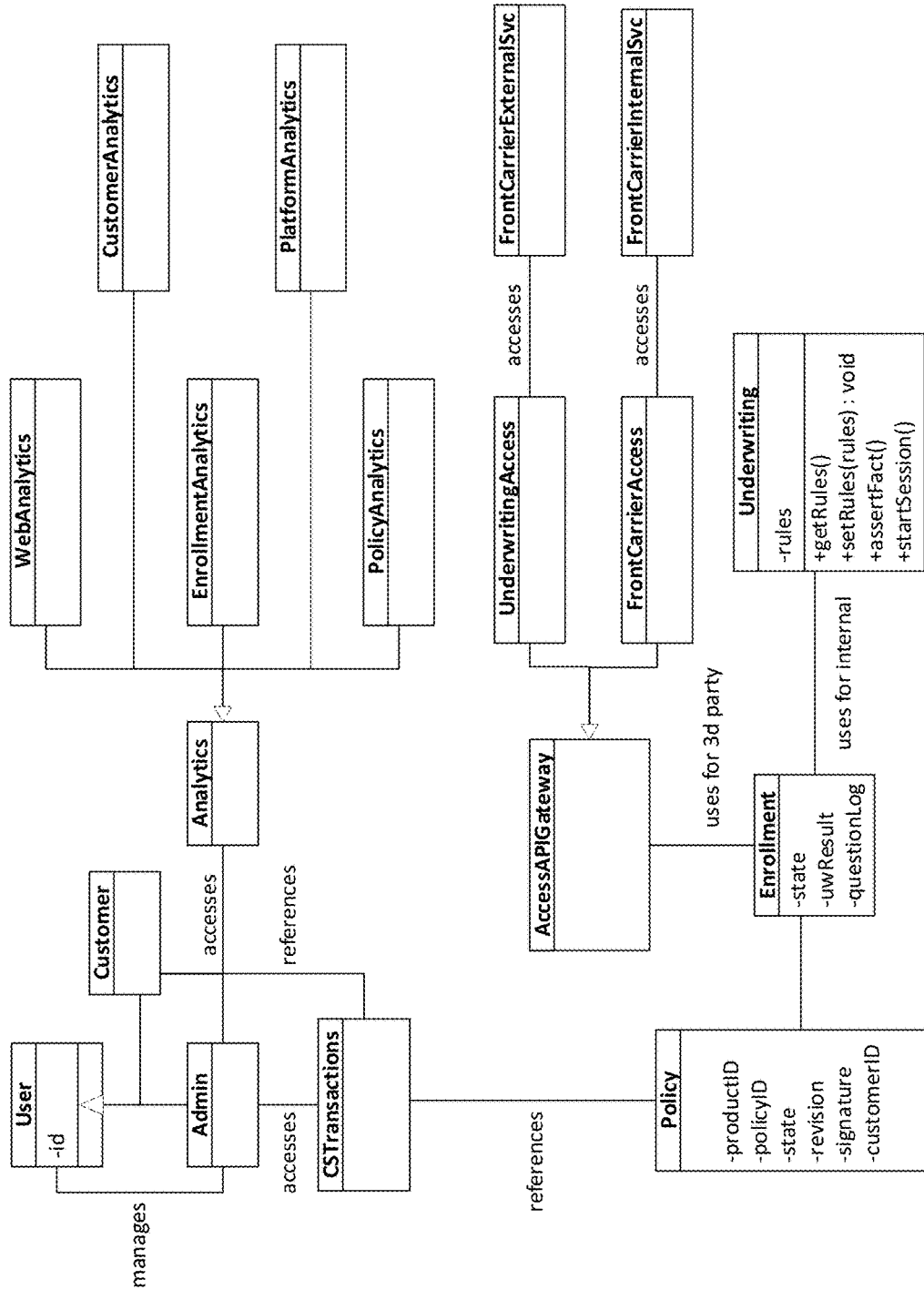
FIG. 15 is a schematic diagram of a policy administration data model in accordance with embodiments of the present disclosure.

FIG. 13 is a schematic diagram of a portal for policy administration in accordance with embodiments of the present disclosure. FIG. 14 is a schematic diagram of a policy administration data model in accordance with embodiments of the present disclosure. FIG. 15 is a schematic diagram of a policy administration data model in accordance with embodiments of the present disclosure. The depicted examples show the various user roles with a relationship with the Policy object class. This class is an aggregation of features supported by the Enrollment, Coverage, Billing, Owner, Beneficiary, and policy document Template classes.

Policy administration provides customer and administrative functions to provide and manage policies for users, partners, agents, and providers. Once an applicant has enrolled and a policy is sold (i.e. the customer has bound a policy and has become insured), their policy is tracked by the platform's policy administration technology, which also provides self-service facilities for the insured to manage their contact information, policy details, and other information.

Administration includes collecting payments, notifying customers about events relevant to their policies, updating customer information, providing customers a view into their policies, validating and paying claims, paying commissions to agents, and issuing reports to carriers for whom the platform is selling policies. The platform provides a policy administration system that is built using an event-sourcing (ES) and Command Query Responsibility Segregation (CQRS). CQRS combined with event sourcing provides the platform and administrators with an immutable, permanent record of every event that has ever occurred on a policy (or any associated objects) from the point of its initial creation forward. This also allows the platform to recreate the exact state of a policy at any time in the past, for example in order to audit some action that was taken on a policy or to debug some interaction with another system.

Policy revisioning is implemented using an event sourcing approach that establishes a 100% auditable trail and keeps the policy change history as the ledger without being able to forge it. Policy revisioning represents one example application of Command and Query Responsibility Segregation (CQRS) and Event Sourcing patterns using specialized data sets, etc. In this case, CQRS and Event Sourcing help to create an auditable and immutable record of policy transactions, as described later in connection with FIGS. 17-19.

Services provided under the umbrella of Policy Administration include policy tracking and payment, document generation and storage, notifications, commission tracking, customer relationship management, and so on.

The account/policy administration pages allow a logged in customer to manage their account details. Account details include but are not limited to username (email address), Password, Contact preferences (e.g., email, mail, phone), address, phone, and correspondence email. Account/policy administration pages also provide access to manage policy information such as beneficiaries (e.g., add or remove beneficiary, change distribution percentage), contingent beneficiaries (e.g., add or remove contingents, change distribution percentage), change billing information (e.g., add a new payment method, remove an old payment method, change billing frequency (e.g., monthly or annual), or view past bill statements), view/print policy kit (e.g., the welcome letter, a coverage summary, or policy details).

Policy Administration function include several data elements that are maintained in the system related to a policy. Some of the values are variable and can change over the life of the policy, while others must be maintained from the time of inception and remain consistent through the life of the policy. Values that are not calculable from persisted values may be persisted with each policy. Policy related data elements are historical and must be maintained to support the ability to audit the system and what values were applied to a particular policy. This implies that no data elements related to policy administration can be deleted from the system.

These elements may be active while in force and inactive when retired and replaced by a new value. The date and time of activation and deactivation of a value may be persisted with the value.

The system also includes various information regarding a policy. For example, a policy number is a number assigned to a policy at the time it is issued. It may be derived from a block of policy numbers available in the system and defined by the Fronting Partner. A face amount is the death benefit of the core policy. This is set during product selection and is a determining factor in the policy premium. A death benefit, in the case of simple term life, is generally the same amount as the face amount and is the amount paid by the insurance company to the named beneficiaries once the carrier is made aware of the insured's death. A benefit period is the length of time during which a benefit is paid. The benefit period is defined in each policy's guidelines. An elimination period is the period of time between the onset of a disability, and the time you are eligible for benefits. A rider is a Boolean value which is set to True if policy has a Rider/Riders associated to it and False if not. The fields in this subsection are a set of data values associated to each Rider attached to the Policy. A rider type is a value set for each Rider associated to the policy and indicates the type of Rider. A benefit amount of rider is the benefit of the Rider to be paid if the Rider conditions are met.

A policyholder is the name of the holder or owner of the policy. This data may include: Full Name, Address, Gender, date of birth (DOB), social security number (SSN). The insured is the name of the person insured by a policy. The Insured may be a different person than the Owner. A beneficiary is one or more person who is the primary recipient of the death benefit when a claim is filed and paid against a term life policy. The information gathered for each beneficiary includes Full Name, Relation, and Percentage of benefit. The Percentage of Benefit can be divided as desired among the primary beneficiaries and must total 100 percent. Contingent beneficiaries are backups to primary beneficiaries in the case that a primary is deceased. Each of these persons has the following information specified: Full Name, Relation, Percentage. If a Primary is deceased, the percentage assigned to the deceased Primary is divided among the Contingents as specified by their defined percentage. A duration (term) describes the term or length of coverage provided by the product such as 10-year, 20-year, or 30 year. An inception date is the first day that the policy takes effect which is the same as the day the policy is bound. An anniversary date is the anniversary of the inception date. An expiration date is the last day of the last year that the policy is valid. A state of residence is the State that the Insured resides in at the time of issuance and remains persistent for the life of the policy. An issue age is the age at the insured's nearest Birthday at inception date. An attained age (ANB) of the Insured at any given time in duration of the policy The described system includes several system functions. For example, an electronic signature (e-signature) may be captured at multiple points in the application process and potentially at other times during policy administration. E-signature may be captured in one of two ways: text box for user to type in their name with another text box to capture the date and checkbox for user to check to indicated agreement and signature. In either method, the system may also persist the IP address of the user and a date-time stamp of when agreement was provided.

The described system may support two portals: a customer portal and an administrative portal. The administrator portal provides administrators access to functions and features not provided on the customer more portal, such as reports and statically analysis of the customer data. In some implementations, the customer portal represents a public website whereas the administrative portal represents an access point for support personnel. Within the two portals, actions performed by a visitor may be collected. Such actions, include page visits, time on page, and actions taken. Data may also be collected in a general form so that it can be used as needed for reporting by marketing and sales. Actions may be used to analyze the sales funnel and the transition of visitors to customers. Therefore, tracking of unique customers is desired given the boundaries that temporary persistence (cookies) imply. Once a visitor becomes a customer that customer may be able to be uniquely identified and tracked on return visits to the site.

From a policy administration perspective, the platform can be characterized as supporting services:

Core Services

A core service is intended to be the source of truth for a given product domain/scope, it orchestrates transaction flows of distributed nature and holds product specific knowledge. Examples of such services are PAS, CRS. Core services should be designed with CQRS/ES architecture patterns. CQRS: Command Query Responsibility Segregation. ES: Event Sourcing. Benefits of using CQRS/ES include:
(1) Keeping an audit log for all changes that happen within the system.
(2) Capturing all the changes that happened from the beginning of the time. Data is not lost. The platform replays the changes. a) the platform can bring the system to a specific point in the past; b) the platform is not limited by the database schema storing the current snapshot of the system. If some data is missing, the database schema can be changed and events can be replayed from EventLog to populate the new field.
(3) High scalability and availability of the query side of the system. The general approach is to store DTO data in the first normal form meaning that one call to the query service should produce one call to the backend storage. In the case of SQL DB the platform does not use joins to retrieve that data. In other words, it is OK to have one table per one call. In CQRS terms, it is called a projection view. Also it gives the platform a great deal of flexibility to choose and change the storage technology to back up the query side. The platform can still have PostgreSQL to store generic purpose data, and add Elasticsearch for fast, text searches or Graph DB to store graph structured data.
(4) The query side is designed to be consumed in real time. However, the consumer is free to cache a part or a full set of the service data by subscribing to domain events emitted by the service.

General Purpose Services

Such services will not hold any product or domain specific knowledge. They are designed to serve some specific functional needs that can be reused across the core services. Examples of such services will be DSS, NS. DCS also falls into this category despite the fact that it holds some knowledge about Policy documents. The purpose of a generic service is to be designed in such a way that it is not tightly coupled to a specific product domain and it can be easily reused by another service without us having to make changes in the service and/or it API. For example, DSS purpose is to store documents in a secure way. Therefore it can be consumed by CRS system if the platform decides to generate customer related documents down the road. The purpose of NS is to deliver notifications. It is intended to be able to process notification requests that should have enough information to deliver the requested notice without having to know domain specific information. As an example, the platform expects NS to accept a request with email addresses of the recipients, a list of document IDs. NS is responsible for returning a requestID and fulfilling the delivery request. It is also responsible for reporting the tracking status back to the caller by using the request ID.

Customer Facing Sites

A customer facing site is used by and interacted with by users. It can be used by external users such as a person applying for life insurance using an Enrollment portal or internal users only like Admin Portal. In most cases, a customer facing site is backed by dedicated storage. It has an option to consume the query services to display data from the core services, and it can also cache some part of the data or the full set by subscribing to domain events emitted by the core services. That way the site would be able to operate in the read-only manner in a case when one or more of the core services are experiencing an outage. Also, it would be able to transform and store the domain data on its side without having to implement this functionality on the query side of the core service. An example of this approach will be Algolia indices used by Admin Portal that get populated from domain events emitted by PAS and CRS. However, the site must call the command service if an action requires mutating state in a given core service.

Overview of Services

PAS: Policy Administration Service: Manages all elements related to a policy and is the source of truth for all policy data points. For example, the PAS declined policy workflow can resemble the following:

PAS Declined Policy Flow

When an application is started, Enrollment calls CRS to create/update customer information.

Enrollment underwrites a decision to decline the user application.

Enrollment calls PAS to create a policy document in the declined state.

PAS calls DCS to generate necessary documents for the declined policy.

DCS holds the knowledge of what documents are to be created for a given policy state. It calls WebMerge with a list of doc templates and the dynamic data to fill in. It receives back generated documents and it calls DSS to store them. After that, it returns a list of documentId and their types back to the caller, in this case it is PAS.

PAS stores the document Ids and types with the policy document.

PAS will emit an integration event for NS to send email with AUD. It will provide a list of email addresses and documentId(s) for the email body. NS will be responsible to retrieve the document content from DSS and call the email provider.

NS will deliver the tracking status back to PAS so PAS will know if AUD email was delivered successfully.

CRS: Customer Record Service: CRS Stores all data related to a customer (particularly demographic data) and is the source of truth for all customer data points.

PBS: Policy Billing Service: Abstracts complexity of a billing provider. Listens for billing events, and adapts to specific commands to call PAS.

DCS: Document Creation Service: Ultimately persists a document to DSS, will pull templates (via webmerge) and perform variable replacement where necessary—however it is the only service to persist documents to DSS. Also supports an integration with HelloSign DSS: Document Storage Service: Securely stores and fetches documents, backed by Cloud Storage NS: Notification Service: Sends emails to customers, using templates stored in storage. Will pull attachments directly from DSS.

RS/TDS: Reporting Service/Transaction Data Service: Creates journal entry tables, using PAS Events (off the back of a PBS issuing a command)

AP: Admin Portal: Admin Portal uses backend storage and indices to perform policy lookup functionality on the main page. Other policy and customer data will be consumed directly from PAS and CRS query services respectively. However PAS and CRS services should be abstracted via a data provider layer in Policy Admin so the platform can easily switch Policy Admin to consume some of the data from storage indices. Policy related changes will be done by Policy Admin calling PAS command service. Customer related changes will be done by Policy Admin calling CRS command service. Documents related to the policy also need to be displayed on the UI. PAS will inform of the location of the document, then Admin Portal will query DSS directly.

Payment

The payments and billing functions provide a capability to accept payments from customers. The system leverages integration with third parties as the payment processor, such as STRIPE® or other payment processing companies. When product traction or the business decides, a move can be made to a merchant account. The system may support payments via Credit Cards, Debit Cards, or Bank Account (ACH).

Payments will only be supported in US Dollars. Only US Banks will be supported for ACH. The system may support an endpoint that is registered with the Stripe service to allow receipt of events from Stripe. These events will generally be events related to charges, disputes and refunds. While most responses can be captured during the interaction with Stripe in a synchronous fashion, the Webhook function allows for an alternative method for processing these responses and to receive notification of events that are not tied to a direct system call for action, such as a recurring payment.

Payments may be made on a policy in one of two frequencies: Monthly or Annually. Payment frequencies may be recurring. If a customer wishes to modify their payment frequency, they can do so at any time. However, the change in frequency may not take effect until the anniversary date of the policy. Billing details related to the payer of the policy. This data may vary by payment type. The described system may not store any of this data in its data store. This information may be stored on the system of the payment processor so that compliance with Payment Card Industry (PCI) is enforced. The described system may retain an identifier (id) provided by the payment processor which is associated to the payer information. A billing period is the number of days in the billing period from the last payment due date to the next. In the described system this may either be determined by, for example, monthly or yearly payment method. A current premium due is the amount due for payment by the payer of the policy in the current billing cycle. An unearned premium reserve is the number of days remaining in billing period divided by total number of days in billing period multiplied by the current premium due. An earned premium is a number of days expired in billing period divided by total number of days in billing period multiplied by the current premium due. A billing date is the day that billing occurs. For annual payments, this may be, for example, the month/day for the next payment. For monthly payments, this is the day of the month for the next payment. For example, the first billing date may be 0000 local time, the day after inception.

A premium status represents the state of the premium payments. Premium status can be, for example, paid, premium payment is up to date; or outstanding, premium payment is beyond due date. A policy status value reflects the current state of the policy and is influenced by the premium status and if the policy is in force. Possible policy statuses include good standing, where the premium status is "paid" and the policy is within term; grace period where the premium status is "outstanding" and the policy is in a grace period (this allows the policy owner to get the premium status "paid" within a defined timeframe or the Policy will be Cancelled by the Carrier); and cancelled, where the policy was cancelled by the policy owner and is no longer in force. A premium refund is a reported amount and is the amount of unearned premium from the paid through date back to the date of cancellation. Premium taxes are collected by every state in which premiums are written. A premium tax may be assessed at a rate equal to the greater of the tax rate in the domicile state or the state in which the premium was written. A premium tax may be passed on to the policy owner and are a percentage of the premium paid.

Underwriting

The described system may also encompass an underwriting function. Underwriting encompasses the function of being able to associate risk category (and/or risk class) to a policy applicant. Underwriting is the process of collecting data related to the individual to be insured, verifying the data provided during the collection process to be accurate, aggregating data from third party providers including, but not limited to, identity, medical history, finances and lifestyle and then using this data to calculate a score which determines the risk of insuring the individual. If the risk score is acceptable, then the individual is presented policy options to select from. If the score is considered unacceptable, then the individual is rejected and informed of the reason for that decision.

A risk class is a category that is assigned to the insured based upon their risk score, gender and tobacco status. The risk score determines a general class of Standard, Preferred or Super-Preferred. This may then be combined with Gender (Male/Female) and Tobacco Status (Smoker/Non-Smoker) to arrive at the insured's class. An underwriting method is the method of processing for the policy and can be one of two values: STP (Straight Through Processing) or FU (Fully-Underwritten). A core rate is the rate determined by the class of the insured as defined via the core product rate table and is the value applied to the policy amount to calculate the core premium. A core premium is the product of the core rate multiplied by the face value of the policy. A rider rate is the rate a rider costs and is the amount applied to the coverage amount to determine the rider premium. A rider premium is the product of the rider rate multiplied by the coverage amount of the policy. A total premium is the sum of the core premium and any attached rider premiums. Administration fees are an amount charged per policy for administrative charges. It is included as part of the tax amount charged for the policy and varies by state.

This platform supports a single step application and policy binding process, which yields a real-time quote and bind-able policy quickly after application submission. The described process is a digital, online experience designed from the ground up to simplify the application and make the interaction less intimidating.

The underwriting engine can take as input information provided by the applicant, information provided by agents, information taken from third party sources, such as medical information, motor vehicle information, financial information, and other data elements. The underwriting engine can also use new or preexisting actuarial models to process the data. The underwriting engine can also use the data with rules, product offerings, and other information to provide a quote.

Underwriting is the processing of applicant data with the purpose of determining risk associated to policy issuance. There are various phases of this process which can include a deeper interview and reflexive questions to help determine identity, medical history, prescription history, motor vehicle records and a third-party integration to support verification of collected consumer data. Third-party integrations may include support for Know Your Customer (KYC) and Customer Identification Program (CIP). Electronic Inspection Report (EIR), such as LexisNexis EIR, is a report that includes various information including, but not limited to, property ownership, bankruptcies, criminal records, watercraft, and certain professional licenses. Credit via LexisNexis is a score calculated based upon customer's credit report to determine risk assessment optionally used when desired and permitted by regulation. Information returned can include a full credit-report, an insurance score, reason codes, a customized message based on underwriting guidelines, or a combination of these items.

Medical Information Bureau (MIB) report is a set of codes which represent medical and avocational information. These codes typically represent hazardous avocations and adverse driving records which may affect the insurability of the applicant and are reported under broad categories. To have an MIB Consumer File, an applicant may have applied for individually underwritten life, health, disability income, long-term care or critical illness insurance within, for example, the past 7 years (or earlier depending on applicable law) and the insurance company to which he or she applied (or its reinsurer) must have been an MIB member company that submitted an MIB inquiry with the consumer's authorization. MIB codes may not be reported on individuals who are in good health, meaning that their life and health insurance applications are approved by the insurer as standard or preferred risks. A Motor Vehicle Report (MVR), which may be received via third parties, such as LexisNexis or Intellicorp, includes license details, status and violations. An Rx report, which may be received via third parties such as Milliman Intelliscript, or Ingenix MedPoint, is a report of prescription medications for the applicant with timeline. A Life Risk Classifier (LRC) is a product offered by LexisNexis that will produce a risk score (numeric) with reason codes based upon public records, driving history and credit. Risk determination may be done via the underwriting engine. Data is collected during the application process, pulled from third-party data aggregators and applied to a set of rules provided by the underwriting team which results in a risk profile. A use of risk classifier is an aggregated service that the disclosed system may use as a first measure of risk. Risk classifier may combine MIB, MVR and Insurance Reporting (EIR) may be pulled separately if business rules call for a deeper inspection of the record based on the general risk score returned by LRC. Policy administration includes interfaces, functions and processes which allow a policy holder, CSR, or other administrator to view, modify or otherwise manage a policy. Additionally, this may encompass system functions that bind, manage, and report upon a policy or policies issued by the described system. Age Nearest Birthday (ANB) is the age of the insured to the nearest birthday. An example is if a person is 39 years and 4 months old, the ANB is 39. If a person is 39 and 6 months, the ANB is 40. Other example actors for the described system include a helpdesk, a payment processor, an underwriting engine, LexisNexis, Milliman, and Analytics. Moreover, within the described system in force means that the policy is paid up and active, so as long as the premium is being paid for the respective life insurance, and in range implies that a policy is within the duration of coverage.

For the waiver functions, during the application process, once underwriting begins, it may be necessary for data to be pulled from third-party data aggregators that allow the system to verify MVR, MIB, Rx and EIR. Before this data can be gathered it may be necessary to acquire consent from the applicant. Consent may be acquired through the presentation of waivers which the applicant will be required to accept via an electronic signature. Waivers may be presented during the application process and before information gathering for MIB, Insurance Authorization and HIPAA. During purchase of a policy, before payment is collected, an Application Agreement will be presented for signature by the applicant.

As part of the application process, the platform applies a series of underwriting rules (known as a rule set) to an application, which results in an underwriting evaluation. The evaluation describes whether an applicant is eligible for life insurance, and, if so, which risk class they fall into.

The platform offers and will continue to offer life insurance from multiple carriers, including third-party carriers. As a result, there are a number of application filings and underwriting rule sets that must be supported both over time and at any given time. The platform applies modern data analytic methods to the life insurance space in order to discover novel products and novel means of evaluating applications in order to improve eligibility and expand the pool of people who might be eligible for life insurance. In order to apply these data analytic methods, it is essential that there be a common representation of the applicant across all of these filings and for any given carrier, so that there can be sufficient data over time to train models and so that those predictive models can be applied to potential changes to rule sets.

This common representation is referred to as an Underwriting Profile. The underwriting profile encapsulates a number of data points, which are facts about the applicant applying for insurance. Each data point may be associated with any number of indicators, which are data sources that provide some indication of the value of that fact. For example, a "smoker" data point may represent whether the applicant smokes nicotine products. There may be several indicators for that data point, including the applicant's self-disclosed answer on their application, information retrieved from data vendors, and inferred information from other self-disclosed answers on the application. Underwriting rule sets aggregate these indicators for a given data point in order to make a decision about a) the value of the data point (e.g. is this applicant a smoker) and b) the resulting effect on the applicant's eligibility.

The Underwriting Profile can be described as an iteratively defined collection of data points about a person applying for insurance. It can be thought of as the distillation of questions and answers on an application, data-vendor responses, and any other relevant information into a detailed portrait of the applicant.

The data structure will present data points rather than questions. So, for example, the medical_collection question gathers information about the applicant's medical history, which allows applicants to select from options like the following:

heart disease
organ transplant
peripheral arterial disease
chronic kidney disease
etc.

For underwriting and other downstream consumers, the determination of whether an applicant has heart disease is previously done by checking the answer to this question, which is a simple list of strings, and searching for the heart_disease string in the list. The Underwriting Profile instead represents heart disease as a potential fact about a person, with an applicant's self-disclosure of their heart disease being an indicator pointing to that fact.

Contextualization and Derived Values

There are a number of values that are important to the underwriting process that can be derived from other data points in the underwriting profile. The platform can localize the calculation of these derived values to a single source of truth, and relieve application code from needing to calculate them manually when they don't need them. As an example, consider Age Nearest Birthday (ANB). The source of truth for this calculation is in the domain layer, which both the underwriting engine and application code will have access to. However, it would be nice for the underwriting profile to support automatic population of derived values for things like ANB, so that callers can focus on answers rather than derivations.

Ownership of Derived Values

Some derived values will be solely populated by the application and will not be included in the automatic contextualization of derived values. There will probably be no hard and fast rule for which is which, but a litmus test would be whether the derived value is fully derivable from other existing data points. In such cases, it would be reasonable to have the contextualization populate the derived value automatically. Examples include ANB and body mass index (BMI). On the other hand, when the application is asking multiple questions in order to infer some existing data point (for example, asking about income payment period and income per payment period to derive yearly income), the derivation should be done on the side of the application.

Agents

Figure 16:
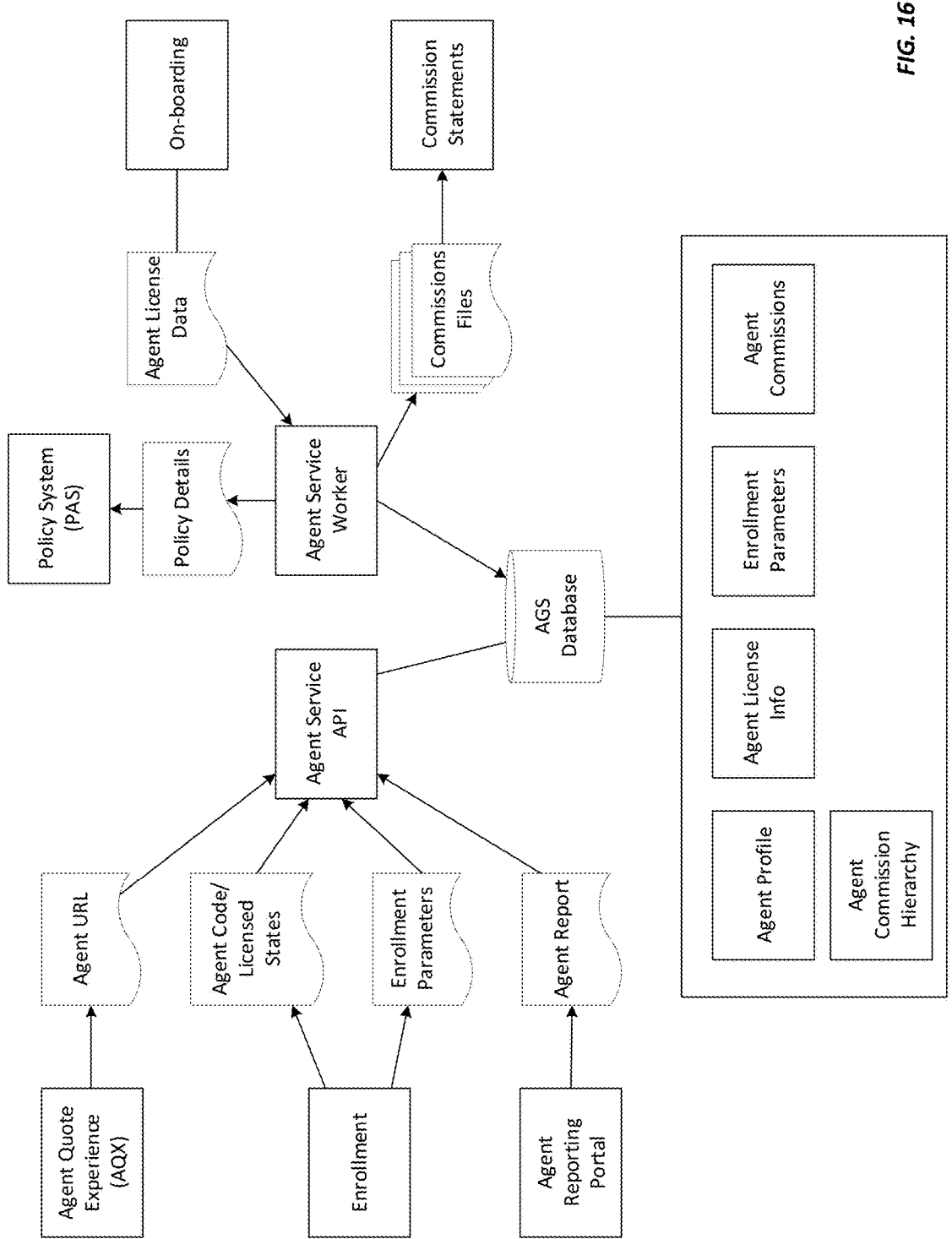
FIG. 16 is a schematic diagram of an agent system overview in accordance with embodiments of the present disclosure.
Figure 17:
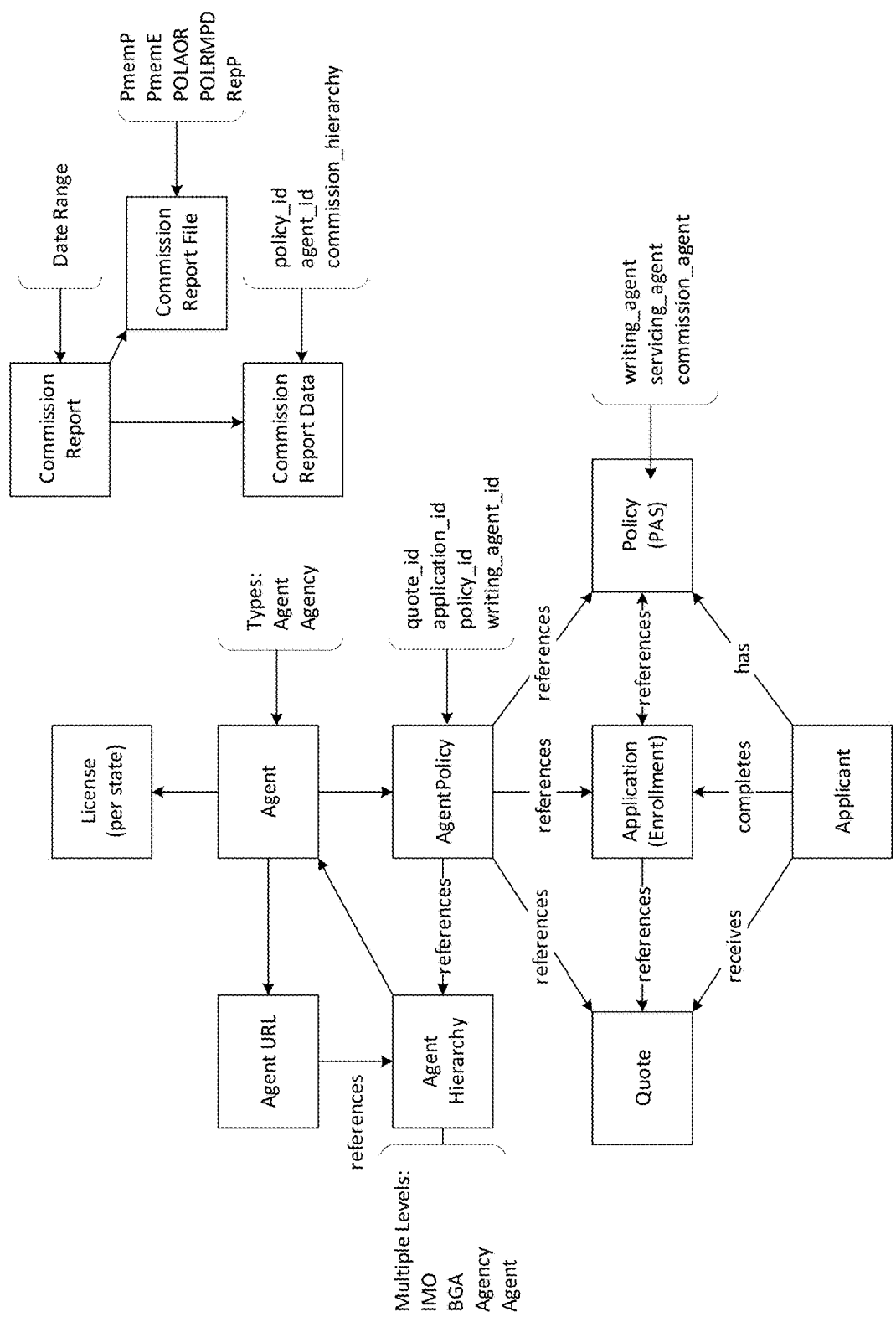
FIG. 17 is a schematic diagram of an agent domain model in accordance with embodiments of the present disclosure.
Figure 18:
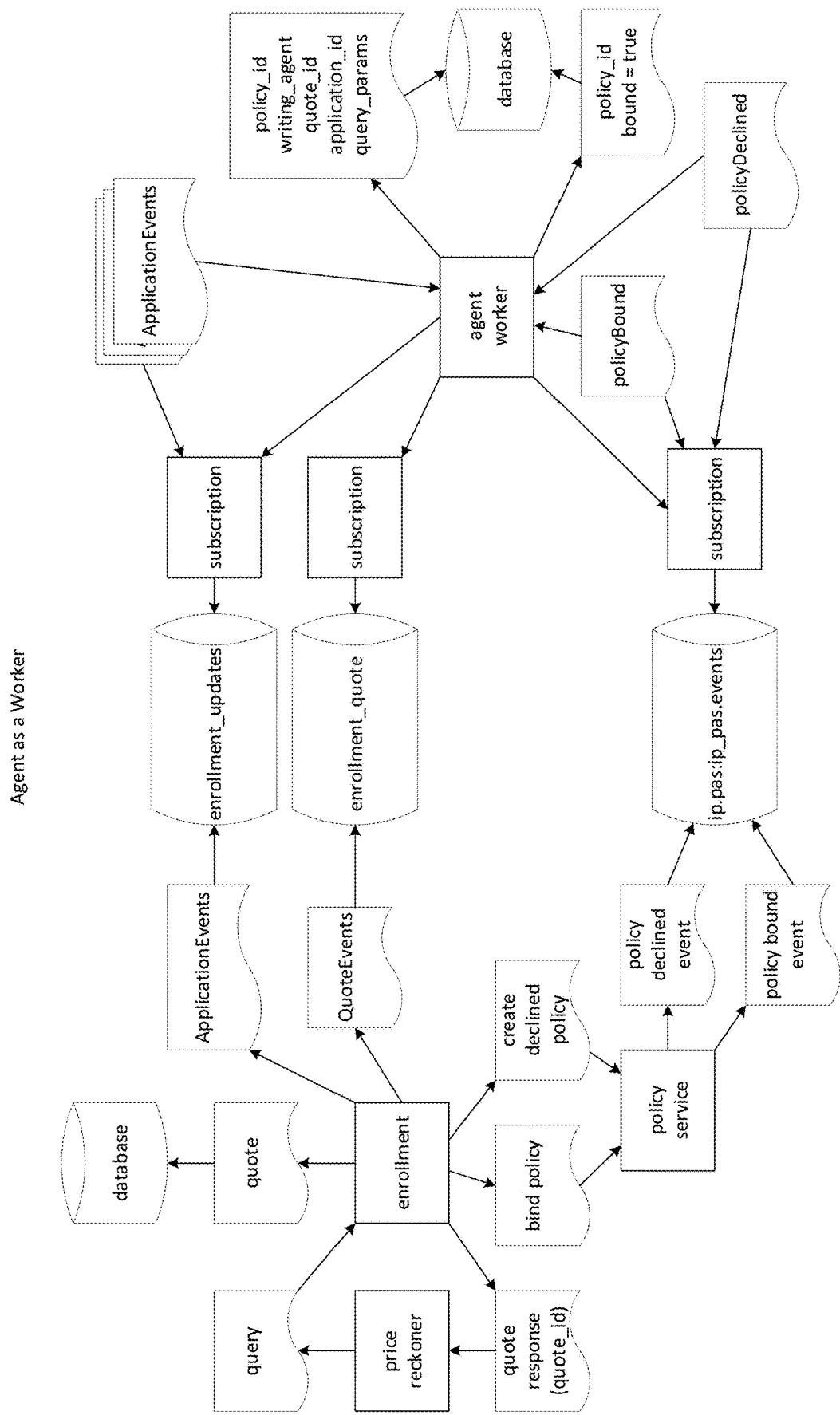
FIG. 18 is a schematic diagram of an agent as a worker domain model in accordance with embodiments of the present disclosure.

FIG. 16 is a schematic diagram of an agent system overview in accordance with embodiments of the present disclosure. FIG. 17 is a schematic diagram of an agent domain model in accordance with embodiments of the present disclosure. FIG. 18 is a schematic diagram of an agent as a worker domain model in accordance with embodiments of the present disclosure.

Traditional advisors, including sales agents, can make use of the platform to drive policy advice and sales through APIs. The platform includes functionality that consolidates information for payment of agent commissions and agent-referred policy sales into one system as a single source of truth for agent related information.

The platform facilitates agent and advisor participation in the life insurance policy sales and distribution process while still reducing the friction points that agents and advisors might be responsible for. Agents can access various parts of the platform using one or more portals. For example, an agent can perform marketing through the platform to reach visitors to the platform site; agents can communicate with visitors or applicants during various stages of enrollment to allay confusion, educate, guide, or otherwise help an applicant with the enrollment process; agents can track the progress of quotes and applications so that they can work with customers that are stuck or have questions to help customers move forward; agents' commissions can be tracked or otherwise supported. The system is platformized so that new agents and carriers can be easily added as sellers and policy backers. The use of APIs, SDKs, and enterprise solutions can also facilitate the engagement of agents and advisors by supporting aspects of insurance policy sales and distribution that are unique to the agent or advisor. For example, an unrepresented customer can be referred to one or more agents or advisors who supports one or more product offerings that match the customer.

Information maintained in the system for an agent may include name, address, employee identifier number (EIN), license number, states of license, appointed by (company name, address), policy commission rate, and rider commission rate. Sub-Agents in the described system represent affinity partners, individual agents, etc. that are sub-contracted. Information maintained for a sub-agent includes name, address, EIN, license Number, states of license, appointed by (company name, address), first-year policy commission rate, first-year rider commission rate, renewal policy commission rate, and renewal rider commission rate. This might include commission structures, defined by the hierarchical relationships of Agents/Producers within an organization. These hierarchical relationships are the key abstraction the AGS micro-service uses for tracking, and authorizing observability of, the application and policies attributed to an Agent.

Commissions may be recorded for Agents and Sub-Agents. Commissions are based upon the size of the policy sold measured by annual premium. A first year commission (policy and rider) payment is a payment that is equal to a percentage of the total annual premium payment that will be made on the policy during the first policy year. Commissions are made as policy payments are received. A renewal commission (policy and rider) is a commission paid for a specific number of years after the first policy year. The amount of years after the first year that a renewal is paid varies. The commission paid on a renewal is a percentage of premium paid into the policy during those specified years. Commissions for renewals may not be annualized but may be paid as the premium is remitted. The system may support reporting of commissions per policy as well as aggregated. Commissions should be reportable as those paid as well as those refunded.

An AgentManager portal allows Agent-Experience team members the ability to manage how Agents, their referral tools (URLs), and commission structure are defined in the platform. One example use of the AgentManager tool is for defining Agents in the context of these structures within the 'system'. An Advisor Reporting Portal gives Advisors/Agents contracted with visibility into the state of the agent's referred applications and policies.

FIG. 16 is a schematic diagram of an agent system architectural overview in accordance with embodiments of the present disclosure. The agency system consolidates all information for payment of agent commissions and agent-referred policy sales into one system as a single source of truth for agent related information. The agent system overview includes an Agent Service API. The agent service API is a tool for allowing agents to customize the agent quote experience through one or more agent URLs, customize the enrollment of applicants through agent code, licenses, and enrollment parameters, and customize agent reporting.

The agent system architectural overview includes an AGS database that stores agent information, such as agent profiles, license information, enrollment parameters, commissions, and commission hierarchies. AGS database contains data about what applications, quotes and policies an agent was attributed to. It also contains what selling methods a customer has access too as well as information about selling methods (e.g. Agent Link/URL) and agent report data.

The agent service worker can attribute policy sales to agents, perform on-boarding, and manage commissions.

FIG. 17 is a schematic block diagram of an agent domain model in accordance with embodiments of the present disclosure.

Agent (Advisor): Agents sell policies to customers.

Agent URL (also known as Agent Link): An agent can be assigned a unique short URL to associate customers at signup and track commissions.

Application: Customers create an Application during the enrollment process.

Commission: Agents are paid a commission for policies sold.

Hierarchy: Insurance agents organize into several layers of associations. IMO, BA, agency, agent, *LOA* and sub agent are different entities that agents belong to, represented as a hierarchical structure (parent/child relationships). This hierarchy splits the commission for an individual policy sale.

Policy: A life insurance policy sold to a customer.

Quote: A quote is created during enrollment. It contains pricing and commission information to associate a policy to an Agent.

The agent can use agent URLs for marketing, referrals (refer a friend, etc.), education, etc. The agent URL can link to agent hierarchies for commissions and other purposes. Agent policies can also refer to agent hierarchies for contact information, compliance, commissions, referrals, etc. The agent can also hold licenses per state.

The agent can create and sell agent policies. Applicant enrollment can be completed by an applicant. The enrollment can reference policy administration information.

Agents can also submit commission reports as commission report files with reporting data.

FIG. 18 is a schematic block diagram of an agent worker domain in accordance with embodiments of the present disclosure. Agents are insurance company representatives licensed by a state and appointed by a carrier who solicit and negotiate contracts of insurance and provide service to the policyholder for the insurer. An agent can be an independent agent who represents at least two insurance companies or a direct writer who represents and sells policies for one company only. Direct writers are also called captive agents.

A writing agent who is properly licensed and appointed with the carrier, solicits business on behalf of that carrier. They also deliver policies on behalf of a carrier. The carrier pays out commissions to every entity in the commission hierarchy for these policy sales. The writing agent associated with a policy will never change.

The servicing agent manages the policy and the carrier may pay out a service fee to the servicing agent for administering and providing assistance to the insured/owner re: the policy. The servicing agent may be the same as the writing agent when a policy is issued, but the servicing agent may change over time (e.g., writing agent was affiliated with an agency and leaves that agency. The agency can then appoint a new service agent. The new service agent can also be the commission agent. If the comp is being paid to the agency, the original writing agent cannot retain the comp if he leaves the agency).

The commission agent is the sole producer or agency on file to receive commission. It is possible that writing agent=servicing agent=commission agent, but it is also possible that all 3 are different. It is possible for servicing agents to change, and it is possible for commission agents to change.

A policy can be associated with one writing agent, one servicing agent, and one or more commission agents. But other structures are also possible. Usually this is the writing agent, sometimes a policy re-assigned can be reassigned.

Partner Integration

Partners may integrate with the platform either through experiences that they engineer or through white-labeled portals that the platform creates on their behalf. Either way, these integrations use the same data-driven API as the platform's own direct-to-consumer portal. In addition, the platform provides a Software Development Kit (SDK, see below for more details) to make both internal the platform and external partner engineering efforts significantly easier.

Partner integrations allow non-native entities to provide a fully featured, white-labeled experience in order to sell life insurance to their customers. The platform's data-driven API allows a number of flexible configurations for this relationship: partners can sell policies from the platform or one of the platform's carriers, traditional carriers can sell their own policies via a white-labeled experience built by the platform, or traditional carriers can build their own portals utilizing the platform's enrollment and policy tracking technology under the hood.

FIGS. 17A-B are swim-lane diagrams illustrating example partner integration application process APIs in accordance with embodiments of the present disclosure. FIGS. 16A-B are swim-lane diagrams illustrating example partner integration policy binding APIs in accordance with embodiments of the present disclosure.

Fronting, Reinsurance, Ceding

Fronting is the use of a licensed, admitted insurer to issue an insurance policy on behalf of a self-insured organization or captive insurer without the intention of transferring any of the risk. The risk of loss is retained by the self-insured or captive insurer with an indemnity reinsurance agreement. However, the fronting company (insurer) assumes a credit risk since it would be required to honor the obligations imposed by the policy if the self-insurer or captive failed to indemnify it. Fronting arrangements allow captives and self-insurers to comply with financial responsibility laws imposed by many states that require evidence of coverage written by an admitted insurer.

Reinsurance is a transaction in which one party, the "reinsurer," in consideration of a premium paid to it, agrees to indemnify another party, the "reinsured," for part or all the liability assumed by the reinsured under a policy of insurance that it has issued. The reinsured may also be referred to as the "original" or "primary" insurer or the "ceding company." The data elements may be related to reinsurance and may be tracked with each policy. For example, under a Treaty reinsurance contract a reinsurance company agrees to accept all of a particular type of risk from the ceding insurance company (a mode). Reinsurers in a treaty contract are obliged to accept all risks outlined in the contract. Facultative reinsurance contract covers a single risk. Facultative reinsurance is more transaction-based than treaty reinsurance. In the described system, this may be set to "Treaty." A treaty number is the number of the agreement signed between the reinsurer and the fronting company. A percent ceded is the portion of a risk that transfers to the reinsurer in return for a stated premium.

A Ceding company is the fronting partner of the described system. Details persisted regarding the ceding company may include name, mailing address, and reinsurer company details. The following elements may be recorded related to the Reinsurance: name and mailing address. The following data is calculable and may be reported as requested to the partners represented for this related business item. These values may be categorized for policies: in range, in range and in force, or cancelled. A reinsurance amount at risk is a percentage ceded times the current benefit amount. A benefit amount retained is a face amount minus a reinsurance amount at risk. A reinsurance premium ceded is a percentage ceded times the premium. A rider benefit retained is the rider benefit minus the rider benefit ceded). A rider benefit ceded is a percentage ceded times a current rider benefit. Other captured information includes a net adjusted due reinsurer, ceding commission first year, and ceding commission renewal.

Other information that may be captured and/or stored within the described system includes correspondence (effective date of transaction and correspondence), a change of beneficiary/contingent beneficiary, a change of address, an overdue premium, a complaint, a grace period, a reinstatement, and a cancellation. Information regarding a cancelation may include information tracked by core policy and rider, reasons such as non-payment, by insured during free look or by insured for other, the date of cancellation, and if for other reason, should allow text entry for description of reason. Other collected information includes, a change in plan, claims (triggers cancellation and refund of premium to date of death and notification to fronting and reinsurance partners, Compliance/Regulatory such as state guaranty association document and or rules by state related to Policy administration, reporting and actions.

Event Sourcing

The policy platform includes several microservices. Some, such as CRS and PAS, are built with Command and Query Responsibility Segregation (CQRS) patterns that are event sourced and command based. CQRS separates reads and writes into different models, using commands to update data and queries to read data.

Other microservices use traditional create, read, update, and delete (CRUD) models.

Sources of truth for insurance policy enrollment and administration must contain accurate information throughout the policy life cycle. As a policy makes its way through its life cycle, its state can be updated to reflect changes to various aspects of the policy. Typically, the policy state is overwritten with updated information when a change is made.

The problem is that when a change is made to a policy state, the previous state and associated information is overwritten and lost when using CRUD models. This can create problems if the current state represents incorrect information, which can also impact future changes and decision making based on the current state. In addition, traditional CRUD systems do not provide the state history out of the box, therefore changes cannot be audited.

Event sourcing stores all the changes (events) to a data structure, rather than just storing the current state of the data structure.

To solve the problems above, we have developed a new way to track object history by ensuring every change to the object state is captured in an event, which we are calling event sourcing. In event sourcing, we keep a ledger of events, so instead of overwriting old state with new one, we add a new event in order to create a new version. The ledger includes all changes to an object that occur over time. In order to retrieve the current state of an object, object events are pulled from the ledger and replayed in the order they were created. Object events can also be projected and stored in different formats or using filters to support a variety of consumers and the ability to retrieve information in a timely fashion.

Event sourcing has the following advantages: the ability to put the system in any prior state, which is useful for debugging (i.e. what did the system look like last week?); having a true history of the system. Gives further benefits such as audit and traceability; the ability to create specific read-side data projections as needed.

Figure 19:
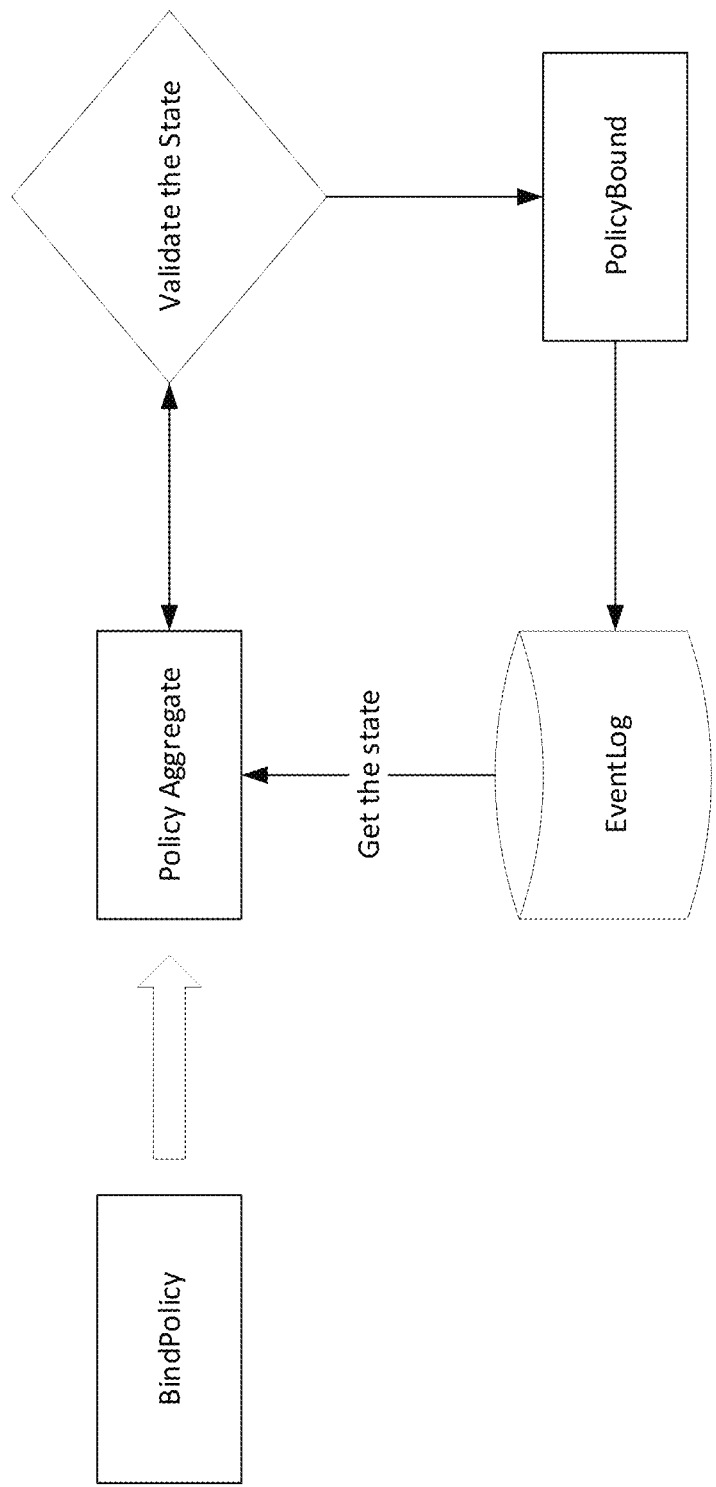
FIG. 19 is a schematic diagram illustrating event sourcing in accordance with embodiments of the present disclosure.

FIG. 19 is a schematic diagram illustrating event sourcing in accordance with embodiments of the present disclosure. FIG. 19 shows a block diagram illustrating a policy aggregate processing commands and using events to mutate the policy state. At the outset, a command can be received by PAS and CRS. A command can be defined as an expression of an intention to change an event state. The aggregate module includes logic that can determine whether to make the change expressed by the command and can include logic that makes the state change. The aggregate module can access the event log to replay entity events to calculate its current state in order to determine whether to execute the command. The aggregate module can also use information from the event log to perform the change. Aggregate module can also create new events in the event log.

Validation module can include logic that can ensure that the current state is correct or present for the requested change. For example, if a command is to bind a policy, the validation module can check the states in the event log that are required for a policy bind to occur. Validation module can return an error if the event log does not include events that support the requested change. The validation module can return a valid state or acknowledgment if the event log information supports the requested change.

Figure 20A:
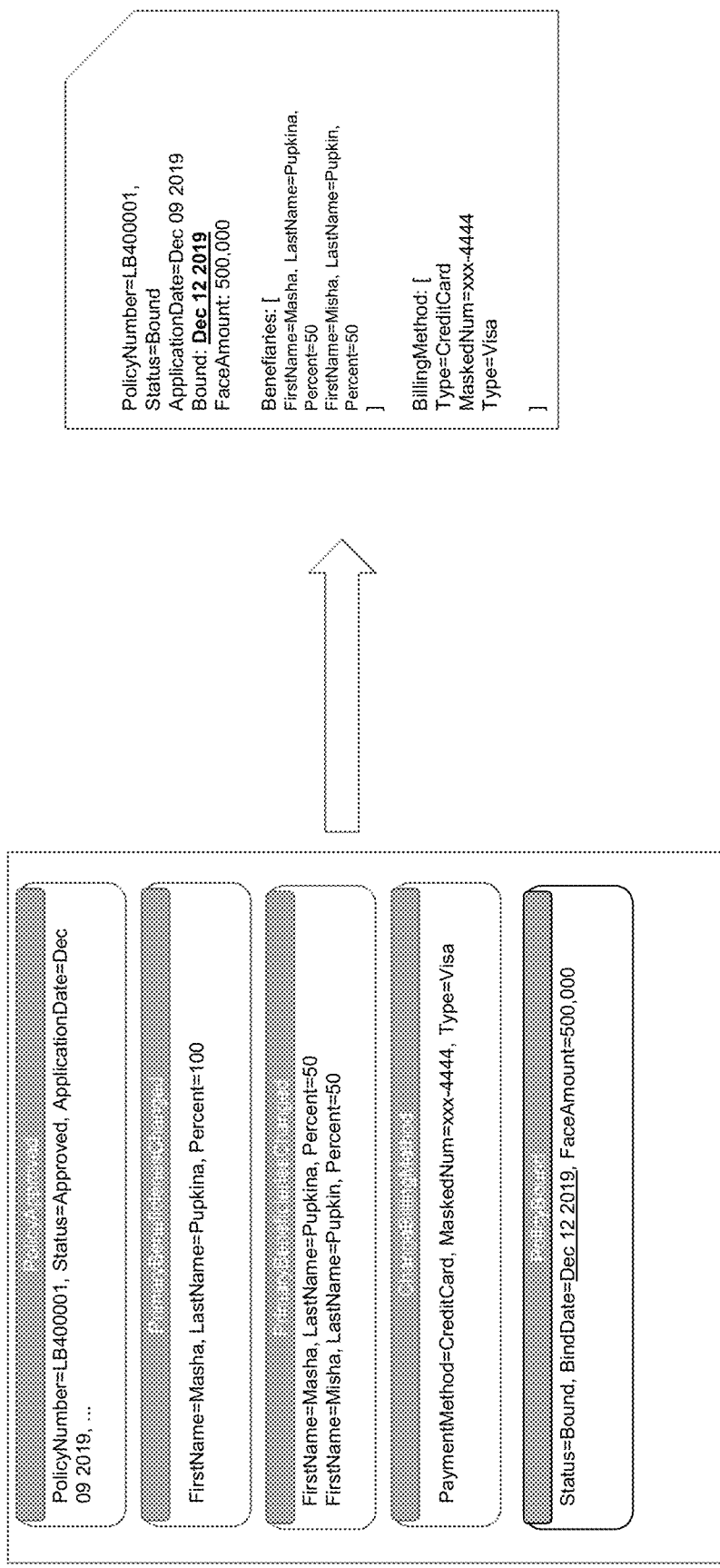
FIGS. 20A-C are schematic diagrams of example debugging using event sourcing in accordance with embodiments of the present disclosure.
Figure 20B:
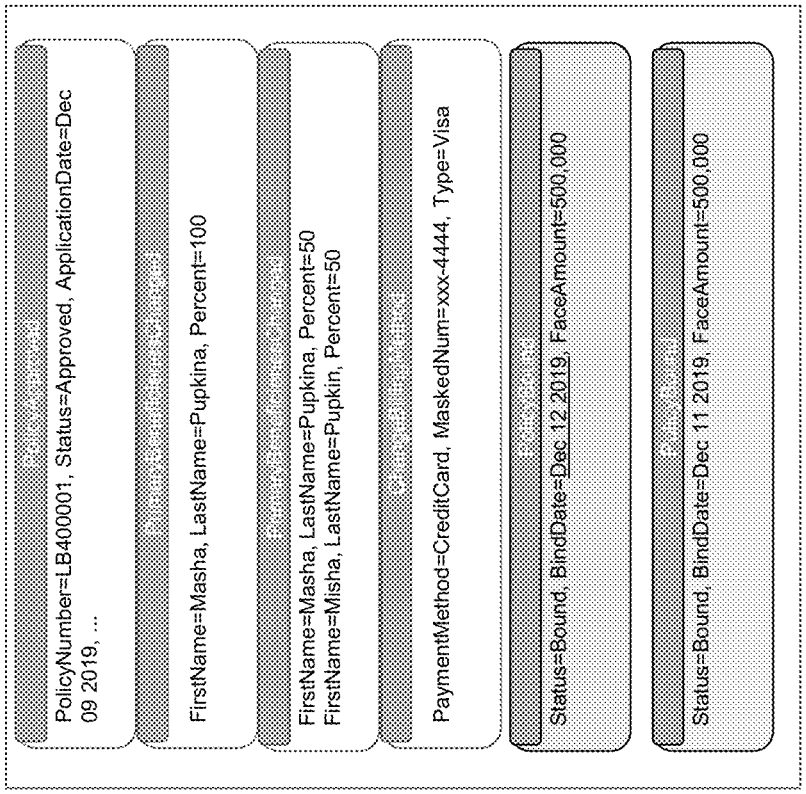
Figure 20C:
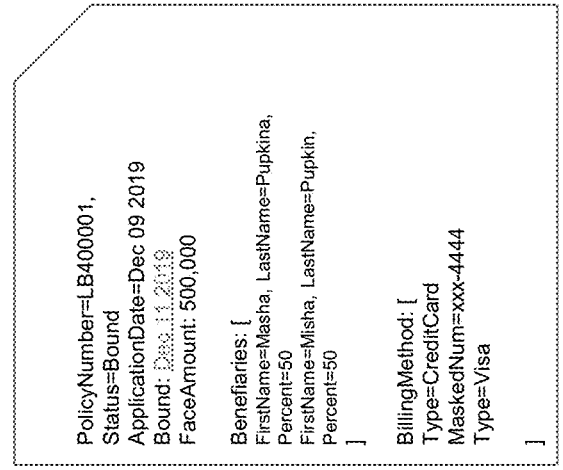
Figure 20C:
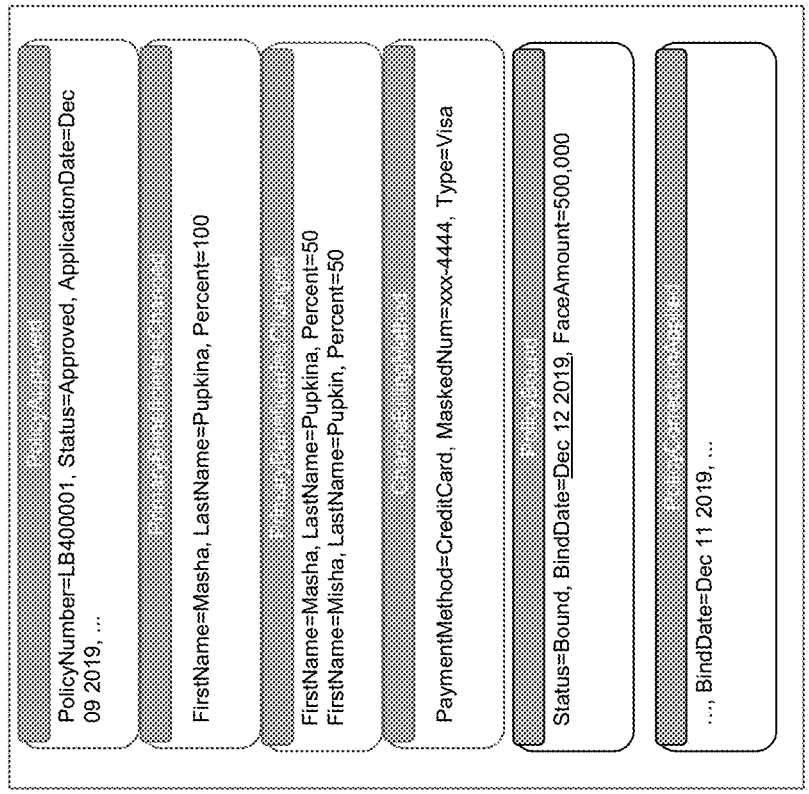

FIGS. 20A-C are schematic diagrams of example debugging using event sourcing in accordance with embodiments of the present disclosure. FIG. 20A shows events for a policy that is bound. The policyBound data indicates a bound data of Dec. 12, 2019. The resulting information for the policy when called shows that the bound data is Dec. 12, 2019. For any number of reasons, this data is determined to be incorrect. And the event log needs to be corrected.

In FIG. 20B, a first debugging process is shown. In FIG. 20B, a new PolicyBound event is created with the correct bindDate as Dec. 11, 2019. The resulting data when retrieved shows the corrected data. In FIG. 20C, a second debugging process is shown. In FIG. 20C, a compensating event is created. A Policy Correction Applied is to correct the bindDate to Dec. 11, 2019. The resulting data will also show this, because the creation of the data will review all of the events in the event log for the policy, including corrective actions.

Figure 21:
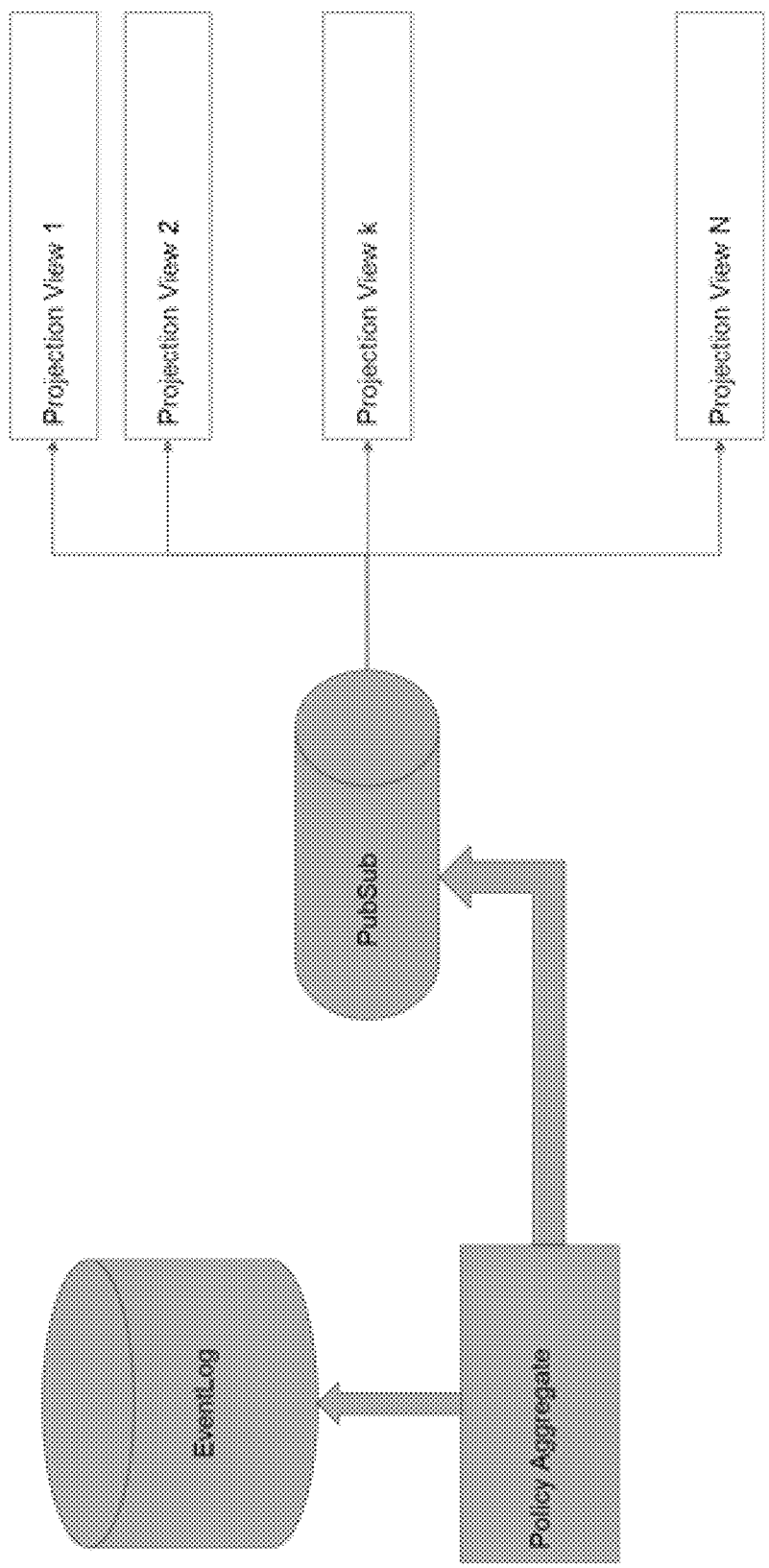
FIG. 21 is a schematic diagram illustrating projection views for event sourcing in accordance with embodiments of the present disclosure.

FIG. 21 is a schematic diagram illustrating projection views for event sourcing in accordance with embodiments of the present disclosure. Data can be stored with metadata or other semantic information for retrieving data in different formats for different consumers using projection views. This is shown in FIG. 21. Each projection view is a data record requested and provided in a format compatible with and with the information specific for the requester. Projection views are populated with data from entity events by running event handlers. Each event handler is responsible for populating one projection view. Event handler reads events from the pubsub queue in an asynchronous manner thus the process of writing to projection views is decoupled from the command execution logic. This approach allows for scaling of the performance of the aggregate module and deploy event handling logic independently. Since projection views are not the source of truth for the application state they can be easily modified and rebuilt at request.

In some implementations, the projections are stored in a backend system (e.g., integration platform 102 as described with respect to FIG. 1) which can be a PostgreSQL database. In some implementations, projections are populated Algolia indexes which provide for low cost/high speed text search servicing. Projections can be updated or populated each time a new event occurs (e.g., as detected by its associated event handler) or periodically (e.g., every 2 minutes, 10 minutes, 10 seconds, or other time interval). In some implementations, where the projection data is updated based on event handler detection, the overall system can handle large request spikes, as the projection data is not updated based on the number of requests.

Projections can be stored on the backend, such as in PostgreSQL databases.

Figure 22:
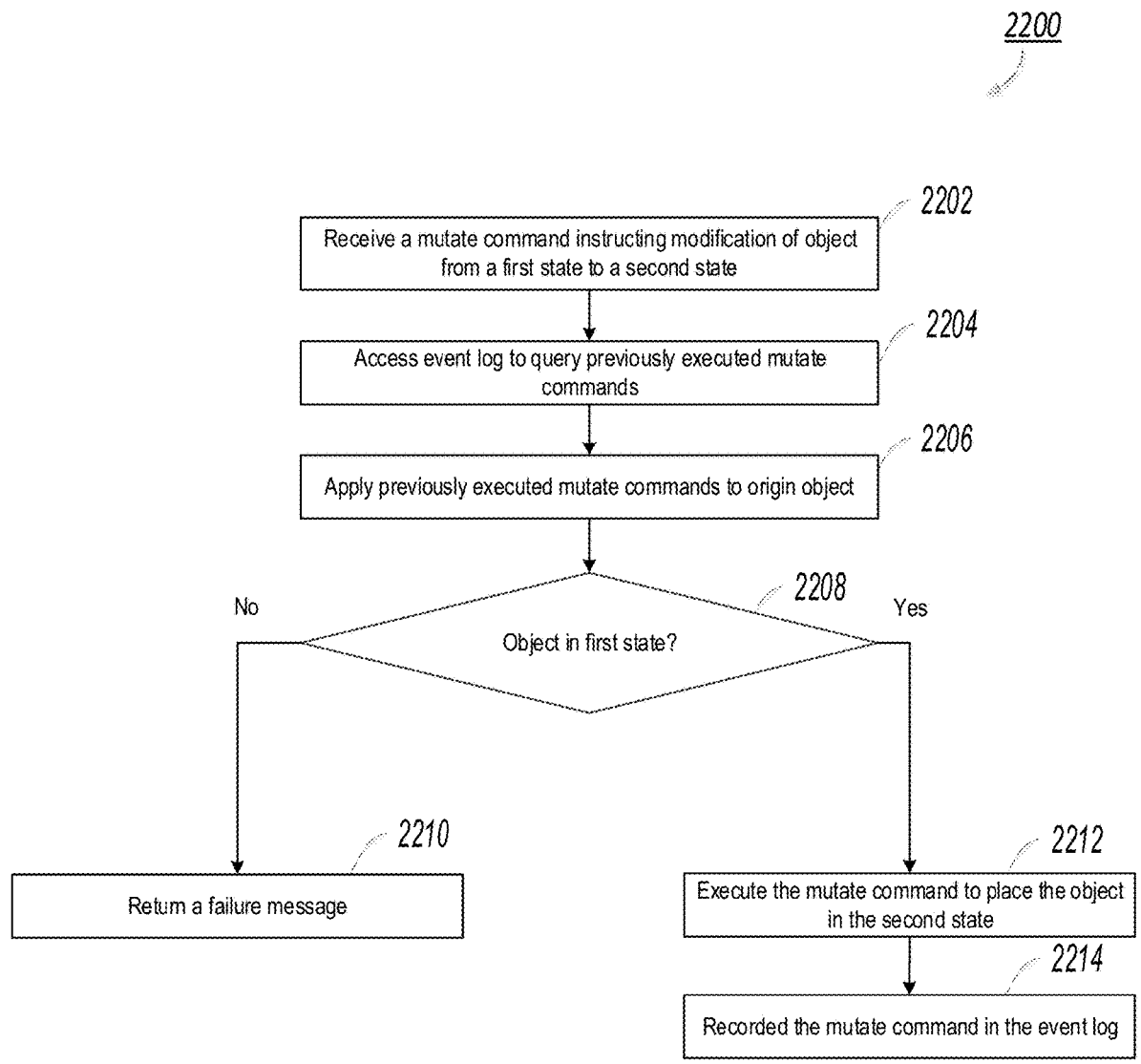
FIG. 22 is a flowchart illustrating an example process for mutating a software object.

FIG. 22 is a flowchart illustrating an example process 2200 for mutating a software object. Process 2200 can be performed, for example, by system 100 as described with reference to FIG. 1. However, it will be understood that process 2200 may be performed, for example, by any other suitable system, environment, software, and hardware, or a combination of systems, environments, software, and hardware as appropriate. In some instances, process 2200 can be performed by the integration platform 102, or portions thereof, described in FIG. 1, as well as other components or functionality described in other portions of this description. In other instances, process 200 may be performed by a plurality of connected components or systems. Any suitable system(s), architecture(s), or application(s) can be used to perform the illustrated operations.

At 2202, a mutate command, or change request instructing modification of an object (e.g., software object such as a life insurance policy) from a first state to a second state. In some implementations, the mutate command is received from an authenticated user or system, that was previously authenticated (for example, by integration platform 102 of FIG. 1). In some implementations the mutate command or change requests includes the first state, the second state, and one or more transformations to be applied to bring the object from the first state to the second state.

At 2204, a module (e.g., event sourcing engine 119 of FIG. 1) accesses an event log or ledger and queries previously executed mutation commands that have been performed on the object. In some implementations, the event log is a ledger that is maintained in a local database. In some implementations, the event log can be distributed, having one or more backups stored remotely. In some implementations, the event log is secured by a distributed hash chain (e.g., a blockchain) and therefore is stored immutably across multiple nodes.

At 2206, The previously executed mutation commands are applied to the original object, which is also stored in the event log. In this manner, the module can generate an object that is in the current state. This current state object can then be compared to the object in the first state from the original mutation command, in order to verify the mutation command came from an entity with a current status of the object.

At 2208, if the object in the current state matches the first state, process 2200 proceeds to 2212. If the object in the current state does not match the first state, it is an indication that the received mutation command was relying on out of date, or erroneous information, and the mutation command can be rejected or denied and process 2200 proceeds to 2210.

At 2210, a failure message indicating that the change request, or mutation command was not applied to the object. In some implementations the failure message can further alert additional entities, such as security programs, or the carrier systems (e.g., carrier systems 104 in FIG. 1) of the failed mutation attempt.

At 2212, if the object in the current state matches the first state, the module executes the mutate command, transforming the object in the current state (and the first state) to an the second state according to the mutation command or change request.

At 2214, the mutation command or change request is recorded in the event log or ledger. This ensures that future changes, transformations, or mutations will be verified against the most current state of the object.

Advantages

One of the described system's goals is to provide technology elements that support an experience presented to consumers which may provide for the education, exploration, purchase and maintenance of simple term-life insurance. The system may include support functions for administrative users such as Agents, Underwriters, Partners (Fronting/Reinsurance), Carriers, Customer Service Representatives (CSR), System Administrators and Data Analysts. In some implementations, the described solution includes a web-based UI for front-end users as well as the backend services to support the user experience. Additionally, the backend may integrate with appropriate third-party services to accomplish necessary and intended business rules.

One of goals of described system is to offer term-life insurance which is not considered a qualifying product that would categorize a provider of the system as a "financial institution" subject to Bank Secrecy Act (BSA) and therefore not require the support of a full Anti-Money Laundering (AML) Program. However, in some implementations, (Office of Foreign Assets Control) may also be supported. Additionally, support for expansion allows the described system to have the flexibility to adopt new products and this can include enforcement of BSA. The described system supports a single step application and policy binding process, which yields a real-time quote and bind-able policy quickly (e.g., in less than 1 minute) after application submission. The described process is a digital, online experience designed from the ground up to simplify the application and make the interaction less intimidating.

The described system supports a single step application and policy binding process, which yields a real-time quote and bind-able policy quickly (e.g., in less than 1 minute) after application submission. The described process is a digital, online experience designed from the ground up to simplify the application and make the interaction less intimidating.

The described system supports products that embed a return of premium (ROP) mechanism within the term life insurance product. This allows a policyholder to either (1) claim on their life insurance policy should an unexpected death occur for the policyholder or (2) receive a return of premium paid should they not claim on the policy. Traditionally, term life policies are for a fixed term and it is the "live and lose" dilemma for the insured, meaning that if they live they lose all their premium paid. While an ROP rider exists in the market for term life products, it is an add-on purchase and typically increases the premium by >4× a policy without the rider.

To raise perception of value, the system supports an extensive education process, premium reduction, and a return of premium features. These three methods work together to enhance the overall perception of value in both the insurance product and the insurance company itself. To decrease the number of applicants rejected, the method incorporates extensive machine learning algorithms to use the overall book of business experience as a feedback to improve the underwriting process. It also includes extensive analysis of all factors in the application, 3rd party databases, and social media with the goal of explicitly finding positive factors to weigh against the negative that would have historically caused the customer to receive a rejection. The provision of a quick, single step process, supported by an insurance product with a higher perceived value, and supported by an underwriting process that yields a higher acceptance rate is not known in the current state of the art.

The methods associated with returning a percentage of the premium price mentioned above is supportable by this online platform. The platform supports offering a purchase option that results in a lower premium with an embedded return of premium feature due to the efficiencies created by the system and digital distribution. In some implementations, the described system provides for an ROP at 30% or more above the standard premium for term life products. This platform enables the improvements mentioned by its methods of automating the policy sales/support process (therefore lowering costs), the consequent ability therefore to support shorter policy terms (decreasing the probability of a claim) and the methods of learning from the past performance of these two processes to tune the ratio of price to returned premium return.

A key component in controlling the premium required for the policies is controlling the amount of fraud suffered by the platform. Fraud occurs via several mechanisms, which include attacks of the system itself, falsification of application information, and falsification of claims. This platform can take into account all three of these attacks.

The disclosed platform may perform queries against third party databases that yield information about an applicant's history (e.g., medical, criminal, and driving) to perform cross checks. The platform also learns about patterns associated with the complex relationships that exist between application answers, the information derived from the external personal history databases, and the information derived from social media. These patterns are used to trigger alteration in both underwriting rules and in the formulas used to generate policy premiums.

Within the described platform, techniques used in interaction with these design elements can reduce friction as described above and still receive the required information to bring about these goals. An example of the complex nature of the interactions required to achieve said goals can be appreciated by understanding that the successful delivery of the return of premium product offering depends upon the costs saved by the mitigation of the typical insurance agent costs, customer service costs, underwriting costs, customer confusion, and delays. These costs reductions are achieved via automation of associated tasks. The success of novel return of premium product, for example, also depends upon and benefits from the enhanced customer service and education tools required to for delivery and support. It can be appreciated that missing one or more of these techniques in the platform could jeopardize product determination and acceptance.

Computer Implementations

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them.

Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "real-time," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers.

The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto.

Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination.

Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The preceding figures and accompanying description illustrate example processes and computer implementable techniques. But environment (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

Embodiments of the Present Disclosure Include

In a first embodiments, a platform includes a platform backend that includes hardware and software, including a plurality of services. The services can be embodied in software to perform various discrete functions, including an enrollment service that uses data and metadata to categorize information provided by an applicant to populate one or more life insurance applications; a policy administration service that facilitates administration of a bound policy.

Application Programming Interfaces are provided to facilitate interoperability of the platform backend and services with agents, partners, and carriers. Agents can use the platform backend to sell policies, guide enrollment, and provide educational services. Agents can also use the platform backend to track sales, commissions, and navigate commission hierarchies.

Partners and carriers can use the platform backend to create life insurance product offering categorization that can be used to identify life insurance product offerings that satisfy applicant enrollment parameters.

The enrollment of applicants uses data driven applications and multi-product support.

A system can include one or more processors and a computer-readable storage device coupled to the one or more processors and having instructions stored thereon which, when executed by the one or more processors, cause the one or more processors to perform operations for providing a logistic demand forecasting. The operations can include receiving an enrollment application for life insurance from an applicant; determining, based on the received enrollment application, whether the applicant is insurable; generating a policy having a premium based on the enrollment application and the determination of the insurability of the applicant; and sending the policy to the applicant.

In some embodiments, the determination of the insurability of the applicant is based on a digital underwriting process comprising a rules engine that employs a set of underwriting rules to process the enrollment application.

In some embodiments, the enrollment application is received and the policy sent via an internet protocol.

In some embodiments, the internet protocol is Transmission Control Protocol (TCP), User Datagram Protocol (UDP), Hypertext Transfer Protocol (HTTP), or HTTPS.

In some embodiments, the instructions further cause the one or more processors to receive, from the applicant, a digital signature and initial payment to bind the policy.

In some embodiments, the instructions further cause the one or more processors to receive instructions for establishing a recurring billing method for payments subsequent to the initial payment.

In some embodiments, the policy includes a return of premium feature.

In some embodiments, the instructions further cause the one or more processors to persist the policy in the computer-readable storage device.

In some embodiments, the instructions further cause the one or more processors to receive a request to update the policy; and update the policy persisted in the computer-readable storage device based on the request to update.

In some embodiments, the software organizing the instructions comprise a set of micro-services including:

Policy Administration providing the functions for application enrollment, application underwriting, policy billing, policy revision, and policy reporting;

Customer Administration providing customer account creation, service access authentication, and customer account reporting;

Customer Relations Management providing problem resolution, customer correspondence, customer relations reporting;

System Administration providing monitoring, logging, and reporting associated with the use and health of the overall platform; and Compliance, which includes workflow rules organized state-by-state, along with monitoring and reporting associated with activation/application of the rules.

In some embodiments, data that is consumed or generated by each micro service is persisted in a learning database.

In some embodiments, the learning database is processed by a set of machine learning and rule-based algorithms, the operations comprising determining sales price of the insurance products based on past performance; creating optimal customer relations management strategies; generating up-sale and remarketing customer interactions and recommendations; generating modifications to the online enrollment interview process using sentiment analysis; analyzing enrollment data in combination with applicant online social media interactions as a means to lowering fraud costs; and reducing instances of denying coverage.

Claims can Include:

Event Sourcing:

A computer-implemented method can include receiving first information pertaining to a policy application; creating a first event record, the first event record comprising the first information pertaining to the policy application; determining that the first information is incorrect; creating a second event record that includes second information, the second information comprising a correct version of the first information; storing both the first event record and the second event record; receiving a request for one or more event records for the policy application; determining between the first event record and the second event record that the second event record comprises the correct version of the information; and returning the second event record based on the determination.

Referral Service:

A computer-implemented method can include receiving information about a customer from an agent through an agent API and an agent token, the agent token uniquely identifying the agent; verifying the agent using the agent token with an Agent Service; determining authorized workflows available for the agent based on information about the agent in the Agent Service; creating an association between the agent and the customer and the information; creating a referral token for the customer and a URL, the URL linking to a carrier-defined landing site; providing the referral token and the URL to the agent; receiving the referral token from a carrier or carrier landing site; verifying the referral token; processing the information about the customer using a workflow that the agent is authorized to use; creating a populated application using the information about the customer and the workflow; providing the information about the customer to the carrier or carrier landing site; and marking the referral token as used.

Workflows:

A computer-implemented method including encapsulating workflow definitions in a workflow data structure, the workflow definitions including a workflow owner, workflow name, workflow version, product definitions, product pricing, underwriting rules, and question sets; using the workflow data structure to start processing customer information to create an application for the customer to complete using the question sets in the workflow data structure, review the application responses based on allowed answers in the question sets in the workflow data structure; process the application for underwriting using the underwriting rules in the workflow structure; determining pricing for the customer based on the result of underwriting and the product pricing defined in the workflow data structure; locking the workflow data structure from changes; determining that one or more workflow definitions is incorrect or no longer valid; receiving one or more new workflow definitions; creating a new workflow data structure with an updated workflow version.

The preceding figures and accompanying description illustrate example processes and computer-implementable techniques. However, system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or perform additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. A method comprising:

receiving a mutate command instructing the modification of an object from a first state to a second state, wherein the object is a digital document comprising policy data, and wherein the modification of the first state to the second state comprises a change to the policy data;

accessing an event log comprising an origin state of the object, wherein the origin state is the state in which the object was instantiated, and one or more previously executed mutation commands;

applying the one or more previously executed mutation commands to the origin state of the object to generate a current state object;

comparing the current state object to the first state, and if the current state object matches the first state, determining that the first state is valid;

in response to determining that the first state is valid:

executing the mutate command on the object to place the object in the second state; and recording the mutate command in the event log as an additional previously executed mutation command.

2. The method of claim 1, wherein the object is a component of a digital life insurance policy.

3. The method of claim 1, wherein the mutate command comprises changes to information in the object.

4. The method of claim 1, wherein if the current state object does not match the first state:

determining that the first state is invalid; and returning a failure message indicating the object will not be placed in the second state.

5. The method of claim 1, wherein the one or more previously executed mutation commands each mutate the object from a previous state to a next state in a plurality of sequential states, and wherein the previously executed mutation commands are sequentially ordered.

6. The method of claim 5, comprising:

receiving a debug command request the object in a particular state of the plurality of sequential states;

accessing the event log and determining a subset of previously executed mutation commands that are sequentially ordered before the particular state; and applying the subset of previously executed mutation commands, starting with an initially executed mutation command, to a debug object that is in the origin state to produce a debug object in the particular state of the plurality of sequential states.

7. The method of claim 1, comprising:

receiving a request for the object in a particular format;

accessing the event log;

applying the one or more previously executed mutation commands to the origin state of the object to create a current object;

converting the current object into the requested particular format; and returning the object in the particular format.

8. A non-transitory computer-readable storage medium storing one or more instructions executable by a computer system to perform operations comprising:

receiving a mutate command instructing the modification of an object from a first state to a second state, wherein the object is a digital document comprising policy data, and wherein the modification of the first state to the second state comprises a change to the policy data;

accessing an event log comprising an origin state of the object, wherein the origin state is the state in which the object was instantiated, and one or more previously executed mutation commands;

applying the one or more previously executed mutation commands to the origin state of the object to generate a current state object;

comparing the current state object to the first state, and if the current state object matches the first state, determining that the first state is valid;

in response to determining that the first state is valid:

executing the mutate command on the object to place the object in the second state; and recording the mutate command in the event log as an additional previously executed mutation command.

9. The computer-readable medium of claim 8, wherein the object is a component of a digital life insurance policy.

10. The computer-readable medium of claim 8, wherein the mutate command comprises changes to information in the object.

11. The computer-readable medium of claim 8, wherein if the current state object does not match the first state:

determining that the first state is invalid; and returning a failure message indicating the object will not be placed in the second state.

12. The computer-readable medium of claim 8, wherein the one or more previously executed mutation commands each mutate the object from a previous state to a next state in a plurality of sequential states, and wherein the previously executed mutation commands are sequentially ordered.

13. The computer-readable medium of claim 12, comprising:

receiving a debug command request the object in a particular state of the plurality of sequential states;

accessing the event log and determining a subset of previously executed mutation commands that are sequentially ordered before the particular state; and applying the subset of previously executed mutation commands, starting with an initially executed mutation command, to a debug object that is in the origin state to produce a debug object in the particular state of the plurality of sequential states.

14. The computer-readable medium of claim 8, comprising:

receiving a request for the object in a particular format;

accessing the event log;

applying the one or more previously executed mutation commands to the origin state of the object to create a current object;

converting the current object into the requested particular format; and returning the object in the particular format.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving a mutate command instructing the modification of an object from a first state to a second state, wherein the object is a digital document comprising policy data, and wherein the modification of the first state to the second state comprises a change to the policy data;

accessing an event log comprising an origin state of the object, wherein the origin state is the state in which the object was instantiated, and one or more previously executed mutation commands;

applying the one or more previously executed mutation commands to the origin state of the object to generate a current state object;

comparing the current state object to the first state, and if the current state object matches the first state, determining that the first state is valid;

in response to determining that the first state is valid:

executing the mutate command on the object to place the object in the second state; and recording the mutate command in the event log as an additional previously executed mutation command.

16. The system of claim 15, wherein the object is a component of a digital life insurance policy.

17. The system of claim 15, wherein the mutate command comprises changes to information in the object.

\* \* \* \* \*